United States Patent
Hirotani et al.

(10) Patent No.: US 9,331,623 B2
(45) Date of Patent: May 3, 2016

(54) BRUSHLESS MOTOR, EXTERNAL AC VOLTAGE SOURCE, AND ELECTRIC POWER STEERING DEVICE

(71) Applicants: Yu Hirotani, Chiyoda-ku (JP); Ryuichi Takiguchi, Chiyoda-ku (JP); Yuji Takizawa, Chiyoda-ku (JP); Tetsuya Kojima, Chiyoda-ku (JP); Masatsugu Nakano, Chiyoda-ku (JP); Satoru Akutsu, Chiyoda-ku (JP)

(72) Inventors: Yu Hirotani, Chiyoda-ku (JP); Ryuichi Takiguchi, Chiyoda-ku (JP); Yuji Takizawa, Chiyoda-ku (JP); Tetsuya Kojima, Chiyoda-ku (JP); Masatsugu Nakano, Chiyoda-ku (JP); Satoru Akutsu, Chiyoda-ku (JP)

(73) Assignee: MITSUBISHI ELECTRIC CORPORATION, Chiyoda-ku (JP)

( * ) Notice: Subject to any disclaimer, the term of this patent is extended or adjusted under 35 U.S.C. 154(b) by 2 days.

(21) Appl. No.: 14/369,828

(22) PCT Filed: Jan. 11, 2013

(86) PCT No.: PCT/JP2013/050461
§ 371 (c)(1),
(2) Date: Jun. 30, 2014

(87) PCT Pub. No.: WO2013/108726
PCT Pub. Date: Jul. 25, 2013

(65) Prior Publication Data
US 2014/0340015 A1    Nov. 20, 2014

(30) Foreign Application Priority Data

Jan. 17, 2012   (JP) .................................. 2012-007184

(51) Int. Cl.
*H02P 27/00*   (2006.01)
*H02P 25/02*   (2016.01)
*B62D 5/04*    (2006.01)

(52) U.S. Cl.
CPC .............. *H02P 25/026* (2013.01); *B62D 5/046* (2013.01); *H02P 2207/05* (2013.01)

(58) Field of Classification Search
CPC ...... H02P 25/26; H02P 2207/05; H02P 27/04
USPC ............. 318/400.01, 400.02, 400.14, 400.15, 318/700, 701, 721, 629, 432, 722, 807; 324/623; 327/119; 356/463; 359/328, 359/329; 363/40, 71
See application file for complete search history.

(56) References Cited

U.S. PATENT DOCUMENTS

| | | | |
|---|---|---|---|
| 7,176,652 B2 * | 2/2007 | Wakabayashi | H02P 29/0038 318/400.02 |
| 2006/0001392 A1 | 1/2006 | Ajima et al. | |

(Continued)

FOREIGN PATENT DOCUMENTS

| | | |
|---|---|---|
| JP | 9-331694 A | 12/1997 |
| JP | 2002-345283 | 11/2002 |

(Continued)

OTHER PUBLICATIONS

Japanese Office Action issued Sep. 30, 2014 in Patent Application No. 2013-554283 with English Translation.

(Continued)

*Primary Examiner* — Antony M Paul
(74) *Attorney, Agent, or Firm* — Oblon, McClelland, Maier & Neustadt, L.L.P.

(57) ABSTRACT

The present invention provides a brushless motor in which the voltage utilization ratio can be increased and the torque and output of the motor can thereby be increased, and also provides a drive method for a brushless motor. The brushless motor includes an armature constituted by an armature core having armature windings of a plurality of phases, and a field pole constituted by a field pole core having a plurality of permanent magnets. A voltage, in which at least a 5th order harmonic component is superimposed on a 1st order fundamental wave of a voltage under predetermined phase difference condition and amplitude condition in order to increase a 1st order fundamental wave peak of the applied voltage over an applied voltage peak, is applied to the armature windings.

13 Claims, 31 Drawing Sheets

(56) References Cited

U.S. PATENT DOCUMENTS

| | | | |
|---|---|---|---|
| 2010/0019708 A1* | 1/2010 | Okubo | 318/400.19 |
| 2012/0049782 A1* | 3/2012 | Suzuki | 318/807 |
| 2012/0169163 A1* | 7/2012 | Imai et al. | 310/71 |

FOREIGN PATENT DOCUMENTS

| | | |
|---|---|---|
| JP | 2005-117875 A | 4/2005 |
| JP | 2006-20381 | 1/2006 |
| JP | 2008-245406 A | 10/2008 |
| JP | 2008-271652 A | 11/2008 |
| JP | 2011-114941 A | 6/2011 |
| JP | 2012-135100 | 7/2012 |
| WO | WO 2008/047698 A1 | 4/2008 |

OTHER PUBLICATIONS

International Search Report issued Apr. 16, 2013, in PCT/JP13/050461 filed Jan. 11, 2013.

* cited by examiner

ELECTRICAL ANGLE (deg)

ELECTRICAL ANGLE (deg)

APPLICATION RATIO OF 5TH ORDER HARMONIC TO
FUNDAMENTAL WAVE OF INDUCED VOLTAGE

SUM OF 5TH ORDER HARMONIC APPLICATION RATIO AND
7TH ORDER HARMONIC APPLICATION RATIO TO
FUNDAMENTAL WAVE OF INDUCED VOLTAGE

CENTER O' OF OUTER CIRCUMFERENTIAL
PORTION OF FIELD POLE CORE

OUTER DIAMETER OF ROTOR Rm/Rc

ELECTRICAL ANGLE (deg)

ELECTRICAL ANGLE (deg)

ORDER OF HARMONIC

ORDER OF HARMONIC

ELECTRICAL ANGLE (deg)

ORDER OF HARMONIC

ORDER OF HARMONIC

BRUSHLESS MOTOR, EXTERNAL AC VOLTAGE SOURCE, AND ELECTRIC POWER STEERING DEVICE

TECHNICAL FIELD

The present invention relates to a brushless motor suitable for use in an electric power steering device or the like, and to a drive method for a brushless motor.

BACKGROUND ART

A method is known for increasing a torque while inhibiting torque ripple in a brushless motor by adjusting the induced voltage of each phase to a trapezoidal waveform in which an odd-order harmonic is superimposed on a 1st order fundamental wave.

However, when a harmonic is superimposed on the induced voltage to obtain a trapezoidal waveform shape of the induced voltage of each phase, since the phase current of each phase has a sine waveform, a peak current value is considered to be difficult to suppress. For this reason, the current that can flow in a brushless motor is restricted and the motor output is accordingly inhibited.

A brushless motor in which the inter-phase induced voltage waveform between two different phases of armature windings is provided with a trapezoidal waveform has been suggested (see, for example, Patent Document 1). In such a brushless motor, as a result of the inter-phase induced voltage waveform between two different phases being provided with a trapezoidal waveform, the phase current has a trapezoidal waveform and the current peak value of the 1st order component contributing to the motor torque can be increased over that of the sine phase current having the same phase current peak value. Therefore, a high torque and high revolution are realized while inhibiting the peak current value.

Patent Document 1: WO 2008/047698

DISCLOSURE OF THE INVENTION

However, the following problems are associated with the related art.

Thus, when the phase current waveform of a brushless motor is a trapezoidal waveform such that harmonics with a phase difference $\theta_{n,0}$ (n=3, 5, 7 . . . ; n is a harmonic order) are included in the 1st order fundamental wave and the 1st order fundamental wave peak is made larger than the waveform peak, a voltage harmonic component is generated in the armature windings of the motor.

In this case, under the effect of motor resistance or inductance, the voltage harmonic component has a phase difference of $\theta_{n,0}+\theta_{n,1}$ with the 1st order fundamental wave of the voltage. Therefore, the 1st order fundamental wave peak of the voltage typically does not become larger than the waveform peak.

Where a voltage applied from the outside is considered for the purpose of energizing an electric current of the above-described substantially trapezoidal waveform, it is necessary to apply a voltage with a waveform peak larger than the 1st order fundamental wave peak as a voltage equal to the above-described voltage harmonic component.

Further, in the voltage applied to the motor, the component affecting torque and output is the 1st order fundamental wave component, and a limitation is placed on the peak of the applied voltage that can be supplied from an external AC voltage source to the armature windings.

A problem caused by the generation of the aforementioned voltage harmonic component in the armature windings of the motor is that the ratio of the 1st order fundamental wave component of the voltage affecting the torque and output decreases with respect to the applied voltage peak, and the voltage utilization ratio decreases by comparison with that during the sine current energizing.

The present invention has been created to resolve the above-described problems, and it is an objective thereof to provide a brushless motor in which the voltage utilization ratio can be increased and the torque and output of the motor can thereby be increased, and to provide a drive method for a brushless motor.

A brushless motor in accordance with the invention includes an armature constituted by an armature core having armature windings of a plurality of phases, and a field pole constituted by a field pole core having a plurality of permanent magnets, wherein a voltage, in which at least a 5th order harmonic component is superimposed on a 1st order fundamental wave of a voltage under predetermined phase difference condition and amplitude condition in order to increase a 1st order fundamental wave peak of the applied voltage over an applied voltage peak, is applied to the armature windings; a harmonic voltage superimposed on the armature windings is the 5th order harmonic component; and the 5th order harmonic component has a phase difference of 150° to 210° with the 1st order fundamental wave of the voltage, where one period of the high-order harmonic component is taken as 360°, and a ratio of an amplitude of the 5th order harmonic component to an amplitude of the 1st order fundamental wave of the voltage is 2% to 12%.

Further, a brushless motor in accordance with the invention including an armature constituted by an armature core having armature windings of a plurality of phases, and a field pole includes an armature constituted by an armature core having armature windings of a plurality of phases, and a field pole constituted by a field pole core having a plurality of permanent magnets, wherein a voltage, in which at least a 5th order harmonic component is superimposed on a 1st order fundamental wave of a voltage under predetermined phase difference condition and amplitude condition in order to increase a 1st order fundamental wave peak of the applied voltage over an applied voltage peak, is applied to the armature windings; a harmonic voltage superimposed on the armature windings is the 5th order harmonic component and a 7th order harmonic component; and the 5th order harmonic component and the 7th order harmonic component have a phase difference of 120° to 240° with the 1st order fundamental wave of the voltage, where one period of the high-order harmonic component is taken as 360°, and a ratio of a sum of amplitudes of the 5th order harmonic component and the 7th order harmonic component to an amplitude of the 1st order fundamental wave of the voltage is 2% to 36%.

With the brushless motor and the drive method for a brushless motor in accordance with the present invention, a voltage, in which at least either of the 5th order harmonic component and the 7th order harmonic component is superimposed on the 1st order fundamental wave of the voltage under predetermined phase difference condition and amplitude condition such that the 1st order fundamental wave peak of the applied voltage is made larger than the applied voltage peak, is applied to the armature windings.

Therefore, by increasing the 1st order fundamental wave peak of the applied voltage over the applied voltage peak, it is possible to increase the voltage utilization ratio of the brushless motor and increase the torque and output of the motor.

BEST MODE FOR CARRYING OUT THE INVENTION

Figure 1:
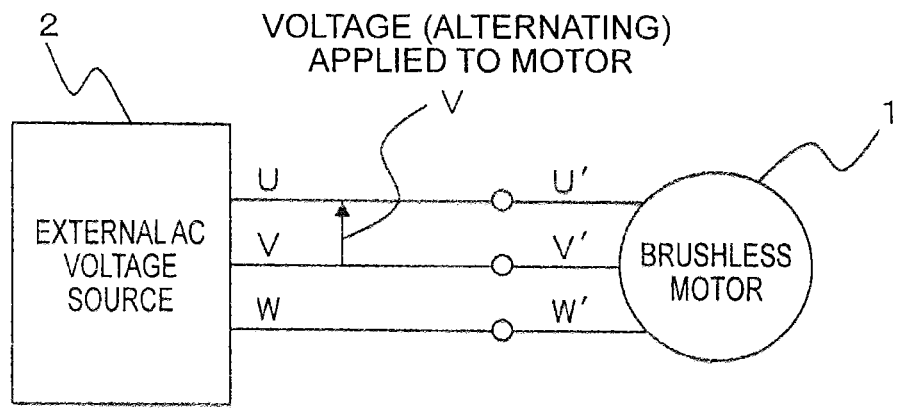
FIG. 1 is a block diagram showing a brushless motor according to Embodiment 1 of the invention together with an external AC voltage source.

The preferred embodiments of a brushless motor and a drive method for a brushless motor according to the invention are explained below with reference to the appended drawings in which like or corresponding components are assigned with like reference numerals.

Embodiment 1

FIG. 1 is a block diagram showing a brushless motor 1 according to Embodiment 1 of the invention together with an external AC voltage source 2. In FIG. 1, the brushless motor 1 is driven by application of an AC voltage (motor application voltage) V from the external AC voltage source 2 to interphases UV, VW, WU of three phases U, V, W. The combination of the brushless motor 1 and the external AC voltage source 2 can be also considered as a brushless motor.

Figure 2:
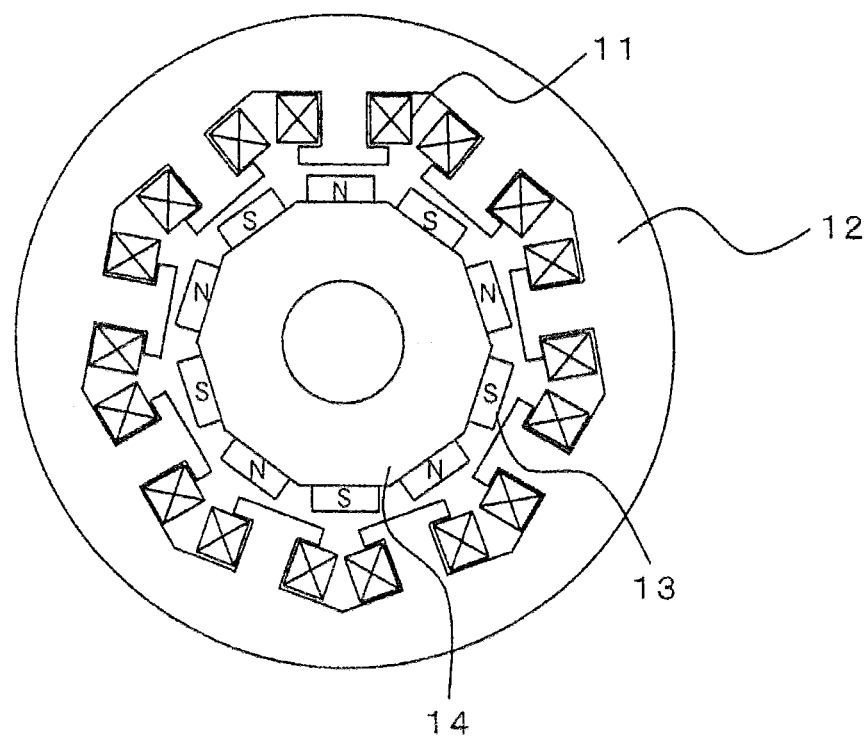
FIG. 2 is a cross-sectional view of the configuration of the brushless motor shown in FIG. 1.

FIG. 2 is a cross-sectional view showing the configuration of the brushless motor 1 shown in FIG. 1. In FIG. 2, the armature of the brushless motor 1 is constituted by an armature core 12 having three-phase armature windings 11, and field poles are constituted by a field pole core 14 having a plurality of permanent magnets 13. After the armature windings 11 of all phases have been wired, terminals U', V', W' are connected to the phases U, V, W, respectively, of the external AC voltage source 2 shown in FIG. 1.

Figure 3:
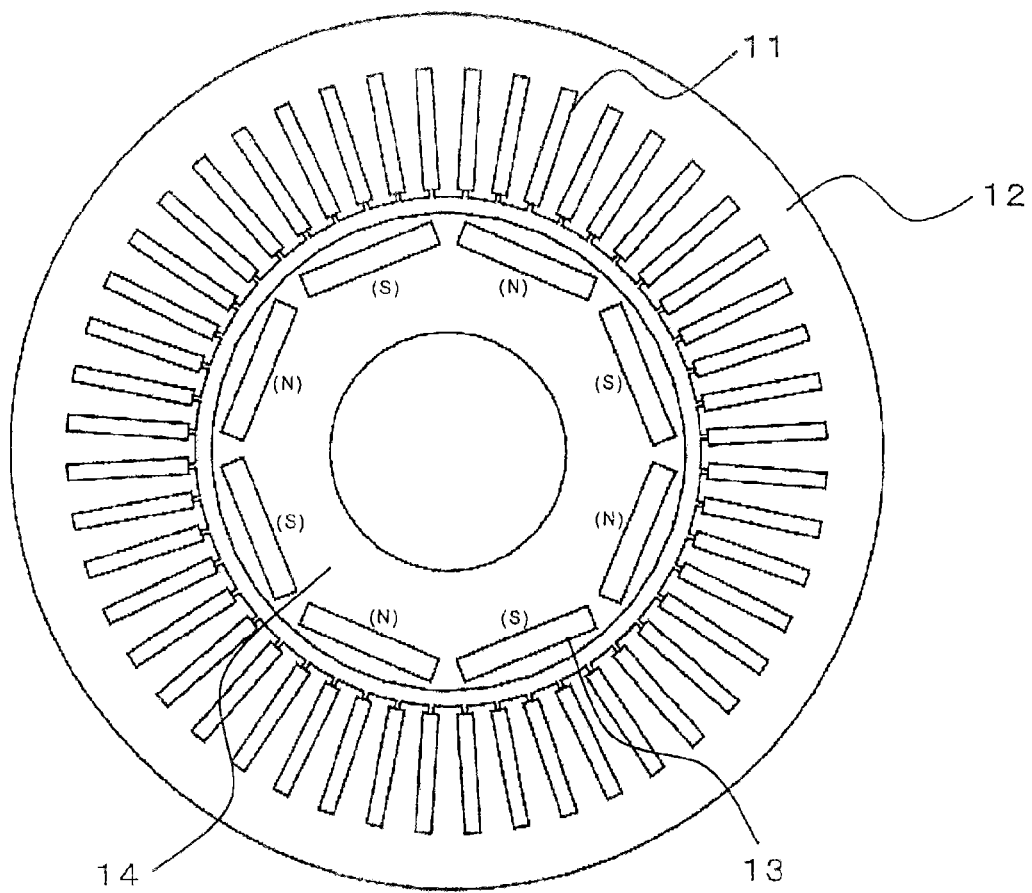
FIG. 3 is a cross-sectional view showing an example of a configuration for realizing the brushless motor according to Embodiment 1 of the invention.

The motor shown in FIG. 2 is but an example. Thus, permanent magnets 13 may be embedded in the field pole core 14, as shown, for example, in FIG. 3, and the number of the permanent magnets 13 and the number of the armature windings 11 are not limited to those shown in FIG. 2.

Figure 4:
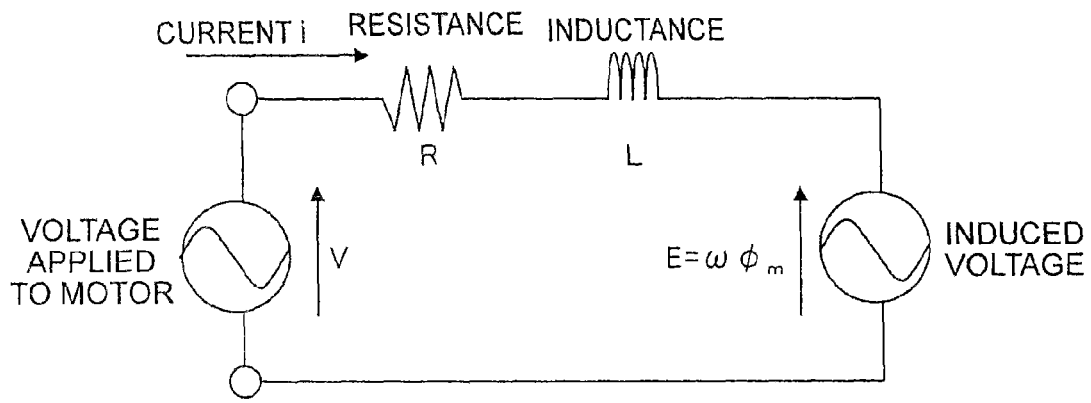
FIG. 4 is a circuit diagram showing equivalent circuits of inter-phases UV, VW, WU of the external AC voltage source shown in FIG. 1.

FIG. 4 is a circuit diagram showing equivalent circuits of the interphases UV, VW, WU of the external AC voltage source 2 shown in FIG. 1. In FIG. 4, the voltage (motor application voltage) V applied to the armature windings 11 of the brushless motor 1 is a sum of an induced voltage E=ω$\phi_m$ generated between the terminals by the rotation of the field poles of the motor, and the voltage drop components on an inductance L of the armature winding 11 between the motor terminals, the armature windings 11, and the resistance R of the external AC voltage source 2. For the $\phi_m$, a magnetic flux generated from the permanent magnets 13 is taken to be interlinked with the armature windings 11 between the terminals U'V', V'W', W'U' of the brushless motor 1.

Figure 5:
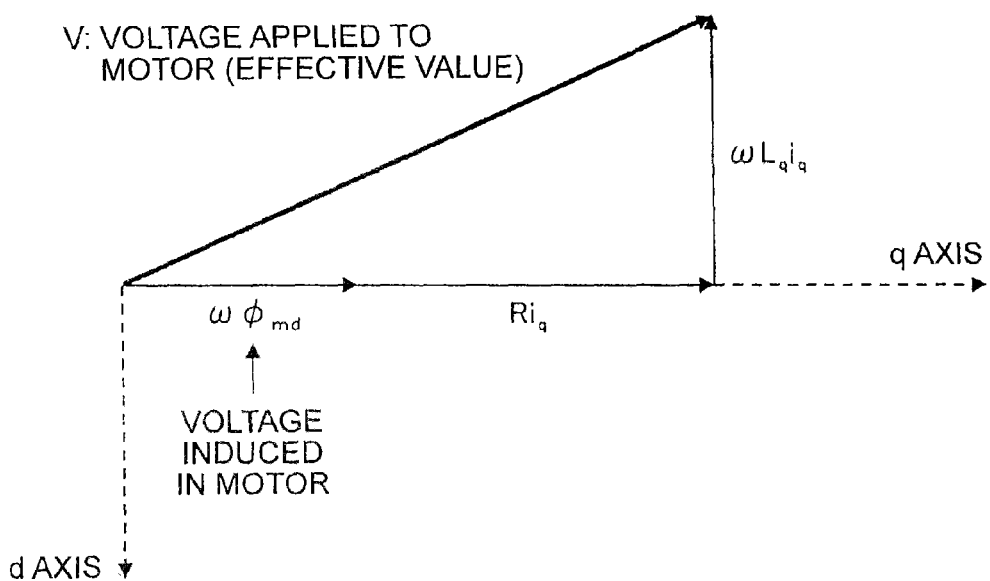
FIG. 5 is a vector diagram relating to the case in which three-phase components of the circuit shown in FIG. 3 are subjected to dq-axes two-phase conversion and an electric current is energized in the q-axis direction.

FIG. 5 is a vector diagram relating to the case in which three phases of the circuit shown in FIG. 4 are converted into two phases along dq axes, and an electric current is energized in the q-axis direction. In FIG. 5, $L_q$ is a q-axis inductance, and $\phi_{md}$ is a d-axis component of the magnetic flux $\phi_m$. It follows from FIG. 5, that the effective voltage value V applied to the motor is represented by the following Eq. (1).

(Formula 1)

$$V = \sqrt{(\omega\phi_{md} + Ri_q)^2 + (\omega L_q i_q)^2} \quad (1)$$

It follows from Eq. (1), that the phase of the current $i_q$ and voltage V applied to the motor differs depending on the resistance component and inductance component of the motor.

Further, the motor torque is proportional to the product of the magnetic flux $\phi_m$ and electric current i. However, the average torque of the motor is affected by the 1st order fundamental wave component of the magnetic flux $\phi_m$ and electric current i, and the respective higher harmonic components cause torque ripples. The motor output is represented by a product of the motor torque and revolution speed, and where the motor torque increases at the same revolution speed, the motor output also increases.

Figure 6:
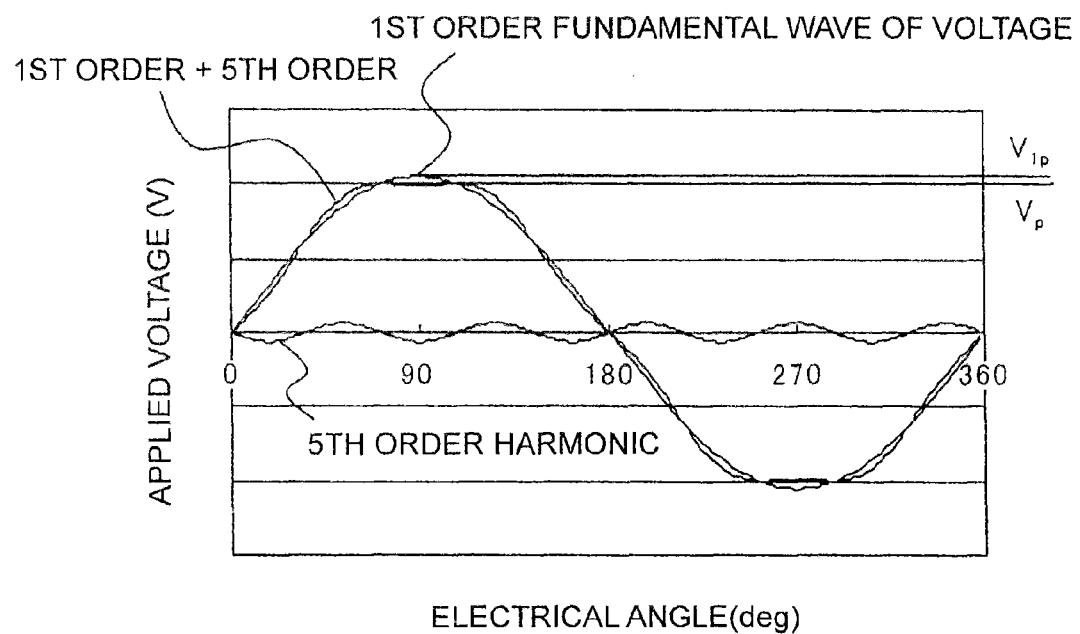
FIG. 6 is an explanatory drawing showing the waveform of the voltage applied from an external AC voltage source to the armature winding of each phase shown in FIG. 3 in Embodiment 1 of the invention.

FIG. 6 is an explanatory drawing showing the waveform of the voltage V applied from the external AC voltage source 2 to the armature winding 11 of each phase shown in FIG. 4 in Embodiment 1 of the invention. In FIG. 6, a substantially trapezoidal voltage is applied to the armature windings 11, and the settings are such that the 1st order fundamental wave peak $V_{1p}$ of the voltage V is larger than the peak $V_p$ of the voltage V.

Such settings can be explained as follows. Since the 1st order fundamental wave of the voltage applied to the circuit shown in FIG. 4 is the 1st order fundamental wave of the electric current, when the voltage peak $V_p$ is constant, the torque and output increase with the increase in the 1st order fundamental wave peak $V_{1p}$. Here, $V_{1p}/V_p$ is a voltage utilization ratio related to a sine voltage, and as the value thereof increases, larger torque and output can be obtained for the voltage with the same peak.

In FIG. 6, the voltage V applied to the armature winding 11 is represented by the following Eq. (2) as a sum of the 1st order fundamental wave component and a 5th order higher harmonic component.

(Formula 2)

$$V_p = V_{1p}\sin(\omega t) + V_{5p}\sin(5\omega t + \theta_5) \quad (2)$$

In Eq. (2), $V_{1p}$ and $V_{5p}$ represent peaks of respective harmonics, and $\theta_5$ stands for a phase difference between the 1st order fundamental wave component and the 5th order higher harmonic component. In FIG. 6, $\theta_5$ is taken as 180° and $V_{5p}/V_{1p}$ is taken as 0.06. With such settings, the $V_{1p}/V_p$ ratio is 1.05, and the torque and output increase.

Figure 7:
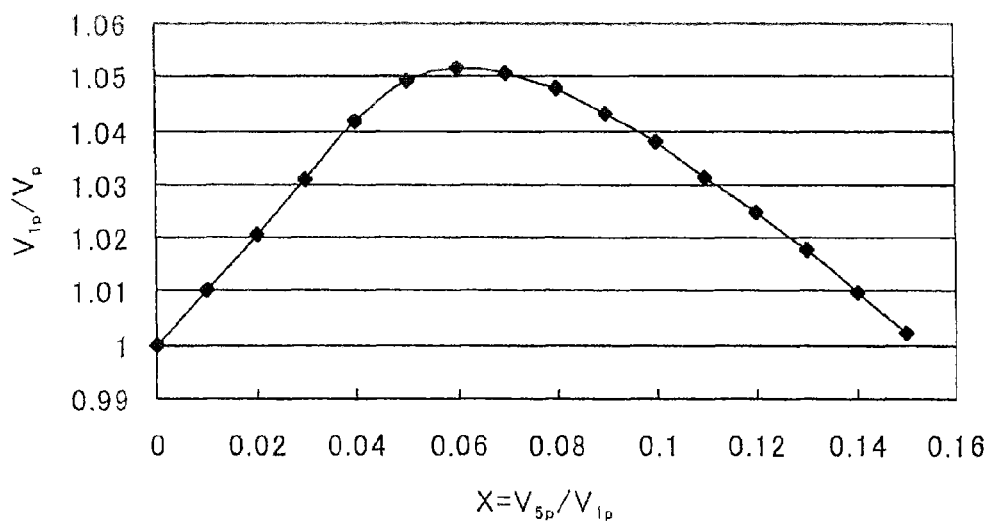
FIG. 7 is an explanatory drawing showing the ratio of the 1st order fundamental wave peak of the voltage to the voltage peak in the case in which the phase difference between the 1st order fundamental wave component and the 5th order harmonic component is taken as 180° and the ratio of the amplitude of the 5th order harmonic component to the amplitude of the 1st order fundamental wave is changed within a range of 0 to 0.15 in Embodiment 1 of the invention.

The $V_{1p}/V_p$ ratio also increases when the ratio of $V_{5p}$ to $V_{1p}$ or $\theta_5$ is changed. FIG. 7 shows the ratio of the 1st order fundamental wave peak $V_{1p}$ of the voltage to the voltage peak $V_p$ in the case in which $\theta_5$ is initially taken as 180° and $V_{5p}/V_{1p}$ is changed within a range of 0 to 0.15. It follows from FIG. 7 that where $V_{5p}/V_{1p}$ is 0.02 to 0.12, $V_{1p}/V_p$ becomes equal to or higher than 1.02.

In a more desirable case, $V_{1p}/V_p$ becomes equal to or higher than 1.03 when $V_{5p}/V_{1p}$ is 0.03 to 0.11. In an even more desirable case, $V_{1p}/V_p$ becomes equal to or higher than 1.04 when $V_{5p}/V_{1p}$ is 0.04 to 0.09.

Figure 8:
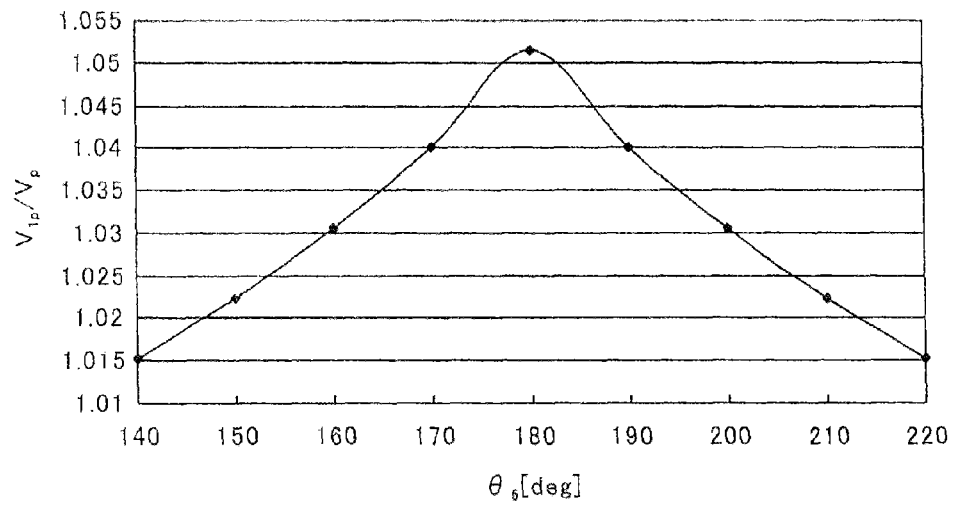
FIG. 8 is an explanatory drawing showing the maximum value of the ratio of the 1st order fundamental wave peak of the voltage to the voltage peak in the case in which the phase difference between the 1st order fundamental wave component and the 5th order harmonic component is changed within a range of 140° to 220° and the ratio of the amplitude of the 5th order harmonic component to the amplitude of the 1st order fundamental wave is changed within a range of 0 to 0.15 in Embodiment 1 of the invention.

FIG. 8 shows the maximum value of the ratio ($V_{1p}/V_p$) of the 1st order fundamental wave peak $V_{1p}$ to the voltage peak $V_p$ in the case in which $\theta_5$ is changed within a range of 140° to 220° and $V_{5p}/V_{1p}$ is changed within a range of 0 to 0.15. It follows from FIG. 8 that where $\theta_5$ is 150° to 210°, $V_{1p}/V_p$ is equal to or higher than 1.02.

In a more desirable case, $V_{1p}/V_p$ is equal to or higher than 1.03 when $\theta_5$ is 160° to 200°. In an even more desirable case, $V_{1p}/V_p$ is equal to or higher than 1.04 when $\theta_5$ is 170° to 190°.

It follows from the above that in order to increase $V_{1p}/V_p$ and input a waveform with increased torque and output at the same voltage peak, it is desirable that $V_{5p}/V_{1p}$ be set to 0.02 to 0.12 and $\theta_5$ be set to 150° to 210°.

As for the range of $V_{5p}/V_{1p}$, it is desirable that $V_{5p}/V_{1p}$ be set to 0.03 to 0.11, more desirably to 0.04 to 0.09. The desirable range of $\theta_5$ is 160° to 200°, and it is more desirable that $\theta_5$ be set to 170° to 190°.

Figure 9:
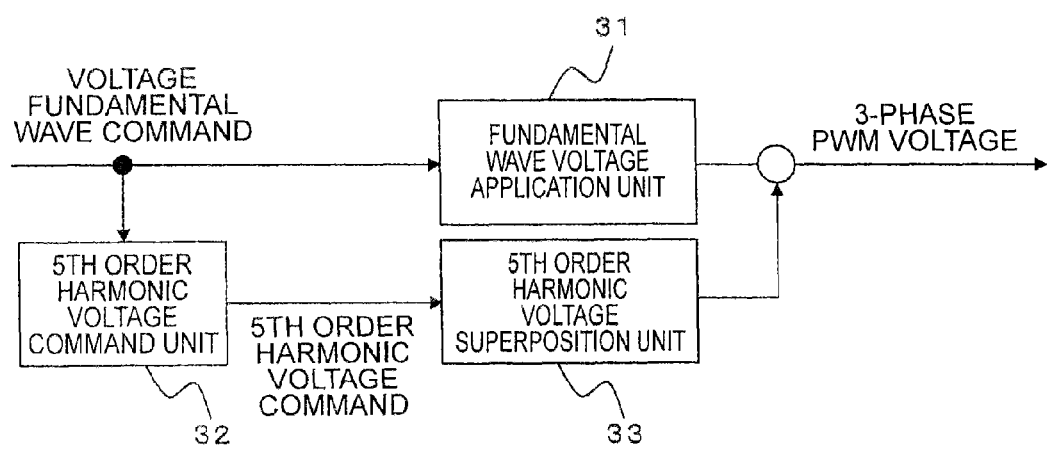
FIG. 9 is a block diagram illustrating a harmonic voltage application method for an external AC voltage source in Embodiment 1 of the invention.

FIG. 9 is a block diagram illustrating a method for applying a harmonic voltage of the external AC voltage source 2 in Embodiment 1 of the invention. In FIG. 9, the external AC voltage source 2 is provided with a fundamental wave voltage application unit 31 that applies a 1st order fundamental wave voltage to the armature winding 11 on the basis of a 1st order fundamental wave voltage command value, a 5th order harmonic voltage command unit 32 that calculates a 5th order harmonic voltage command value on the basis of the 1st order fundamental wave voltage command value, and a 5th order harmonic voltage superposition unit 33 that superimposes the 5th order harmonic voltage on the armature windings 11 on the basis of the 5th order harmonic voltage command value.

The method for calculating the 5th order harmonic voltage command value in the 5th order harmonic voltage command unit 32 involves calculating the 5th order harmonic voltage command value such that the 5th order harmonic component command value with the amplitude $V_{5p}$, and the phase difference $\theta_5$ with the 1st order fundamental wave is superimposed on the peak $V_{1p}$, of the 1st order fundamental wave command value of the voltage at predetermined values, desirably $V_{5ps}/V_{1ps}$ from 0.02 to 0.12 and $\theta_5$ from 150° to 210°. The 5th order harmonic voltage is superimposed in the 5th order harmonic voltage superposition unit 33 on the basis of the 5th order harmonic voltage command value, and the voltage V including the 5th order harmonic voltage is superimposed on the armature winding 11.

Torque ripples generated in the motor in Embodiment 1 of the invention are considered below. As mentioned hereinabove, the motor torque is proportional to the product of the magnetic flux $\phi_m$ and electric current i. However, the average torque of the motor is affected by the 1st order fundamental wave components of the electric current i and magnetic flux $\phi_m$, and the respective higher harmonic components cause torque ripples. Thus, it is usually desirable that only the 1st order basis harmonic component, such as represented by the following Eq. (3), be provided as the magnetic flux $\phi_m$ interlinked with the armature windings 11 between the terminals of the motor.

(Formula 3)

$$\phi_m = \phi_{m1} \sin(\omega t) \quad (3)$$

Figure 10:
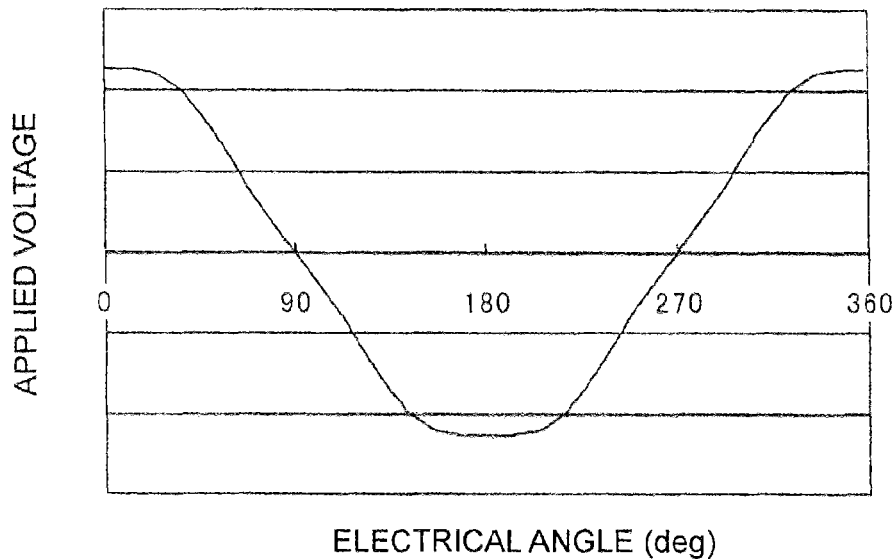
FIG. 10 is an explanatory drawing showing the voltage applied between the motor terminals in Embodiment 1 of the invention.
Figure 10:
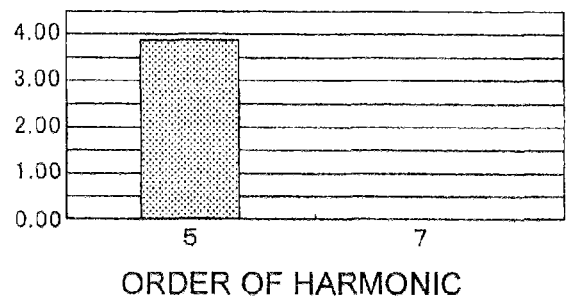
Figure 10:
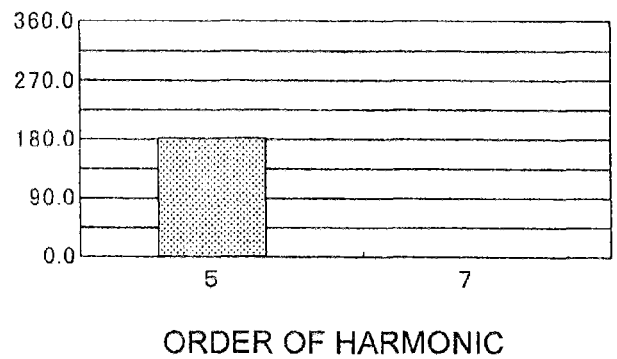

Here, a case is considered in which a voltage V in the drive method of Embodiment 1 of the invention, which is shown in FIG. 10, is applied between the motor terminals. In the voltage V shown in FIG. 10, the 5th order harmonic component has a phase difference of 180° with the 1st order fundamental wave, and the ratio of the amplitude of the 5th order harmonic component to the amplitude of the 1st order fundamental wave is about 3.5% to 4%.

Figure 11:
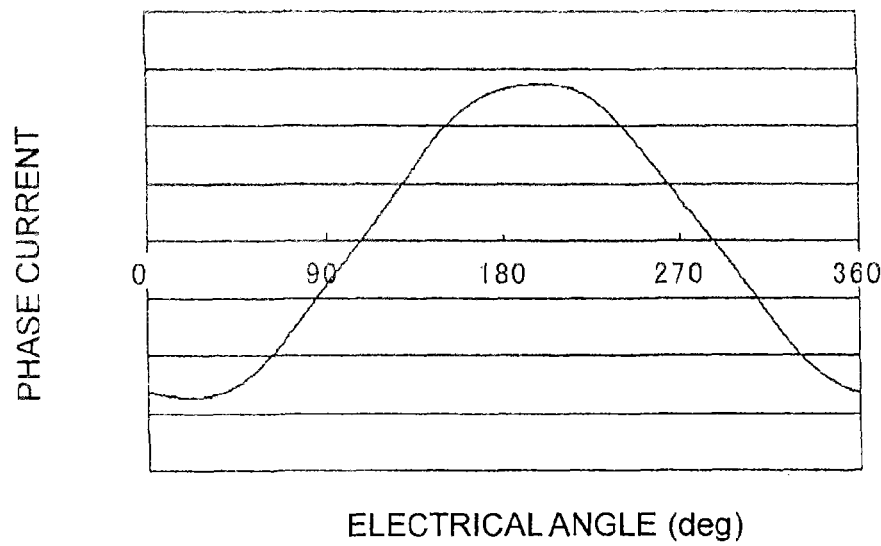
FIG. 11 is an explanatory drawing showing an electric current flowing in each armature winding of the motor in the case in which the voltage shown in FIG. 10 is applied between the motor terminals in Embodiment 1 of the invention.
Figure 11:
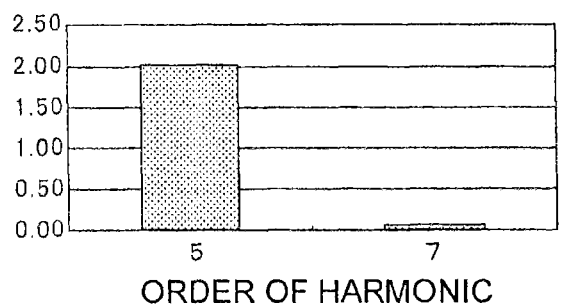
Figure 11:
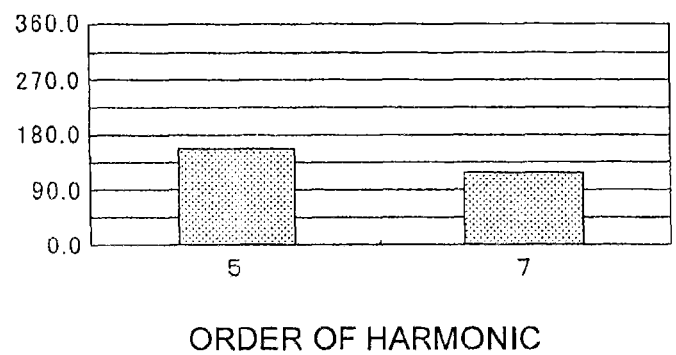
Figure 12:
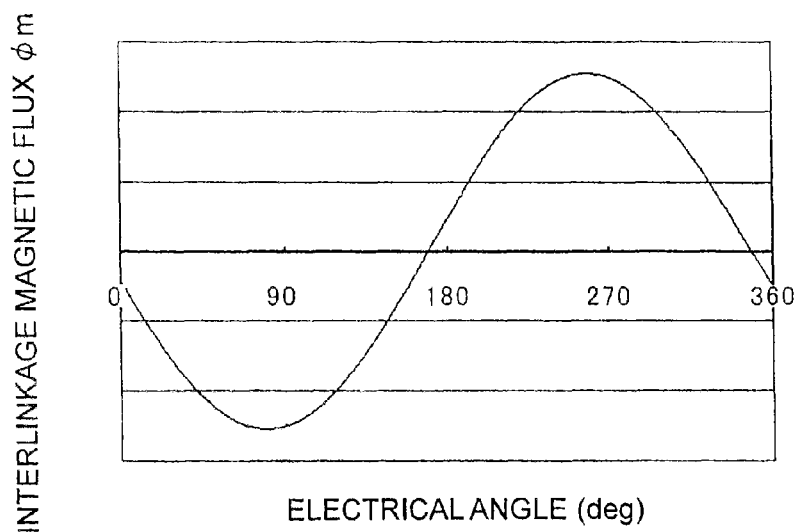
FIG. 12 is an explanatory drawing showing a magnetic flux interlinked with the armature windings of the motor in the case in which the interlinkage magnetic flux is made to have only the 1st order fundamental wave component in Embodiment 1 of the invention.
Figure 13:
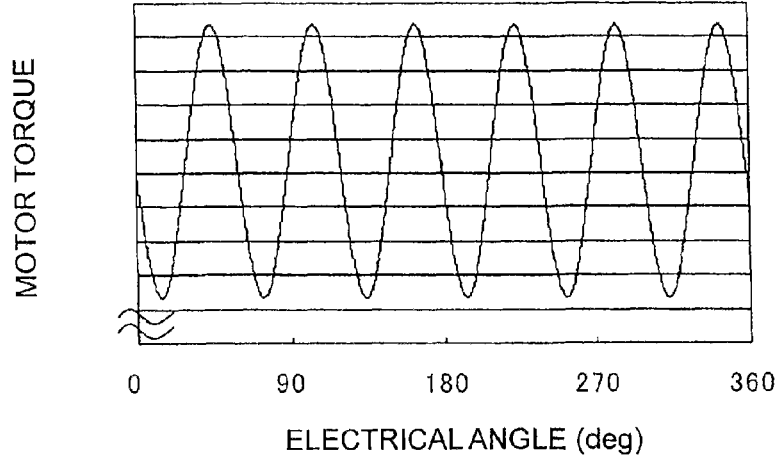
FIG. 13 is an explanatory drawing showing a torque waveform in the case in which the interlinkage magnetic flux is made to have only the 1st order fundamental wave component in Embodiment 1 of the invention.
Figure 13:
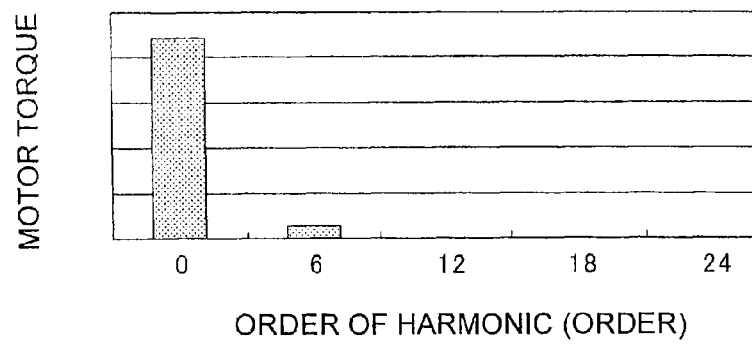

When such a voltage V is applied, the electric current i flowing in the armature windings 11 of the motor has a waveform including the 5th order harmonic component or the 7th order harmonic component, as shown in FIG. 11. Further, in the operation mode such that the interlinkage magnetic flux represented by Eq. (3) hereinabove is interlinked with the armature windings 11 of the motor by the phase relationship shown in FIG. 12, the torque waveform becomes such as shown in FIG. 13. It follows from FIG. 13 that only the 6th order harmonic component of torque ripples is generated.

Figure 14:
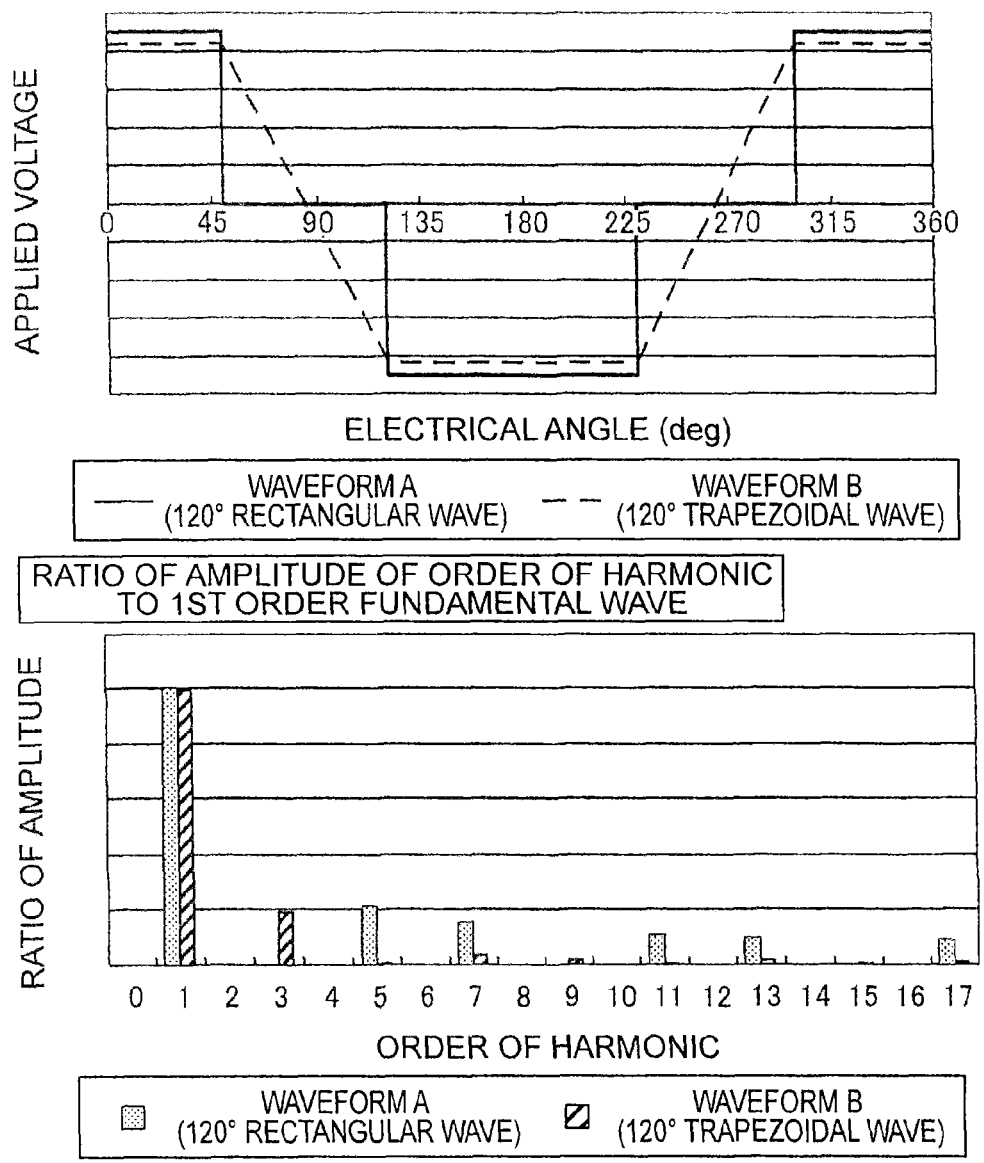
FIG. 14 is an explanatory drawing showing a waveform in which the 1st order fundamental wave peak of the voltage is larger than the voltage peak in Embodiment 1 of the invention.

Meanwhile, there is also a large number of other waveforms, such as the waveform A (120° rectangular waveform) and waveform B (120° trapezoidal waveform) shown in FIG. 14 for which the 1st order basis harmonic peak $V_{1p}$ of the voltage V becomes larger than the peak value $V_p$ of the voltage V. However, as shown in FIG. 14, which represents the results of frequency analysis of those voltages, this voltage V typically has a waveform including odd-order components up to higher harmonics. Therefore, when such voltage V is applied, the current i flowing in each armature winding 11 of the motor has a waveform including odd-order components up to higher harmonics.

Figure 15:
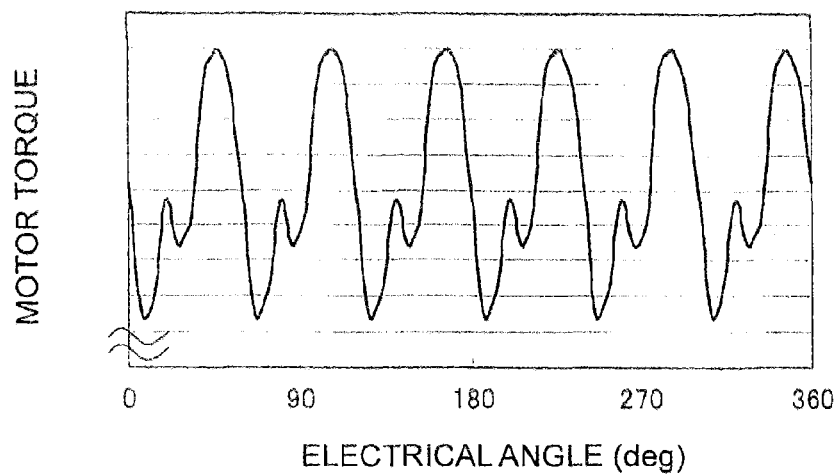
FIG. 15 is an explanatory drawing showing a torque waveform in the case in which the interlinkage magnetic flux is made to have only the 1st order fundamental wave component in the 120° trapezoidal waveform shown in FIG. 14.
Figure 15:
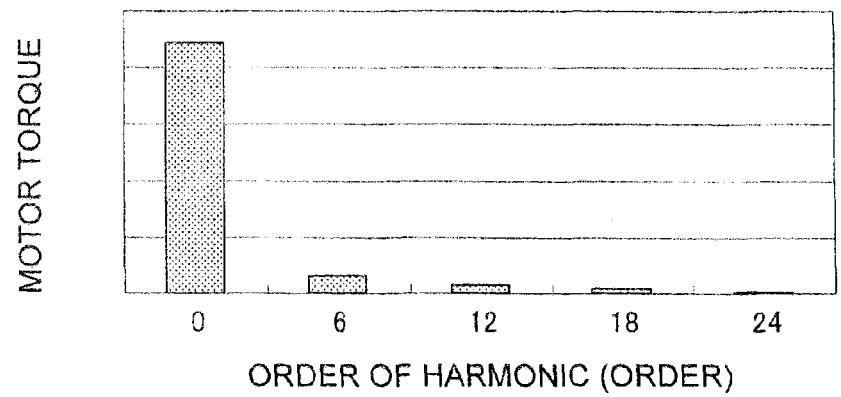

For this reason, for example, when the voltage with the waveform A (120° rectangular waveform) is applied and the motor is operated such that the interlinkage magnetic flux of Eq. (3) hereinabove is interlinked with the armature windings 11 of the motor by the phase relationship shown in FIG. 12, the torque has a waveform in which harmonic torque ripples (6n-th order, n is an integer equal to or greater than 2) are generated in addition to the 6th order harmonic component of torque ripples generated in Embodiment 1 of the invention, as shown in FIG. 15.

Thus, in Embodiment 1 of the invention, only the 5th order harmonic component is selectively applied to the armature windings 11. Therefore, it is clear that no torque ripples of the 6n-th order (n is an integer equal to or greater than 2) is generated with respect to the substantially trapezoidal voltage shown in FIG. 14.

Further, in the above-described example, the case is explained in which the sine interlinkage magnetic flux represented by Eq. (3) hereinabove is interlinked with the armature windings 11 of the motor, but the explanation presented hereinabove is also valid when the interlinkage magnetic flux or voltage generated in the windings by a magnetic flux interlinked with the windings includes a higher harmonic, provided that the explanation is limited to torque ripples caused by the voltage.

In the actual motor, it is difficult to superimpose only the 5th order harmonic voltage on the peak $V_{1ps}$ of the 1st order fundamental wave command value of the voltage, and it is possible that a harmonic component of the (6n±1)-th order (n is an integer equal to greater than 2) is additionally applied. In such a case, a 6n-th order (n is an integer equal to greater than 2) of harmonic torque ripples is generated in addition to the 6th order harmonic component, in the same manner as in the case of the above-described waveform A (120° rectangular waveform) or waveform B (120° trapezoidal waveform), thereby increasing the torque ripples.

Figure 16:
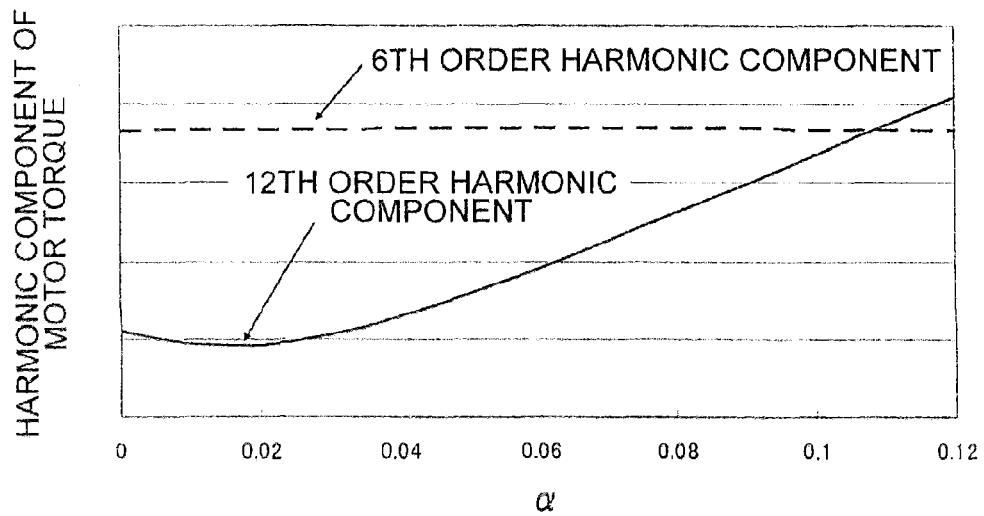
FIG. 16 is a graph showing the 6th order component and 12th order component of torque ripples in the case in which the 11th and 13th order harmonic voltages are applied at α% with respect to the peak $V_{1p}$ of the 1st order base voltage to the brushless motor according to Embodiment 1 of the invention.

FIG. 16 shows the 6th order component and 12th order component of torque ripples in the case in which the 11th and 13th order harmonic voltages are applied at a ratio of a % to the peak $V_{1p}$ of the 1st order fundamental wave voltage.

$$V = V_{1p}\sin(\omega t) + \gamma V_{1p}\sin(5\omega t + \theta 5) + \alpha V_{1p}\{\sin(11\omega t + \theta 11) + \sin(13\omega t + \theta 13)\}$$

Here, $\theta_{11}$, $\theta_{13}$ represent a phase difference between the 1st order fundamental wave component and 11th order and 13th order harmonic components. The ratio $\gamma$ of the amplitude of the 5th order harmonic component to the amplitude of the 1st order fundamental wave is about 0.035 to 0.04. In this case, it is clear that the 12th order component of torque ripples does not increase till $\alpha$ is 0 to about 0.03. This is because, the 12th order component of torque ripples generated by harmonics included in the interlinkage magnetic flux of the motor and the 12th order component of torque ripples caused by the 11th, and 13th order harmonic voltage represented by formulas hereinabove cancel each other.

Further, till $\alpha$ is 0 to about 0.03, the 6th order component of torque ripples is predominant and takes about 340%, as compared with the 12th order component of torque ripples. Therefore, the effect produced by the 12th order component of torque ripples on the total torque ripples is small. It follows from the above that even when the 11th and 13th order harmonic voltages are contained in certain amounts with respect to the peak $V_{1ps}$ of the 1st order fundamental wave command value of voltage, the effect thereof on torque ripples is small.

Figure 17:
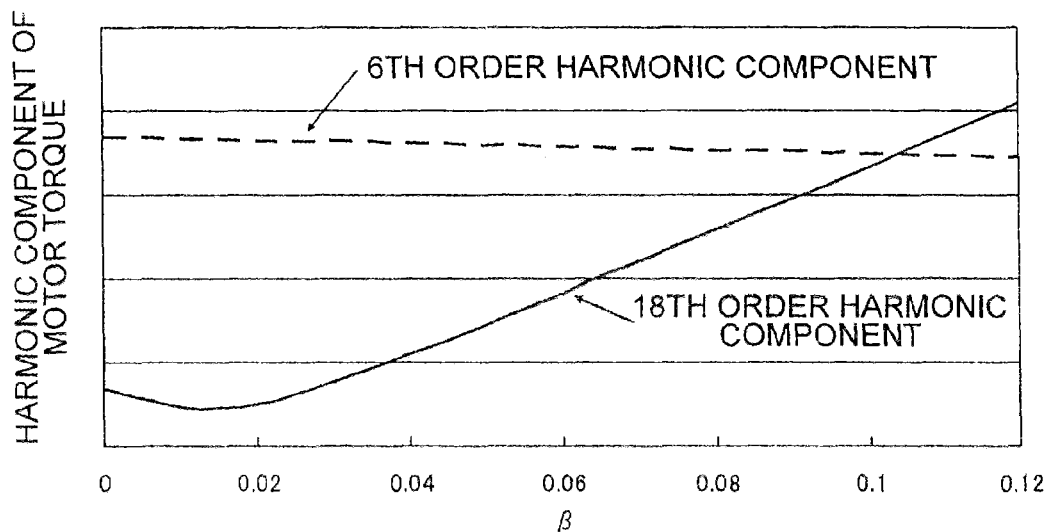
FIG. 17 is a graph showing the 6th order component and 18th order component of torque ripples in the case in which the 17th and 19th order harmonic voltages are applied at β% with respect to the peak $V_{1p}$ of the 1st order base voltage to the brushless motor according to Embodiment 1 of the invention.

Further, FIG. 17 shows the 6th order component and 18th order component of torque ripples in the case in which the 17th and 19th order harmonic voltages are added at β% to the peak $V_{1p}$ of the 1st order fundamental wave voltage. This voltage is represented by the following formula.

$$V = V_{1p}\sin(\omega t) + \gamma V_{1p}\sin(5\omega t + \theta_5) + \beta V_{1p}\{\sin(17\omega t + \theta_{17}) + \sin(19\omega t + \theta_{19})\}$$

Here, $\theta_{17}$, $\theta_{19}$ represent the phase difference between the 1st order fundamental wave component and the 17th and 19th order harmonic components, respectively. The ratio γ of the amplitude of the 5th order harmonic component to the amplitude of the 1st order fundamental wave is about 0.035 to 0.04. In this case, it is clear that the 12th order component of torque ripples does not increase till β is 0 to about 0.03. This is because, the 18th order component of torque ripples generated by harmonics included in the interlinkage magnetic flux of the motor and the 18th order component of torque ripples caused by the 17th and 19th order harmonic voltage represented by formulas hereinabove cancel each other.

Further, till α is 0 to about 0.03, the 6th order component of torque ripples is predominant and takes about 500%, as compared with the 18th order component of torque ripples. Therefore, the effect produced by the 18th order component of torque ripples on the total torque ripples is small. It follows from the above that even when the 17th and 19th order harmonic voltages are contained in certain amounts with respect to the peak $V_{1ps}$ of the 1st order fundamental wave command value of voltage, the effect thereof on torque ripples is small.

In the above-described example, the effect produced on the 12th and 18th order components of torque ripples is described with respect to the case in which the 11th and 13th, and 17th and 19th order harmonic voltages are applied, but even when a (6n±1)-th (n is an integer equal to or greater than 2) harmonic voltage is applied in a certain amount, it is canceled by the torque generated by the interlinkage magnetic flux, the ratio to the 6th order torque ripples is small, and therefore the effect on the 6n-th order (n is an integer equal to or greater than 2) of torque ripples is small.

Figure 18:
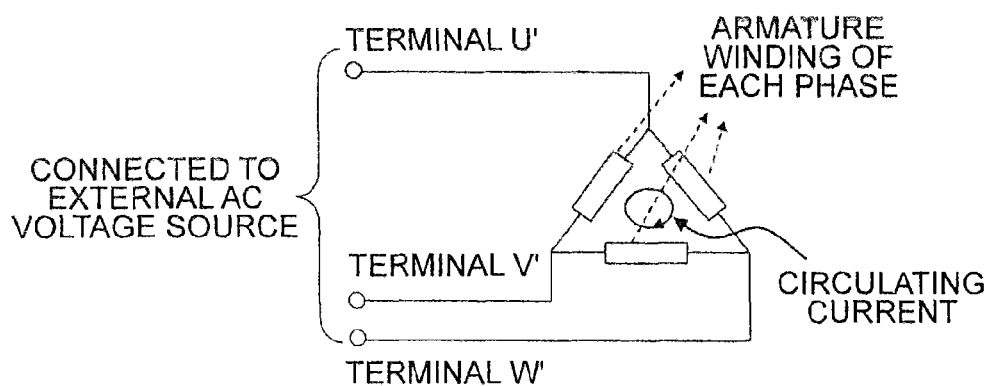
FIG. 18 is a connection diagram showing the connection method (Δ connection) of armature windings of all phases in the brushless motor of Embodiment 1 of the invention.

Further, a 3(2n−1)-th (n is an integer equal to or greater than 1) voltage is included in the waveform B (120° trapezoidal waveform) shown in FIG. 14. As shown in FIG. 18, this voltage causes a circulating current when the armature windings are in a three-phase Δ connection. Therefore, in Embodiment 1 of the invention, only the 5th order harmonic component is selectively applied to the armature winding 11. As a result, the circulating current generated in the Δ connection shown in FIG. 18 is not generated.

However, in the actual motor, it is difficult to superimpose only the 5th order harmonic voltage on the peak $V_{1ps}$ of the 1st order fundamental wave command value of the voltage, and it is also possible that a 3(2n−1)-th (n is an integer equal to or greater than 1) harmonic component is additionally applied.

Figure 19:
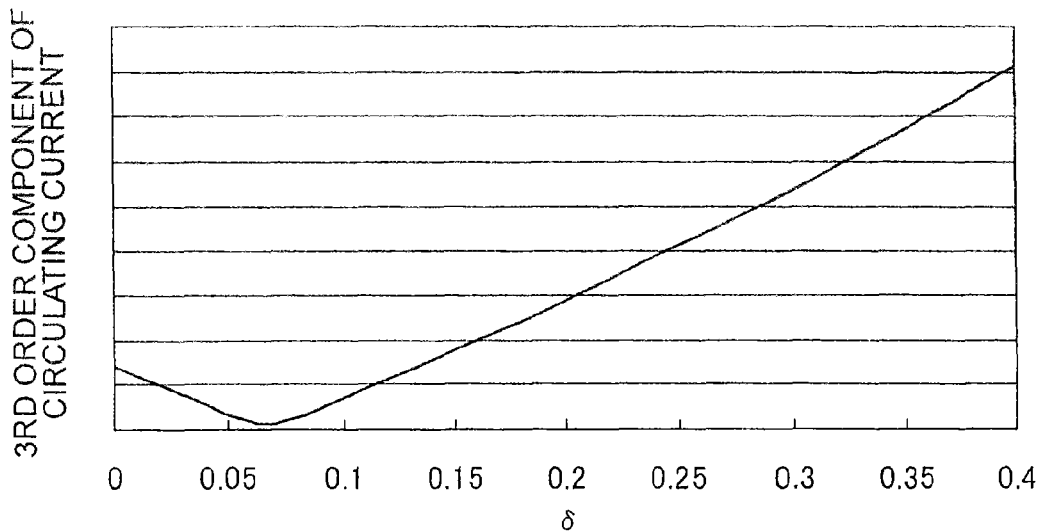
FIG. 19 is a graph showing the 3rd order component of the circulating current generated in the Δ connection shown in FIG. 18 in the case in which the 3rd order harmonic voltage is applied at δ% with respect to the peak $V_{1p}$ of the 1st order base voltage to the brushless motor according to Embodiment 1 of the invention.

FIG. 19 shows a 3rd order component of the circulating current generated in the Δ connection shown in FIG. 18 in the case in which the 3rd order harmonic voltage is applied at δ% to the peak $V_{1p}$ of the 1st order base voltage. In this case, it is clear that the 3rd order component of the circulating current does not increase till β is 0 to about 0.15. This is because the 3rd order component of the circulating current generated by the harmonics contained in the interlinkage magnetic flux of the motor and the 3rd order component of the circulating current caused by the 3rd order harmonic voltage represented by the formula above cancel each other. It follows from the above that in the Δ connection, even if the 3rd order harmonic voltage is contained in a certain amount with respect to the peak $V_{1ps}$ of the 1st order fundamental wave command value of the voltage, the effect thereof on the 3rd order component of the circulating current is small.

Further, in the above-described example, the effect on the 3rd order component of the circulating current is described with respect to the case in which the 3rd order harmonic voltage is applied, but even if the 3(2n−1)-th (n is an integer equal to or greater than 1) harmonic voltage is applied in a certain amount, it is canceled by the 3(2n−1)-th (n is an integer equal to or greater than 1) circulating current generated by the interlinkage magnetic flux. Therefore, the effect produced thereby on the 3(2n−1)-th (n is an integer equal to or greater than 1) circulating current can be said to be small.

As described hereinabove, in Embodiment 1, a voltage obtained by superimposing at least either of the 5th order harmonic component and the 7th order harmonic component on the 1st order fundamental wave under the predetermined phase difference condition and amplitude condition such that the 1st order fundamental wave peak of the applied voltage is made larger than the applied voltage peak is applied to the armature windings.

Therefore, as a result of the 1st order fundamental wave peak of the applied voltage being larger than the applied voltage peak, it is possible to increase the voltage utilization ratio of the brushless motor and increase the torque and output of the motor. Further, since at least either of the 5th order harmonic component and the 7th order harmonic component is selectively applied in order to increase the 1st order fundamental wave peak of the applied voltage over the applied voltage peak, the torque ripples of the 6n-th order component (n is an integer equal to or greater than 2) caused by the application of harmonics, and the generation of the circulation current in the Δ connection shown in FIG. 18 can be inhibited.

Thus, in Embodiment 1 of the invention, a substantially trapezoidal voltage obtained by superimposing the 5th order harmonic component on the 1st order fundamental wave is applied to the armature windings, and the 5th order harmonic component has a phase difference ($\theta_5$) of 150° to 210° with the 1st order fundamental wave, where one period of the high-order harmonic component is taken as 360°, and the ratio ($V_{5p}/V_{1p}$) of the amplitude of the 5th order harmonic component to the amplitude of the 1st order fundamental wave is 2% to 12%.

As a result, the 1st order fundamental wave peak $V_{1p}$ of the substantially trapezoidal voltage applied to the brushless motor can be increased by 2% or more over the peak $V_p$ of the substantially trapezoidal voltage. Therefore, the voltage utilization ratio relating to a sine voltage can be increased and the torque and output of the brushless motor can thereby be increased.

Further, when such a brushless motor is used in an electric power steering device, since the torque and output of the brushless motor are increased, the electric power steering device can be reduced in size and weight, and a vehicle where the electric power steering device is installed can be also reduced in size and weight.

Embodiment 2

Figure 20:
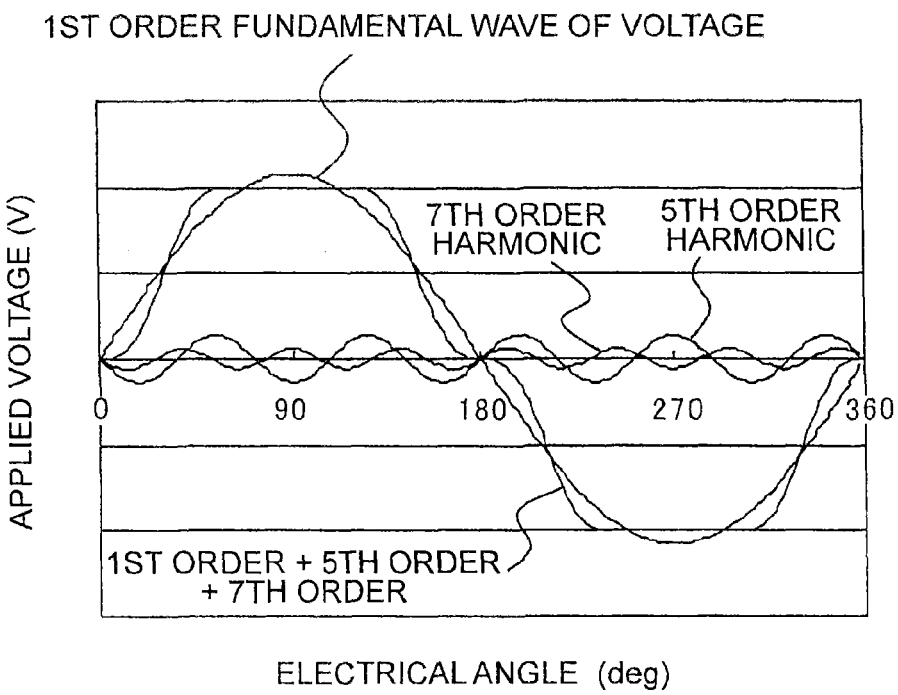
FIG. 20 is an explanatory drawing showing the waveform of the voltage applied from an external AC voltage source to the armature winding of each phase shown in FIG. 3 in Embodiment 2 of the invention.

FIG. 20 is an explanatory drawing showing the waveform of the voltage V applied from the external AC voltage source 2 to the armature winding 11 of each phase shown in FIG. 4 in Embodiment 2 of the invention. In FIG. 20, a substantially trapezoidal voltage is applied to the armature winding 11, and the settings are such that the 1st order fundamental wave peak $V_{1p}$ is larger than the peak $V_p$ of the voltage V.

Further, in FIG. 20, the voltage V applied to the armature windings 11 is represented by the following Eq. (4) as a sum of the 1st order fundamental wave component, 5th order harmonic component, and 7th order harmonic component.

(Formula 4)

$$V = V_{1p}\sin(\omega t) + V_{5p}\sin(5\omega t + \theta_5) + V_{7p}\sin(7\omega t + \theta_7) \quad (4)$$

In Eq. (4), $V_{1p}$, $V_{5p}$, and $V_{7p}$ stand for peaks of waveforms of respective orders, $\theta_5$ is a phase difference between the 1st order fundamental wave component and the 5th order harmonic component, and $\theta_7$ is a phase difference between the 1st order fundamental wave component and the 7th order harmonic component. In FIG. 20, $\theta_5$ and $\theta_7$ are set to 180°, $V_{5p}/V_{1p}$ is set to 0.126, and $V_{7p}/V_{1p}$ is set to 0.054. With such settings, $V_{1p}/V_p$ is about 1.077, and the torque and output are increased.

Figure 21:
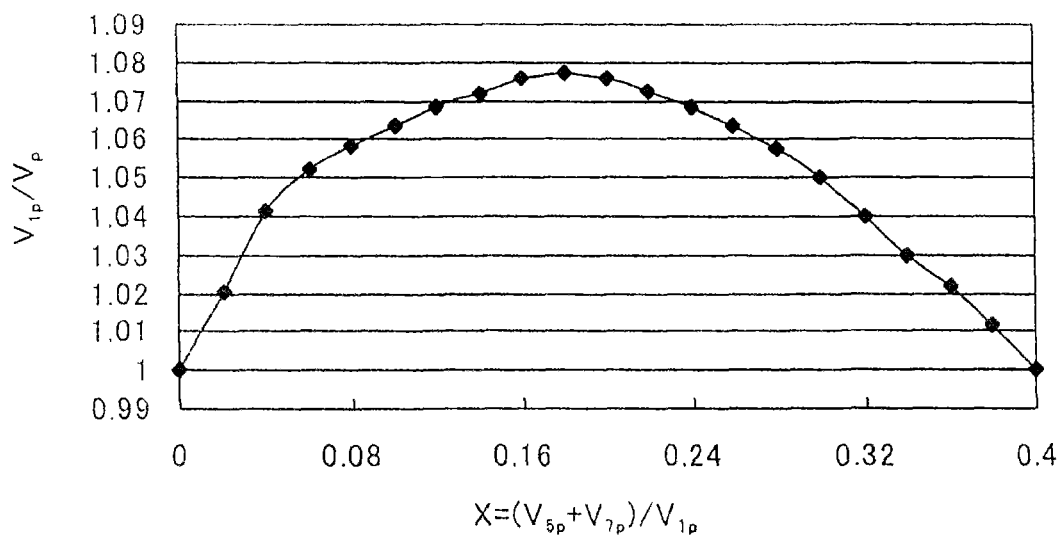
FIG. 21 is an explanatory drawing showing the ratio of the 1st order fundamental wave peak of the voltage to the voltage peak in the case in which the phase difference between the 1st order fundamental wave component and the 5th order harmonic component or the 7th order harmonic component is taken as 180° and the ratio of the sum of the amplitudes of the 5th order harmonic component and the 7th order harmonic component to the amplitude of the 1st order fundamental wave is changed within a range of 0 to 0.40 in Embodiment 2 of the invention.

Further, $V_{1p}/V_p$ is also increased when the ratios of $V_{5p}$ and $V_{7p}$ to $V_{1p}$, or $\theta_5$ and $\theta_7$ are changed. It follows from FIG. 21 that the ratio of the 1st order fundamental wave peak $V_{1p}$ of the voltage to the voltage peak $V_p$ in the case in which $\theta_5$ and $\theta_7$ are set to 180° and $(V_{5p}+V_{7p})/V_{1p}$ is changed within a range of 0 to 0.40. FIG. 21 demonstrates that the ratio $V_{1p}/V_p$ is equal to or greater than 1.02 when $(V_{5p}+V_{7p})/V_{1p}$ is 0.02 to 0.36.

More desirably, the ratio $V_{1p}/V_p$ is equal to or greater than 1.04 when $(V_{5p}+V_{7p})/V_{1p}$ is 0.04 to 0.32. Even more desirably, the ratio $V_{1p}/V_{1p}$ is equal to or greater than 1.05 when $(V_{5p}+V_{7p})/V_{1p}$ is 0.06 to 0.30. Still more desirably, the ratio $V_{1p}/V_p$ is equal to or greater than 1.06 when $(V_{5p}+V_{7p})/V_{1p}$ is 0.10 to 0.26. And even more desirably, the ratio $V_{1p}/V_p$ is equal to or greater than 1.07 when $(V_{5p}+V_{7p})/V_{1p}$ is 0.14 to 0.22.

Figure 22:
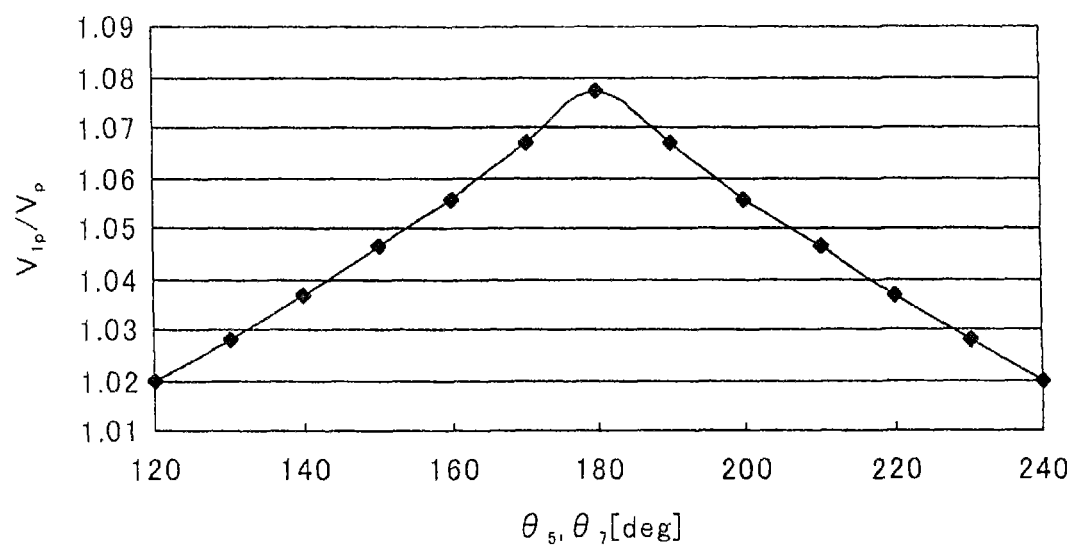
FIG. 22 is an explanatory drawing showing the maximum value of the ratio of the 1st order fundamental wave peak of the voltage to the voltage peak in the case in which the phase difference between the 1st order fundamental wave component and the 5th order harmonic component or the 7th order harmonic component is changed within a range of 120° to 240° and the ratio of the sum of the amplitudes of the 5th order harmonic component and the 7th order harmonic component to the amplitude of the 1st order fundamental wave is changed within a range of 0 to 0.15 in Embodiment 2 of the invention.

FIG. 22 shows the maximum value of the ratio $(V_{1p}/V_p)$ of the 1st order fundamental wave peak $V_{1p}$ of the voltage to the voltage peak $V_p$ in the case in which $\theta_5$ and $\theta_7$ are changed within a range of 120° to 240° and $(V_{5p}+V_{7p})/V_1$ is changed within a range of 0 to 0.40. It follows from FIG. 22 that $V_{1p}/V_p$ is equal to or greater than 1.02 when $\theta_5$ and $\theta_7$ are within a range of 120° to 240°.

More desirably, the ratio $V_{1p}/V_p$ is equal to or greater than 1.03 when $\theta_5$ and $\theta_7$ are within a range of 140° to 220°. Even more desirably, the ratio $V_{1p}/V_p$ is equal to or greater than 1.04 when $\theta_5$ and $\theta_7$ are within a range of 150° to 210°. Still more desirably, the ratio $V_{1p}/V_p$ is equal to or greater than 1.05 when $\theta_5$ and $\theta_7$ are within a range of 160° to 200°. And even more desirably, the ratio $V_{1p}/V_p$ is equal to or greater than 1.06 when $\theta_5$ and $\theta_7$ are within a range of 170° to 190°.

The above-described results indicate that in order to input a waveform that increases $V_{1p}/V_p$ and also increase the torque and output at the same voltage peak, it is desirable that $(V_{5p}+V_{7p})/V_{1p}$ be set to 0.02 to 0.36, and $\theta_5$ and $\theta_7$ be set to 120° to 240°.

Further, the $(V_{5p}+V_{7p})/V_{1p}$ range is more desirably set to 0.04 to 0.32, even more desirably to 0.06 to 0.30, still more desirably to 0.10 to 0.26, and even more desirably to 0.14 to 0.22, and the $\theta_5$ and $\theta_7$ range is more desirably set to 150° to 210°, even more desirably to 160° to 200°, and still more desirably to 170° to 190°.

Figure 23:
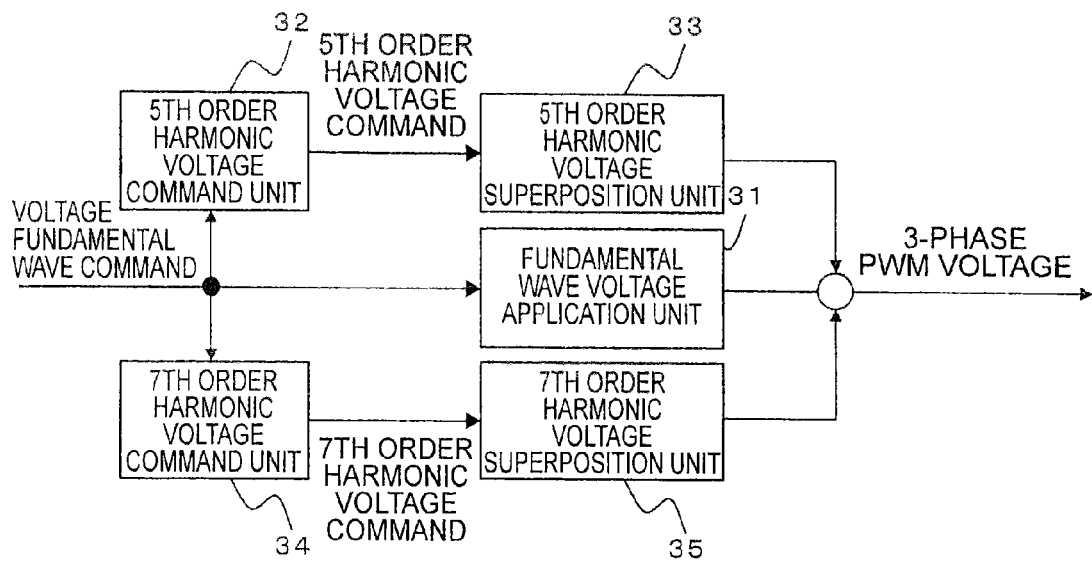
FIG. 23 is a block diagram showing the harmonic voltage application method of the external AC voltage source in Embodiment 2 of the invention.

FIG. 23 is a block diagram showing the harmonic voltage application method of the external AC voltage source 2 in Embodiment 2 of the invention. In FIG. 23, the external AC voltage source 2 is provided with a fundamental wave voltage application unit 31 that applies the 1st order fundamental wave voltage to the armature windings 11 on the basis of the voltage command value of the 1st order fundamental wave, a 5th order harmonic voltage command unit 32 that computes a 5th order harmonic voltage command value on the basis of the voltage command value of the 1st order fundamental wave, a 5th order harmonic voltage superposition unit 33 that superimposes the 5th order harmonic voltage on the armature windings 11 on the basis of the 5th order harmonic voltage command value, a 7th order harmonic voltage command unit 34 that computes a 7th order harmonic voltage command value on the basis of the voltage command value of the 1st order fundamental wave, and a 7th order harmonic voltage superposition unit 35 that superimposes the 7th order harmonic voltage on the armature windings 11 on the basis of the 7th order harmonic voltage command value.

In the method for computing the 5th and 7th order harmonic voltage command values in the 5th and 7th order harmonic voltage command units 32, 34, the 5th and 7th order harmonic voltage command values are computed such that the 5th order harmonic voltage command value with an amplitude $V_{5ps}$ and a phase difference $\theta_5$ with the 1st order fundamental wave and the 7th order harmonic voltage command value with an amplitude $V_{7p}$, and a phase difference $\theta_7$ with the 1st order fundamental wave are superimposed on the peak $V_{1ps}$ of the 1st order fundamental wave command value of the voltage at respective predetermined values, desirably, $(V_{5p}+V_{7p})/V_{1p}$ in a range of 0.02 to 0.36 and $\theta_5$ and 07 in a range of 120° to 240°. Harmonic voltages are superimposed in the 5th and 7th order harmonic voltage superposition units 33, 35 on the basis of the 5th and 7th order harmonic voltage command values, and the voltage V including the harmonic voltages is superimposed on the armature windings 11.

The torque ripples generated in the motor in Embodiment 2 of the invention are considered below. When the voltage V superimposed with the 5th order harmonic component and the 7th order harmonic component is applied, as in Embodiment 2 of the invention, the electric current i flowing in each armature winding 11 of the motor has a waveform including the 5th order harmonic component or the 7th order harmonic component, in the same manner as in Embodiment 1 described hereinabove. Therefore, in the torque ripples, only the 6th order harmonic component is generated, in the same manner as in Embodiment 1.

Thus, in Embodiment 2 of the invention, only the 5th order harmonic component and the 7th order harmonic component are selectively applied to the armature windings 11. Therefore, it is clear that the torque ripples of the 6n-th order component (n is an integer equal to or greater than 2) are not generated with respect to the substantially trapezoidal voltage shown in FIG. 14.

Further, in the actual motor, it is difficult to superimpose only the 5th and 7th order harmonic voltages on the peak $V_{1ps}$ of the 1st order fundamental wave command value of the voltage, and it is possible that a harmonic component of the (6n±1)-th order (n is an integer equal to greater than 2) is additionally applied. However, as explained in Embodiment 1, even if a harmonic component of the (6n±1)-th order (n is an integer equal to greater than 2) is applied in a certain amount, it is canceled by the torque generated by the interlinkage magnetic flux, the ratio to the 6th order torque ripples is small, and therefore the effect on the 6n-th order (n is an integer equal to or greater than 2) of torque ripples is small.

In the above-described example, the case is explained in which the interlinkage magnetic flux of a sine waveform represented by Eq. (3) hereinabove is interlinked with the armature windings 11 of the motor, but even when the interlinkage magnetic flux includes harmonics, the explanation above is valid, provided it relates to the torque ripples caused by the voltage.

Further, in Embodiment 2 of the invention, only the 5th order harmonic component and the 7th order harmonic component are selectively applied to the armature windings 11. Therefore, the circulating current caused by the 3(2n−1)-th order (n is an integer equal to or greater than 1) in the Δ connection shown in FIG. 18 can be inhibited.

In the actual motor, it is difficult to superimpose only the 5th order harmonic voltage on the peak $V_{1ps}$ of the 1st order fundamental wave command value of the voltage, and it is possible that a harmonic component of the 3(2n−1)-th order (n is an integer equal to greater than 1) is additionally applied. However, even when a harmonic component of the 3(2n−1)-th order (n is an integer equal to greater than 1) is applied in a certain amount, it is canceled by the circulating current of the 3(2n−1)-th order (n is an integer equal to greater than 1)

generated by the interlinkage flux. Therefore, the effect on the circulating current of the 3(2n−1)-th order (n is an integer equal to greater than 1) can be said to be small.

As described hereinabove, in Embodiment 2, a voltage obtained by superimposing at least either of the 5th order harmonic component and the 7th order harmonic component on the 1st order fundamental wave under the predetermined phase difference condition and amplitude condition such that the 1st order fundamental wave peak of the applied voltage is made larger than the applied voltage peak is applied to the armature windings.

Therefore, as a result of the 1st order fundamental wave peak of the applied voltage being larger than the applied voltage peak, it is possible to increase the voltage utilization ratio of the brushless motor and increase the torque and output of the motor. Further, since at least either of the 5th order harmonic component and the 7th order harmonic component is selectively applied in order to increase the 1st order fundamental wave peak of the applied voltage over the applied voltage peak, the torque ripples of the 6n-th order component (n is an integer equal to or greater than 2) caused by the application of harmonics, and the generation of the circulation current in the Δ connection shown in FIG. 18 can be inhibited.

Thus, in Embodiment 2 of the invention, a substantially trapezoidal voltage obtained by superimposing the 5th order harmonic component and the 7th order harmonic component on the 1st order fundamental wave is applied to the armature windings, and the 5th order harmonic component and the 7th order harmonic component have a phase difference ($\theta_5$, $\theta_7$) of 120° to 240° with the 1st order fundamental wave, where one period of the high-order harmonic component is taken as 360°, and the ratio (($V_{5p}$+$V_{7p}$)/$V_{1p}$) of the sum of the amplitude of the 5th order harmonic component and the amplitude of the 7th order harmonic component to the amplitude of the 1st order fundamental wave is 2% to 36%.

As a result, the 1st order fundamental wave peak $V_{1p}$ of the substantially trapezoidal voltage applied to the brushless motor can be increased by 2% or more over the peak $V_p$ of the substantially trapezoidal voltage. Therefore, the voltage utilization ratio relating to a sine voltage can be increased and the torque and output of the brushless motor can thereby be increased.

Further, when such a brushless motor is used in an electric power steering device, since the torque and output of the brushless motor are increased, the electric power steering device can be reduced in size and weight, and a vehicle where the electric power steering device is installed can be reduced in size and weight.

Embodiment 3

Figure 24:
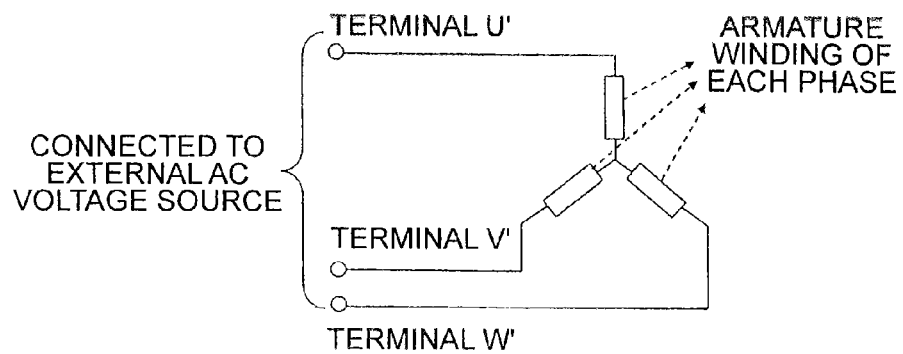
FIG. 24 is a connection diagram showing the connection method (Y connection) of armature windings of all phases in the brushless motor in Embodiment 3 of the invention.

FIG. 18 is a connection diagram showing the connection method of the armature windings 11 of each phase of the brushless motor 1 in Embodiment 3 of the invention. In FIG. 18, the Δ connection is used for the armature windings 11 of all phases. In addition to the connection shown in FIG. 18, the Y connection shown in FIG. 24 can be also used for the armature windings 11 of the three-phase brushless motor 1. In Embodiment 3 of the invention, the external AC voltage source 2 is connected between the terminals, and the brushless motor 1 is driven by the drive method of the above-described Embodiment 1 or 2.

Where the wire diameter and the number of turns are considered to be the same and only the connection method is changed with respect to the armature windings 11 of each phase shown in FIGS. 18 and 24, the resistance and inductance of the armature windings 11 of each phase are the same in FIGS. 18 and 24, and where the resistance and inductance between the terminals in the Y connection in FIG. 24 are denoted by R and L, respectively, the resistance and inductance in the Δ connection shown in FIG. 18 are ⅓R and ⅓L, respectively.

Since the resistance and inductance between the terminals shown in FIGS. 18 and 24 correspond to the resistance R and inductance L between the motor terminals shown in the above-described FIG. 4, in the Δ connection, the motor loss and voltage drop between the terminals are less than those in the Y connection, and the current i that can flow in the brushless motor 1 can be increased. Therefore, the motor torque and output in the drive methods of the above-described Embodiment 1 or 2 can be increased.

Where the armature windings 11 are wound such that the resistance values between the terminals shown in FIGS. 18 and 24 are the same and the number of turns w in each phase is the same, the resistance value of the winding of each phase is inversely proportional to the second power of the wire diameter d in the motor and can be represented by the following Eq. (5).

(Formula 5)
$$R \propto \frac{w}{d^2} \tag{5}$$

Therefore, when the resistance values between the terminals are the same, the resistance value of the armature winding 11 of each phase in the Δ connection shown in FIG. 18 is three times that in the Y connection shown in FIG. 24, as indicated hereinabove. Therefore, the wire diameter can be made 1/√3 that in the Y connection. As a result, even though the resistance value of the motor is the same, the operability of the winding operation of the motor realizing the drive method of the above-described Embodiment 1 or 2 can be improved.

As indicated hereinabove, according to Embodiment 3, with the Δ connection of the armature windings of all phases, in the drive method according to the above-described Embodiment 1 or 2, it is possible to increase the torque and output of the motor and improve the winding operability of the motor which is the drive object.

Embodiment 4

Figure 25:
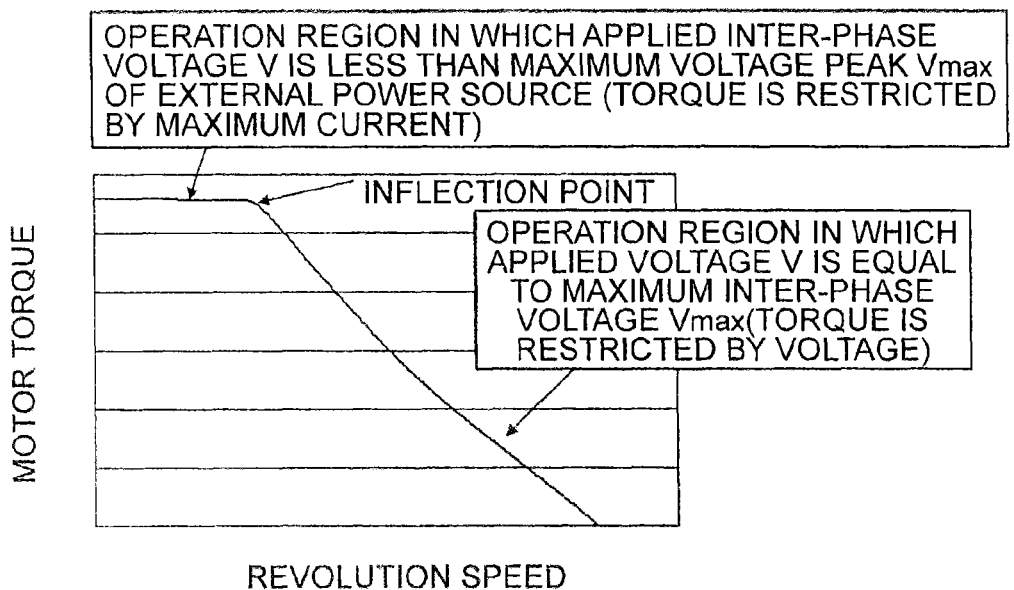
FIG. 25 is an explanatory drawing showing the torque characteristic versus revolution speed of the brushless motor in Embodiment 4 of the invention.

FIG. 25 is an explanatory drawing showing the torque characteristic versus the revolution speed of the brushless motor 1 in Embodiment 4 of the invention. It follows from FIG. 25 that the inclination of the torque characteristic increases in the negative direction at a certain revolution speed as a boundary. This is because the peak $V_p$ of the voltage V applied to the motor is restricted by the maximum inter-phase voltage peak $V_{max}$ that can be outputted by the external AC voltage source 2 and the current that flows in the motor is restricted by the voltage, with an inflection point as a boundary.

A combination of a DC voltage source and a frequency converter that converts the DC voltage into frequency-variable AC voltage is mostly used as the external AC voltage source 2 of the brushless motor 1, and the maximum inter-phase voltage peak $V_{max}$ that can be outputted by the external AC voltage source 2 is mostly determined by the performance of the DC voltage source.

Therefore, the operation region of the brushless motor 1 can be divided into the operation region in which the inter-phase voltage V applied to the motor is less than the inter-phase voltage peak $V_{max}$ of the external AC voltage source 2 and the torque is restricted by the maximum current, and the operation region in which the inter-phase voltage V applied to the motor is equal to the inter-phase voltage peak $V_{max}$ of the external AC voltage source 2 (voltage saturation), and the torque is restricted by the voltage.

In Embodiment 4 of the invention, the brushless motor 1 is driven by the drive method of the above-described Embodiment 1, 2 or 3 in the operation region in which the peak $V_p$ of the applied inter-phase region V is equal to the inter-phase voltage peak $V_{max}$ of the external AC voltage source 2.

By driving the brushless motor 1 by using the drive method of the above-described Embodiment 1, 2 or 3, it is possible to obtain the voltage utilization ratio $V_{1p}/V_p$ related to the voltage peak $V_p$ equal to or greater than 1.02, and in this operation region, the voltage peak $V_p$ is equal to $V_{max}$, and therefore $V_{1max}/V_{max}$ is equal to or greater than 1.02. In this case, $V_{1max}$ has the value of the 1st order fundamental wave peak of the $V_{max}$ voltage.

Figure 26:
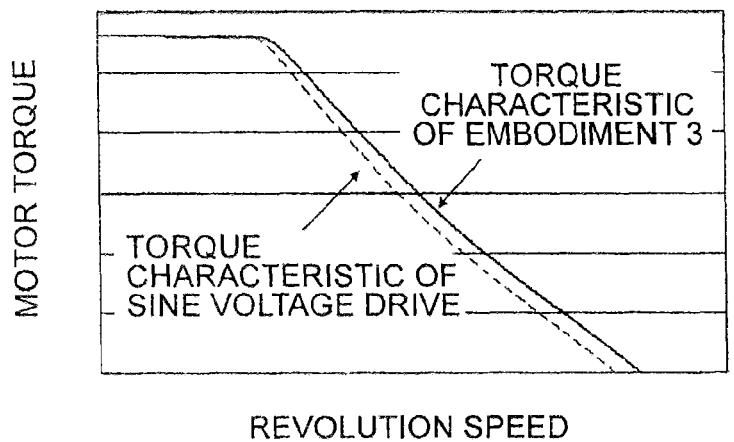
FIG. 26 is an explanatory drawing showing the relationship between the revolution speed and torque characteristic of the brushless motor of Embodiment 4 of the invention in comparison with those of sine voltage drive in which the external AC voltage source having the same inter-phase voltage peak is used.

FIG. 26 is an explanatory drawing in which the relationship between the revolution speed and torque characteristic is shown for the brushless motor 1 of Embodiment 4 of the invention in comparison with that obtained with the side voltage drive in the case of using the external AC voltage source 2 having the same inter-phase voltage peak $V_{max}$. It follows from FIG. 26 that in the operation region in which the applied inter-phase voltage V is equal to the maximum inter-phase voltage peak $V_{max}$ that can be outputted by the external AC voltage source 2, the torque and output can be increased by comparison with those in the side voltage drive.

Thus, with Embodiment 4, in the operation region in which the applied voltage V is equal to the maximum inter-phase voltage peak $V_{max}$ that can be outputted by the external AC voltage source 2, $V_{1max}/V_{max}$ can be made equal to or greater than 102% and the torque and output of the motor can be increased even while using the external AC voltage source 2 having the same inter-phase voltage peak $V_{max}$.

Embodiment 5

Figure 27:
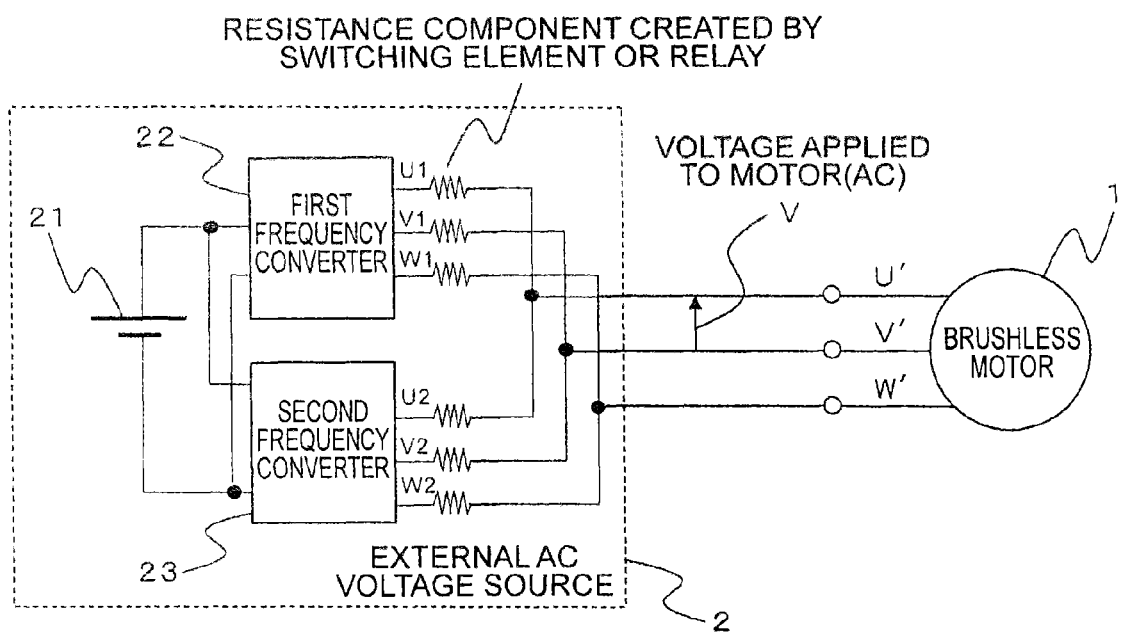
FIG. 27 is a block diagram showing the brushless motor of Embodiment 5 of the invention together with the external AC voltage source.

FIG. 27 is a block diagram showing the brushless motor of Embodiment 5 of the invention together with the external AC voltage source. In FIG. 27 the external AC voltage source 2 connected to the armature windings 11 is constituted by one DC voltage source 21 and two frequency converters 22, 23 that convert the DC voltage into frequency-variable AC voltages.

Concerning the phases U1, U2, V1, V2, W1, and W2 of the frequency converters 22, 23, the phases U1, U2 are connected to a terminal U' of the armature winding 11 of the motor, V1, V2 are connected to a terminal V' of the armature winding 11 of the motor, and W1, W2 are connected to a terminal W' of the armature winding 11 of the motor. In Embodiment 5 of the invention, the external AC voltage source 2 is connected between the terminals by the connection method shown in FIG. 27, and the brushless motor 1 is driven by the drive method of the above-described Embodiment 1, 2, 3, or 4.

In this case a resistance component $R_{ac}$ created by a switching element or a relay is present in the AC portion from each phase of the frequency converters 22, 23 to the motor terminal. However, in the configuration shown in FIG. 27, since the two frequency converters 22, 23 are connected in parallel, when the resistance components $R_{ac}$ of the frequency converters 22, 23 are the same, the resistance component is $R_{ac}/2$.

Since this resistance component is included in the resistance R between the motor terminals in the above-described FIG. 4, the loss and voltage drop between the phases of the external AC voltage source 2 decreases and the current that can flow in the brushless motor 1 can be increased by comparison with those in the case in which a single frequency converter is used. Therefore, the torque and output of the motor in the drive method of the above-described Embodiment 1, 2, 3, or 4 can be increased.

As described hereinabove, according to Embodiment 5, as a result of using a plurality of frequency converters it is possible to increase the torque and output of the motor in the drive method of the above-described Embodiment 1, 2, 3, or 4.

In Embodiment 5, the case is explained in which the external AC voltage source is constituted by a single DC voltage source and two frequency converters that convert the DC voltage into respective frequency-variable AC voltage, but such a configuration is not limited, and the resistance voltage can be reduced and the same effect can be obtained also when the number of DC voltage sources is more than one and the number of frequency converters is more than two.

Embodiment 6

Figure 28:
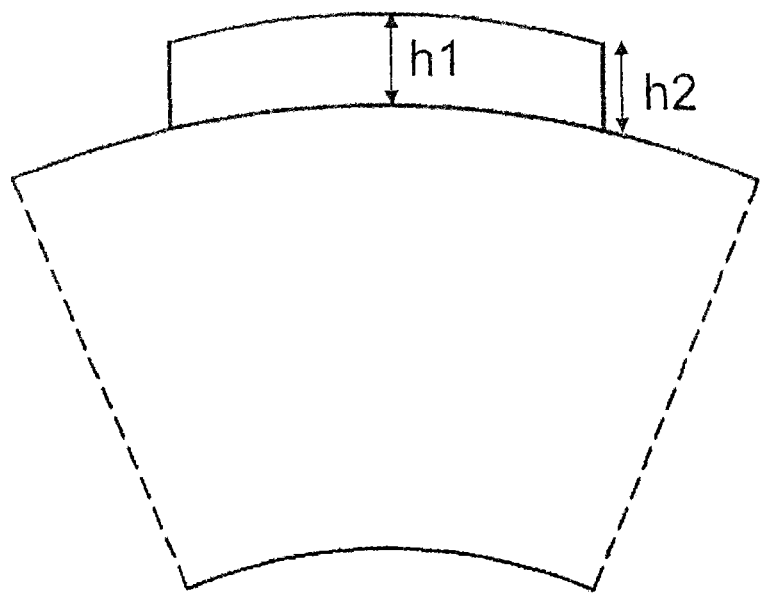
FIG. 28 is a cross-sectional view showing the configuration of one pole section of the field pole of the brushless motor of Embodiment 6 of the invention.

FIG. 28 is an enlarged drawing illustrating one pole of the field poles of the brushless motor of Embodiment 6 of the invention. In the brushless motor shown in FIG. 28, a magnet attachment surface is provided on the surface of the field pole core, a permanent magnet is attached to the magnet attachment surface by using an adhesive or the like, and the settings are such that the thickness of the magnet in the center portion and at the ends is h1 and h2, respectively.

In the brushless motor shown in FIG. 28, the induced voltage E generated between the terminals of the motor shown in FIG. 4 by the rotating field poles is represented by the following Eq. (6) in the case in which the motor has a symmetrical structure for each magnetic pole.

(Formula 6)

$$E(t) = E_{1p}\sin(\omega t) + \sum_{k=1}^{\infty} E_{(2k+1)p}\sin((2k+1)\omega t + \theta_{(2k+1)e}) \qquad (6)$$

In Eq. (6), the voltage E is represented by a sum of the 1st order fundamental wave component and a (2k+1)-th order harmonic component (k is an integer equal to or greater than 1). Further, $E_{1p}$ and $E_{(2k+1)p}$ represent a peak of the waveform of each order, and $\theta_{(2k+1)e}$ represents a phase difference between the 1st order fundamental wave component and (2k+1)-th order harmonic component.

Where the induced voltage peak is denoted by $E_p$, as shown in FIG. 4, $E_p$ is the maximum value, on the time axis, of the voltage applied from the outside between the phases of the external drive source. Here, the upper limit for the maximum value of the breakdown voltage between the phases of the external drive source is determined by the switching element or circuit element used in the external AC source, and where the breakdown voltage is exceeded, the external drive source can be damaged. Therefore, it is desirable that the peak of the induced voltage be selected small with consideration for the upper-limit voltage. Meanwhile, the torque T of the brushless motor is represented by the following Eq. (7).

(Formula 7)

$$T \propto E_{1p}/\omega \qquad (7)$$

Here, $\omega$ stands for the angular speed of the brushless motor. As shown in Eq. (7), the torque of the brushless motor is proportional to the fundamental wave component $E_{1p}$ of the induced voltage E. Therefore, in order to increase the torque value, while inhibiting the induced voltage peak, it is necessary to increase the ratio of the fundamental wave peak $E_{1p}$ to the induced voltage peak $E_p$, that is, increase the $E_{1p}/E_p$ ratio.

In Embodiment 6, the applied induced voltage E is represented, as shown in Eq. (8) hereinbelow, by a sum of the 1st order fundamental wave component, a 5th order harmonic component, and the other higher harmonic order component.

(Formula 8)

$$E(t) = E_{1p}\sin(\omega t) + E_{5p}\sin(5\omega t + \theta_{5e}) + E_{other} \quad (8)$$

Figure 29:
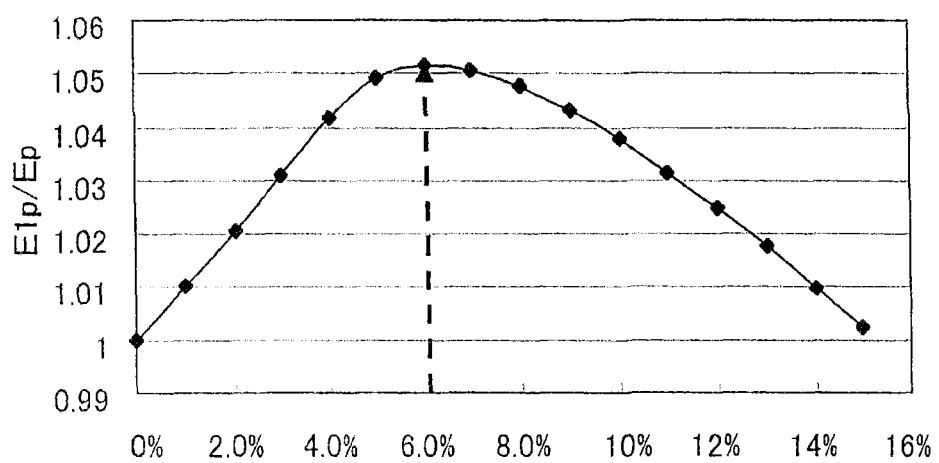
FIG. 29 is an explanatory drawing showing the ratio of the 1st order fundamental wave peak of the induced voltage to the induced voltage peak in the case in which the phase difference between the 1st order fundamental wave component and the 5th order harmonic component is set to 180° and the ratio of the amplitude of the 5th order harmonic component to the amplitude of the 1st order fundamental wave is changed within a range of 0% to 15% in Embodiment 6 of the invention.

Here, $E_{1p}$, $E_{5p}$ are peaks of waveforms of respective orders, $E_{other}$ represents the other harmonic order, and $\theta_{5e}$ is a phase difference between the 5th order harmonic component and the fundamental wave. Changes in $E_{1p}/E_p$ occurring when $E_{5p}/E_{1p}$, that is, the application ratio of the 5th order harmonic to the fundamental wave of the induced voltage, is changed are considered below. FIG. 29 shows the ratio of the fundamental wave of the voltage $E_{1p}$ to the induced voltage peak $E_p$ when a voltage is induced for which $\theta_{5e}$ is set to 180° and $E_{5p}/E_{1p}$ is set to 0% to 15%. It follows from the figure, that $E_{1p}/E_p$ is equal to or greater than 1.02 when $E_{5p}/E_{1p}$ is taken as 2% to 12%, and $E_{1p}/E_p$ is at a maximum when $E_{5p}/E_{1p}$ is about 6%.

Figure 30:
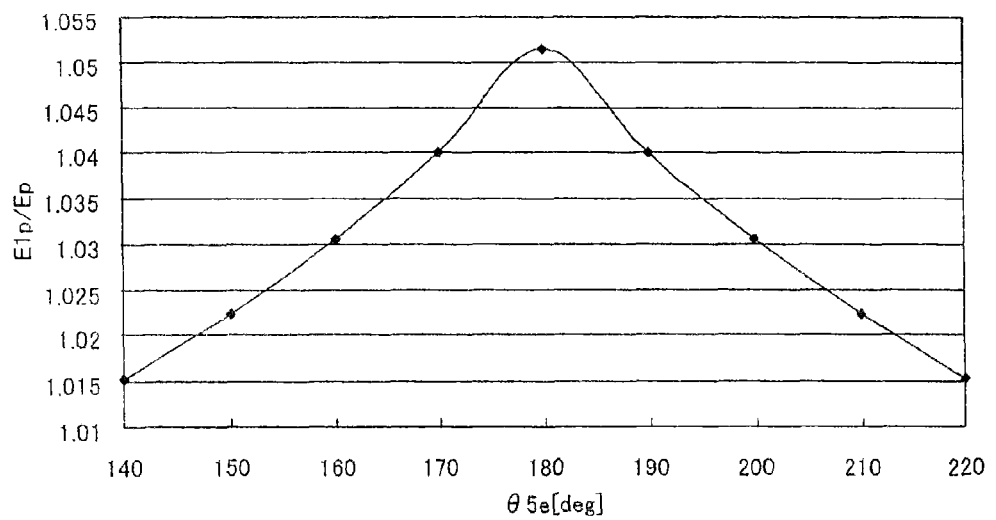
FIG. 30 is an explanatory drawing showing the ratio of the 1st order fundamental wave peak of the induced voltage to the induced voltage peak in the case in which the ratio of the amplitude of the 5th order harmonic component to the amplitude of the 1st order fundamental wave is changed within a range of 0% to 15% and the phase difference between the 1st order fundamental wave component and the 5th order harmonic component is changed within a range of 140° to 220° in Embodiment 6 of the invention.

FIG. 30 shows the maximum value of $E_{ap}/E_p$ when $\theta_5$ is set to 140° to 220° and $E_{5p}/E_{1p}$ is changed within a range of 0% to 15%. It follows from the figure, that $E_{1p}/E_p$ is equal to or greater than 1.02 when $\theta_5$ is 150° to 210°, and $E_{1p}/E_p$ is at a maximum when $\theta_5$ is 180°. However, in this case, it is assumed that the other harmonic order $E_{oth}$ is sufficiently small by comparison with $E_{1p}$ and $E_{5p}$.

Figure 31:
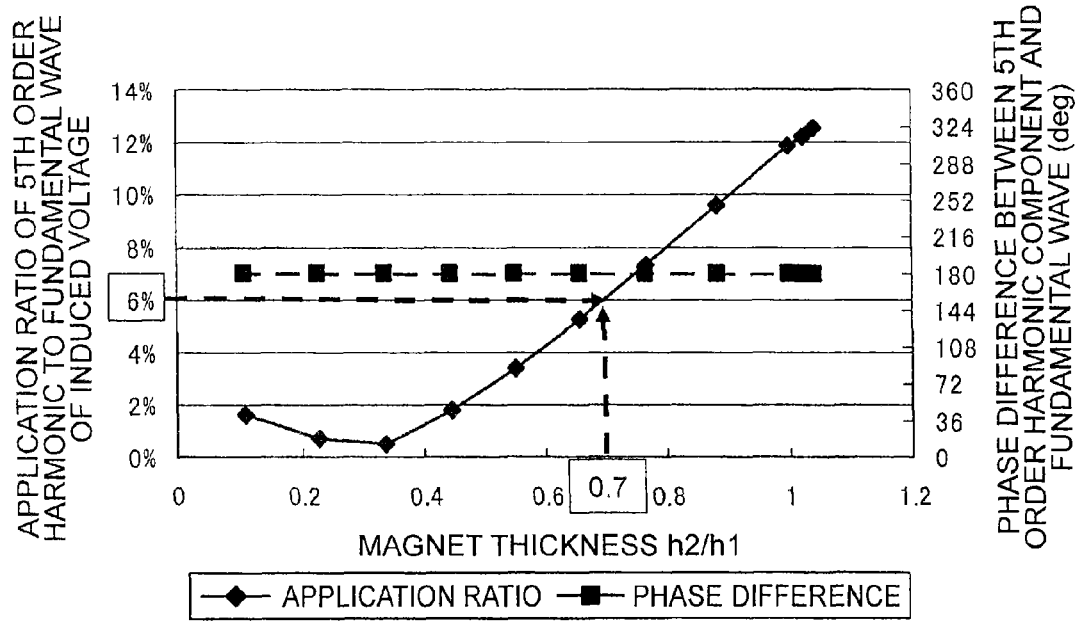
FIG. 31 is a graph showing the relationship between the peak $E_{5p}$ of the 5th order harmonic component of the induced voltage and the ratio h2/h1 of the magnet thicknesses h1 and h2 in Embodiment 6 of the invention.

FIG. 31 shows the relationship between the peak $E_{5p}$ and phase difference $\theta_5$, of the 5th order harmonic component of the induced voltage and the ratio h2/h1 of h1 and h2 in Embodiment 6. Referring to FIG. 29 to select the h2/h1 ratio such that ensures the following values, it can be found that $E_{5p}/E_{1p}$ is about 6%, $\theta_{5e}$ is about 180°, and $E_{1p}/E_p$ is at a maximum when h2/h1 is about 0.7. It follows from the above that in order to increase $E_{1p}/E_p$, it is desirable that h2/h1 be set to about 0.7 in the brushless motor shown in FIG. 28.

In the above-described example, the case is considered in which the value of the induced voltage E is represented by a sum of the 1st order fundamental wave component, 5th order harmonic component, and the component of other order, as shown in Eq. (8) hereinabove, but the case can be also considered in which the induced voltage is represented by a sum of the 1st order fundamental wave component, 5th order harmonic component, 7th order harmonic component, and the component of other order, as shown in Eq. (9) below.

(Formula 9)

$$E(t) = E_{1p}\sin(\omega t) + E_{5p}\sin(5\omega t + \theta_{5e}) + E_{7p}\sin(7\omega t + \theta_{7e}) + E_{other} \quad (9)$$

Figure 32:
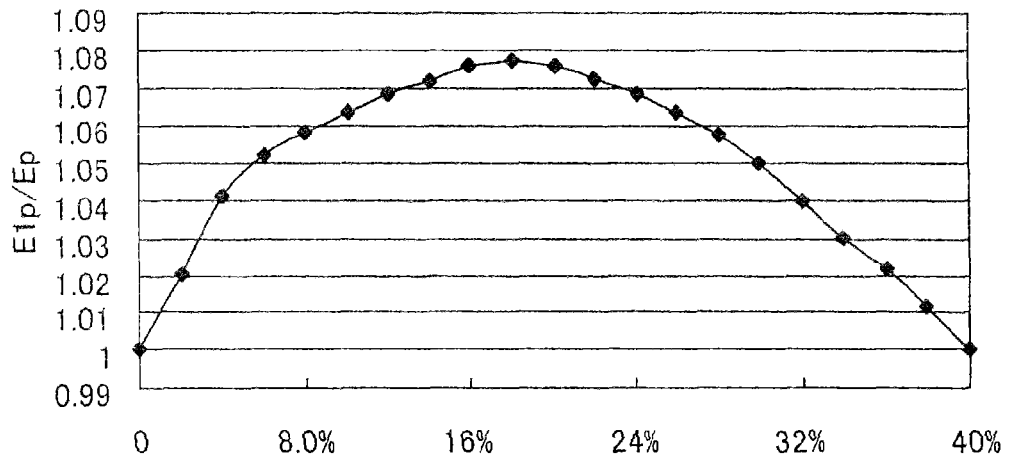
FIG. 32 is an explanatory drawing showing the ratio of the 1st order fundamental wave peak of the induced voltage to the induced voltage peak in the case in which the phase difference between the 1st order fundamental wave component and the 5th order harmonic component and the 7th order harmonic component is set to 180° and the ratio of the amplitude of the sum of the 5th order harmonic component and the 7th order harmonic component to the amplitude of the 1st order fundamental wave is changed within a range of 0% to 40% in Embodiment 6 of the invention.

Here, $E_{1p}$, $E_{5p}$, and $E_{7p}$ are peaks of waveforms of respective orders, $\theta_{5e}$ is a phase difference between the 5th order harmonic component and the fundamental wave, and $\theta_{7e}$ is a phase difference between the 7th order harmonic component and the fundamental wave. Changes in $E_{1p}/E_p$ occurring when $(E_{5p}+E_{7p})/E_{1p}$, that is, the sum of the 5th order harmonic application ratio and 7th order harmonic application ratio related to the fundamental wave of the induced voltage, is changed are considered below. FIG. 32 shows the ratio of the 1st order fundamental wave $E_{1p}$ of the voltage to the voltage peak $E_p$ when $\theta_{5e}$ and $\theta_{7e}$ are set to 180° and $(E_{5p}+E_{7p})/E_{1p}$ is set to 0% to 40%. It follows from FIG. 32, that $E_{1p}/E_p$ is equal to or greater than 1.02 when $(E_{5p}+E_{7p})/E_{1p}$ is taken as 2% to 36%, and $E_{1p}/E_p$ is at a maximum when $(E_{5p}+E_{7p})/E_{1p}$ is about 18%.

Figure 33:
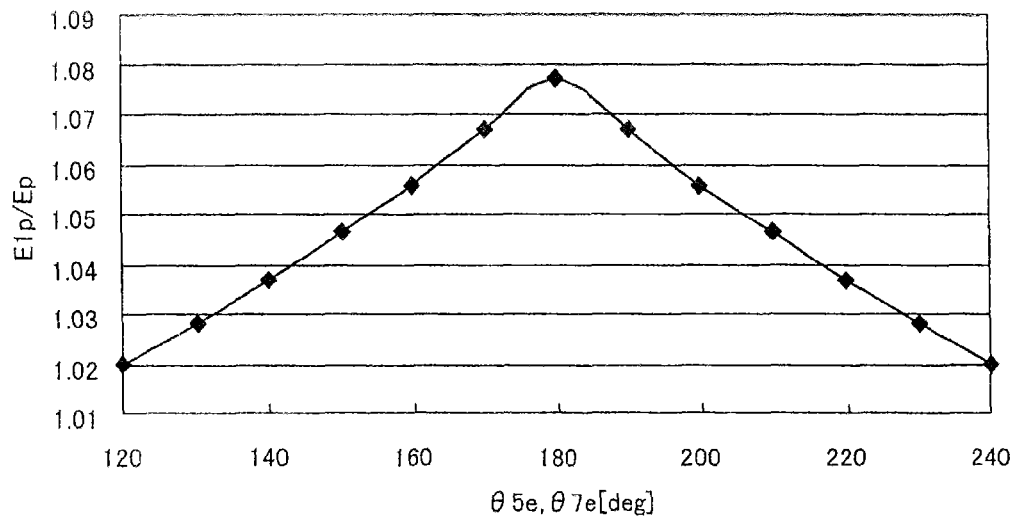
FIG. 33 is an explanatory drawing showing the ratio of the 1st order fundamental wave peak of the induced voltage to the induced voltage peak in the case in which the ratio of the amplitude of the sum of the 5th order harmonic component and the 7th order harmonic component to the amplitude of the 1st order fundamental wave is changed within a range of 0% to 40% and the phase difference between the 1st order fundamental wave component and the 5th order harmonic component and the 7th order harmonic component is changed within a range of 120° to 240° in Embodiment 6 of the invention.

FIG. 33 shows the maximum value of $E_{1p}/E_p$ when $\theta_5$ is set to 120° to 240° and $E_{5p}/E_{1p}$ is changed within a range of 0% to 40%. It follows from the figure, that $E_{1p}/E_p$ is equal to or greater than 1.02 when $\theta_5$ is 120° to 240°, and $E_{1p}/E_p$ is at a maximum when $\theta_5$ is 180°. However, in this case, it is assumed that the other harmonic order $E_{other}$ is sufficiently small by comparison with $E_{1p}$, $E_{5p}$ and $E_{7p}$.

In the case in which h2/h1 is set to obtain such values, the effect same as described hereinabove can be obtained. The same effect can be also obtained when a (2m+1)-th order harmonic (m is an integer equal to or greater than 1) is applied to the brushless motor, although such a case is not described hereinabove. Examples of the applied order include the 3rd, 9th, 11th, and 13th order harmonics. However, the problem arising when the induced voltage includes a 3(2k−1)-th order harmonic component (k is an integer equal to or greater than 1) is that a circulating current is generated in the case of the three-phase Δ connection. Therefore, the Y connection is preferred.

Figure 34:
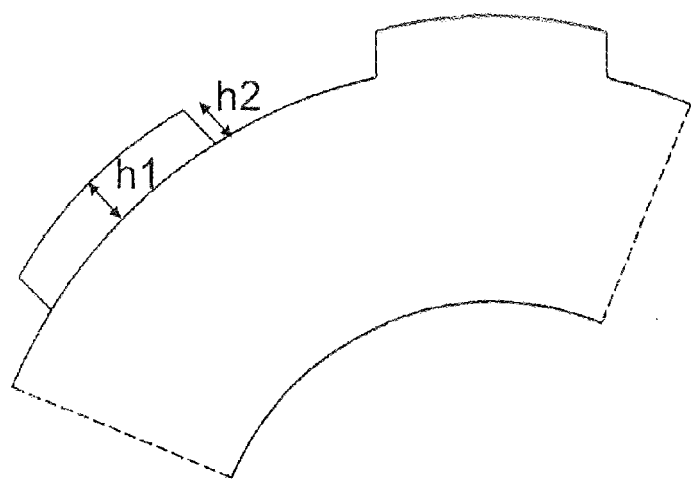
FIG. 34 is a cross-sectional view showing the configuration of a brushless motor in which the field pole core has a permanent magnet portion serving as a field pole 1 and a protruding portion serving as a field pole 2 with a polarity opposite that of the field pole 1, and the field pole 1 and the field pole 2 are each produced equidistantly in the circumferential direction in Embodiment 6 of the invention.

In a brushless motor in which the field pole core has a permanent magnet portion serving as a field pole 1 and a protruding portion serving as a field pole 2 with a polarity opposite that of the field pole 1, and the field pole 1 and the field pole 2 are each produced equidistantly in the circumferential direction, as shown in FIG. 34, the induced voltage E generated between the terminals of the motor shown in FIG. 4 by the rotation of the magnetic poles can be represented by the following Eq. (10).

(Formula 10)

$$E(t) = E_{1p}\sin(\omega t) + \sum_{k=1}^{\infty} E_{(2k)p}\sin(2k\omega t + \theta_{(2k)e}) + \sum_{k=1}^{\infty} E_{(2k+1)p}\sin((2k+1)\omega t + \theta_{(2k+1)e}) \quad (10)$$

Therefore, by performing full-pitch winding with a winding coil pitch of 180° when a pair of the N pole and S pole of field poles is at an electrical angle of 360°, it is possible to zero the even-order terms represented by Eq. (11) below. Therefore, the same arguments as in the above-described case are valid. Further, torque pulsations and cogging caused by the even-order induced voltage can be reduced.

(Formula 11)

$$\sum_{k=1}^{\infty} E_{(2k)p}\sin(2k\omega t + \theta_{(2k)e}) \quad (11)$$

In Embodiment 6, full-pitch winding with a winding coil pitch of 180° is performed when an angle occupied by a pair of the N pole and S pole of the field poles in the circumferential direction of the field poles is taken as an electrical angle of 360°. Therefore, the harmonic winding factor increases, and the variation amount of the application rate of the 5th and 7th order harmonic realized when h2/h1 is changed can be increased. However, the same effect as described hereinabove can be also obtained in the case of concentrated winding in which the windings are wound in a concentrated manner on the teeth and when the coil pitch is set to a value other than 180°.

Further, in Embodiment 6, the 5th order harmonic component $V_{5p}$ is applied to the applied voltage of the brushless motor, but where the induced voltage or applied voltage is sufficiently larger than the drop of voltage on the inductance L or R in the circuit shown in FIG. 4, the induced voltage and applied voltage may be considered to be balanced.

Therefore, where the ratio $E_{5p}/E_{1p}$ of the 5th order harmonic component $E_{5p}$ of the induced voltage to the 1st order fundamental wave component $E_{1p}$ is made substantially equal to the ratio $V_{5p}/V_{1p}$ of the 5th order harmonic component $V_{5p}$ of the harmonic components of the applied voltage to the 1st order fundamental wave component $V_{1p}$, the voltages $E_{5p}$ and $V_{5p}$ cancel each other, the harmonic current flowing in the current i can be inhibited, and the torque ripples of the motor can be reduced.

In this case, according to Embodiment 1, $V_{5p}/V_{1p}$ is set to 0.02 to 0.12, more desirably to 0.03 to 0.11, and even more desirably to 0.04 to 0.09. Therefore, it is also desirable that $E_{5p}/E_{1p}$ be set to 2% to 12%, more desirably to 3% to 11%, and even more desirably to 4% to 9%.

Here, considering the results shown in FIG. 29, it can be said that it is desirable that h2/h1 in the brushless motor shown in FIG. 28 be set to 0.5 to 1.0, more desirably to 0.55 to 0.9, and even more desirably to 0.6 to 0.8. The same effect can be also obtained when an induced voltage of an order other than the 5th order is generated in the brushless motor, a voltage of the same order as the induced voltage is applied, and the ratio of the harmonic component of the induced voltage to the 1st order fundamental wave component is made substantially equal to the ratio of the harmonic component of the applied voltage to the 1st order fundamental wave component, although such a case is not described hereinabove.

Figure 35:
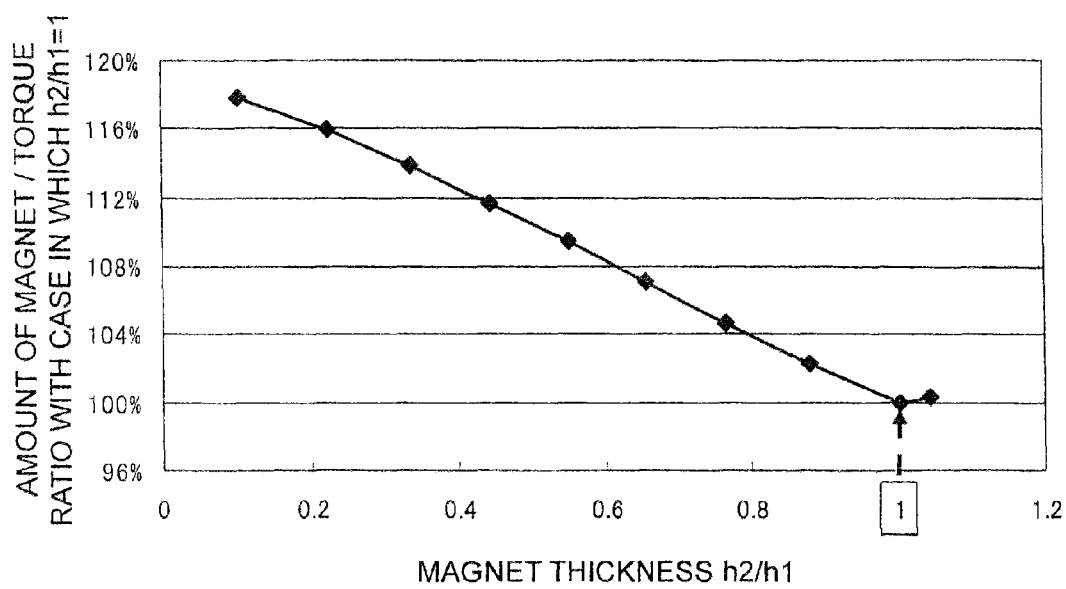
FIG. 35 is a graph showing the amount of magnet necessary for generating a unit torque related to the ratio h2/h1 of the magnet thicknesses h1 and h2 in Embodiment 6 of the invention.

FIG. 35 shows the amount of magnet necessary for generating a unit torque when h2/h1 is likewise changed. The amount of magnet necessary for generating a unit torque which is shown in FIG. 35 is normalized by the value obtained when h2/h1 is 1.0. It follows from FIG. 35 that the amount of magnet per unit torque is at a minimum when h2/h1 is about 1.0.

This is because where the thickness h1 of the magnet is equal to h2, the distance between the armature core and the field pole core becomes relatively small, the magnetic resistance of the portions where the permanent magnets are disposed is decreased, the induced voltage is increased, and the motor torque is increased. Therefore, it can be said that in order to reduce the amount of magnet necessary to generate a unit torque, it is desirable to set h2/h1 to about 1.0.

Figure 36:
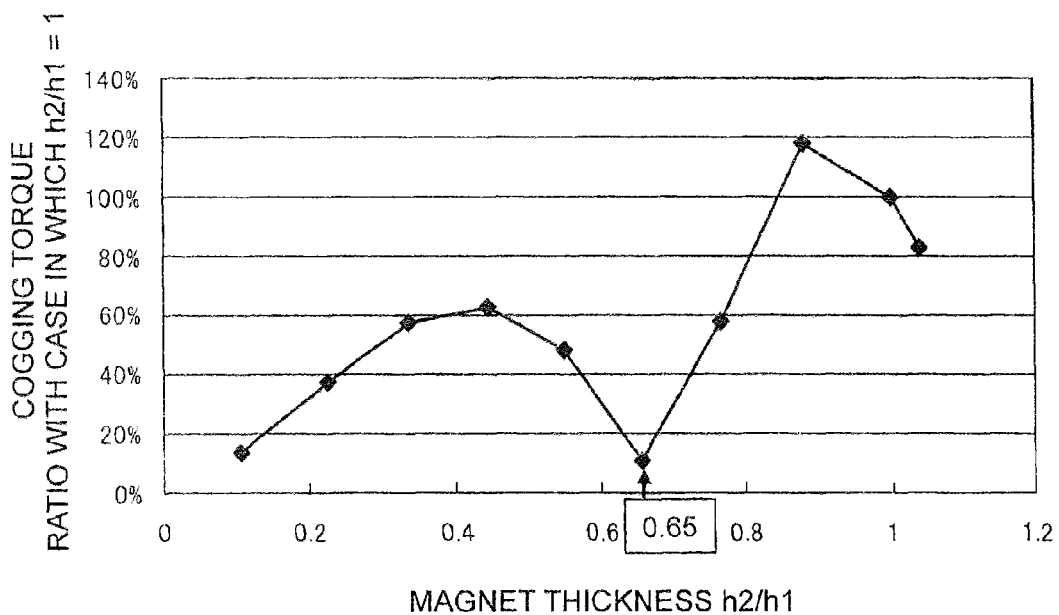
FIG. 36 is a graph showing the amplitude of cogging torque related to the ratio h2/h1 of the magnet thicknesses h1 and h2 in Embodiment 6 of the invention.

FIG. 36 shows the amplitude of the cogging torque generated in the brushless motor when h2/h1 is likewise changed. The cogging torque in FIG. 36 is normalized by the value obtained when h2/h1 is 1.0. It follows from FIG. 36, that where h2/h1 is made about 0.65, the cogging torque is minimized. Therefore, it can be said that in order to reduce the cogging torque generated in the brushless motor, it is desirable that h2/h1 be set to about 0.65.

Figure 37:
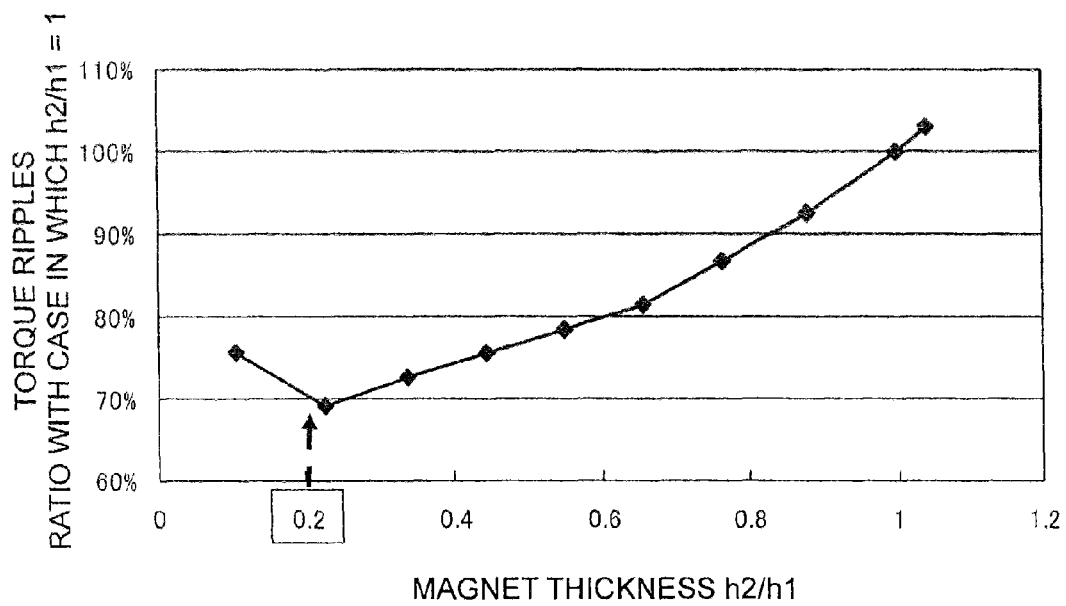
FIG. 37 is a graph showing the amplitude of torque ripples component related to the ratio h2/h1 of the magnet thicknesses h1 and h2 in Embodiment 6 of the invention.

Further, FIG. 37 shows the amplitude of torque ripples generated in the brushless motor when h2/h1 is likewise changed. The torque ripples shown in FIG. 37 are normalized by the value obtained when h2/h1 is 1.0. It follows from FIG. 37 that where h2/h1 is made about 0.2, the torque ripples are minimized. Therefore, it can be said that in order to reduce the torque ripples generated in the brushless motor, it is desirable that h2/h1 be set to about 0.2.

Figure 38:
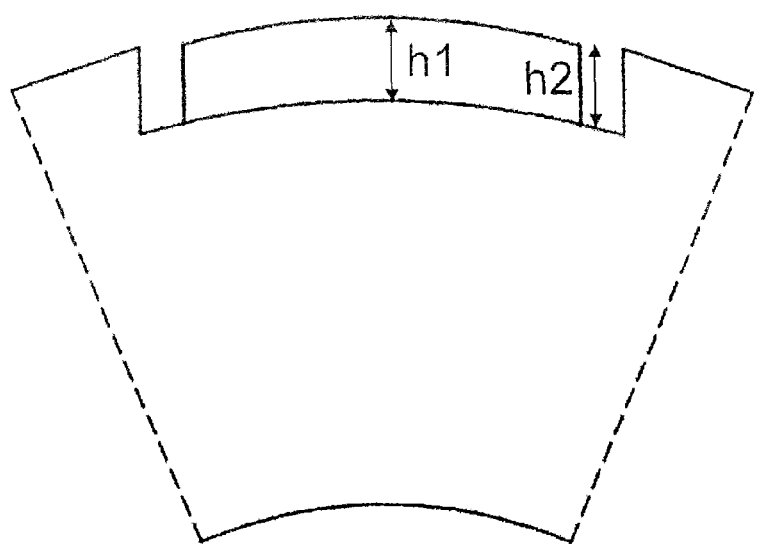
FIG. 38 is a cross-sectional view showing the configuration of a brushless motor in which the surface of the field pole core has a magnet attachment surface, a permanent magnet is attached by using an adhesive or the like to the magnet attachment surface, the field pole core has a protruding portion between the permanent magnets, the protruding portion projecting from the attachment surface of the permanent magnets in the direction from the center of the field pole core toward the armature core, the thickness in the center of the magnet is set to h1, and the thickness at the ends of the magnet is set to h2 in Embodiment 6 of the invention.

Further, the arguments same as in the above-described case are also valid in the case in which the surface of the field pole core has a magnet attachment surface, a permanent magnet is attached by using an adhesive or the like to the magnet attachment surface, the field pole core has a protruding portion between the permanent magnets, the protruding portion projecting from the attachment surface of the permanent magnets in the direction from the center of the field pole core toward the armature core, the thickness in the center of the magnet is set to h1, and the thickness at the ends of the magnet is set to h2, as shown in FIG. 38. This case is, however, different in that the field pole has the saliency of inductance and, therefore, a reluctance torque is generated.

Figure 39:
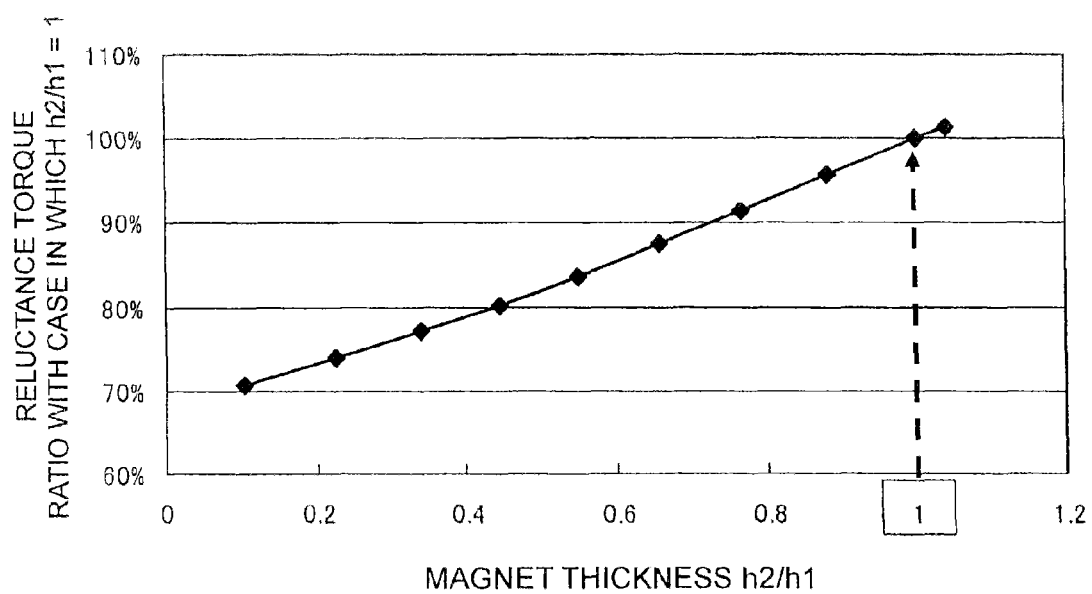
FIG. 39 is a graph showing the size of reluctance torque component related to the ratio h2/h1 of the magnet thicknesses h1 and h2 for the brushless motor shown in FIG. 15 in Embodiment 6 of the invention.

FIG. 39 shows the reluctance torque in the case in which h2/h1 is changed. The reluctance torque in FIG. 39 is normalized by the value obtained when h2/h1 is 1.0. It follows from FIG. 39 that when h2/h1 is 1.0, the reluctance torque is at a maximum.

Therefore, it can be said that in order to increase the reactance torque in the motor in which the surface of the field pole core has a magnet attachment surface, a permanent magnet is attached by using an adhesive or the like to the magnet attachment surface and the field pole core has a protruding portion between the permanent magnets, the protruding portion projecting from the attachment surface of the permanent magnets in the direction from the center of the field pole core toward the armature core, as shown in FIG. 38, it is desirable to set h2/h1 to 1.0.

Since the motor torque is represented by the magnet torque generated by the permanent magnets and the reluctance torque generated irrespectively of the permanent magnets, where the reluctance torque is increased, the amount of magnet necessary for generating a unit torque can be reduced.

It follows from the above that in Embodiment 6, where h2/h1 is adequately set, the motor torque is increased while increasing $E_{1p}/E_p$ and suppressing the same induced voltage peak, and by setting the harmonic component of the induced voltage to a value substantially equal to the harmonic component of the applied voltage, it is possible to inhibit the harmonic current flowing in the current i, reduce the amount of magnet necessary for generating a unit torque, reduce the cogging torque, and reduce the torque ripples.

Further, in the motor in which the surface of the field pole core has a magnet attachment surface, a permanent magnet is attached by using an adhesive or the like to the magnet attachment surface and the field pole core has a protruding portion between the permanent magnets, the protruding portion projecting from the attachment surface of the permanent magnets in the direction from the center of the field pole core toward the armature core, as shown in FIG. 38, the reluctance torque can be increased and the amount of magnet necessary for generating a unit torque can be reduced.

However, as indicated hereinabove, the value of h2/h1 at which the respective effects are remarkably demonstrated differs among the effects. Accordingly, it goes without saying that a more effective and desirable approach to increasing the performance of the brushless motor is in setting the h2/h1 value such as to obtain the aforementioned plurality of effects. For example, where h2/h1 is set to 0.2 to 1.0, or 0.2 to 0.7, or 0.2 to 0.65, or 0.65 to 0.1, or 0.65 to 0.7, or 0.7 to 1.0, the aforementioned plurality of effects can be demonstrated.

In a brushless motor having the field poles in which a plurality of permanent magnets is fixed to the surface of the field pole core and h2/h1 is 0.2 to 1.0, where h1 is the thickness of the permanent magnet in the center portion thereof and h2 is the thickness of the end portion, in addition to the above-described effects, it is possible to increase the motor torque, while increasing $E_{1p}/E_p$ and inhibiting the induced voltage peak, and by setting the harmonic component of the induced voltage to a value substantially equal to the harmonic component of the applied voltage, it is possible to inhibit the harmonic current flowing in the current i, reduce the amount of magnet necessary for generating a unit torque, reduce the cogging torque, and reduce the torque pulsations, which are the effects that could not be obtained in the conventional brushless motors.

Further, when the field pole core has a protruding portion between the permanent magnets, the protruding portion projecting from the attachment surface of the permanent magnets in the direction from the center of the field pole core toward the armature core, in addition to the above-described effects, the reluctance torque is increased and the amount of magnet necessary for generating a unit torque is reduced, which are the effects that could not be obtained in the conventional brushless motors.

Further, when the field pole core has a permanent magnet portion serving as the field pole 1 and a protruding portion serving as the field pole 2 with a polarity opposite that of the field pole 1, the field pole 1 and the field pole 2 are each produced equidistantly in the circumferential direction, the angle in the circumferential direction of the field pole core occupied by the N poles and S poles of the magnets is taken as an electrical angle of 360°, and the winding coil pitch is set to 180°, the even-order induced voltage can be reduced, the motor torque is increased, while $E_{1p}/E_p$ is increased and the same induced voltage peak is inhibited, and the cogging and ripples caused by the even-order induced voltage are reduced, which are the effects that could not be obtained in the conventional brushless motors.

Further, when a waveform in which a (2m+1)-th order harmonic (m is an integer equal to or greater than 1) is superimposed under the predetermined phase difference condition and amplitude condition, such that the 1st order fundamental wave peak of the induced voltage is made larger than the induced voltage peak, is obtained for the induced voltage generated in the armature windings between the terminals of the motor by the rotation of the field poles of the motor, the torque motor is increased, while further increasing $E_{1p}/E_p$ and inhibiting the same induced voltage peak, which are the effects that could not be obtained in the conventional brushless motors.

Further, when the 5th order harmonic component has a phase difference of 150° to 210° with the 1st order fundamental wave of the voltage in the case in which one period of the harmonic component is taken as 360°, and the ratio of the amplitude of the 5th order component to the amplitude of the 1st order fundamental wave of the voltage is made 2% to 12%, it is possible to increase, by comparison with the above-described case, the torque motor, while further increasing $E_{1p}/E_p$ and inhibiting the same induced voltage peak, which are the effects that could not be obtained in the conventional brushless motors.

Further, when the 5th order harmonic component and the 7th order harmonic component have a phase difference of 120° to 240° with the 1st order fundamental wave of the voltage in the case in which one period of the harmonic component is taken as 360°, and the ratio of the sum of the amplitudes of the 5th order component and the 7th order harmonic component to the amplitude of the 1st order fundamental wave of the voltage is made 2% to 36%, it is possible to increase the torque motor by comparison with that in the above-described case, while further increasing $E_{1p}/E_p$ and inhibiting the same induced voltage peak, which are the effects that could not be obtained in the conventional brushless motors.

Embodiment 7

Figure 40:
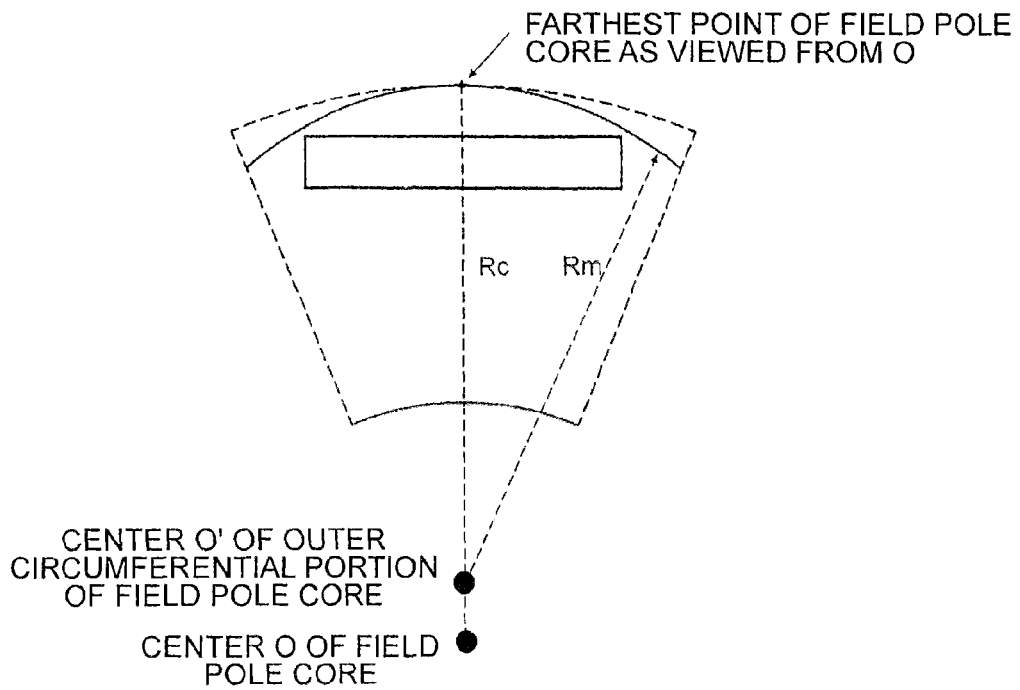
FIG. 40 is a cross-sectional view showing the configuration of one pole of the field poles of the brushless motor in Embodiment 7 of the invention.

FIG. 40 is an enlarged view showing one pole of the rotor of the brushless motor of Embodiment 7 of the invention. In FIG. 40, the brushless motor has a plurality of magnet holes for inserting permanent magnets into the field pole core. Where the permanent magnet is inserted into the magnet hole and the distance from the center of the field pole core to the farthest point of the field pole core is taken as Rc, most of the region of the outer circumferential portion of the field pole core follows a circular arc with a radius of about Rm.

In this case, with respect to the brushless motor shown in FIG. 40, the induced voltage E generated between the terminals of the motor shown in FIG. 4 by the rotation of the field poles can be represented by Eq. (6) above when the motor has a symmetrical structure for each magnetic pole.

Figure 41:
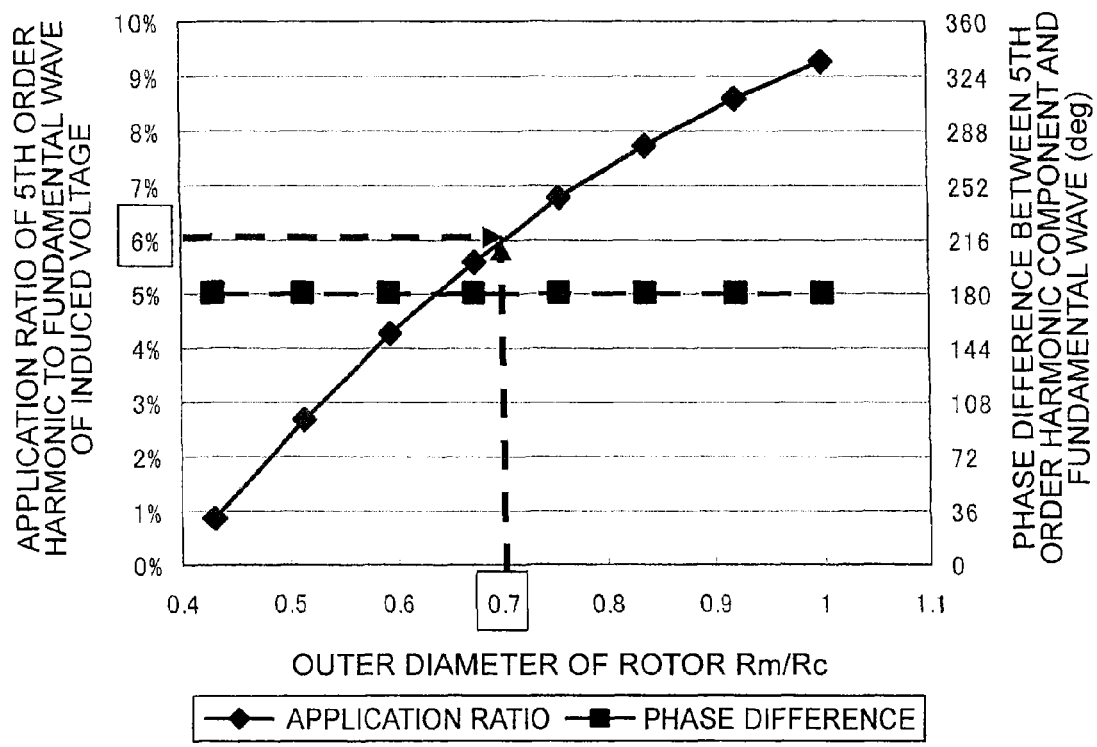
FIG. 41 is a graph showing the relationship between the peak $E_{5p}$ of the 5th order harmonic component of the induced voltage and the ratio Rm/Rc of the circular arcs Rm and Rc in Embodiment 7 of the invention.

FIG. 41 shows the relationship between the peak $E_{5p}$ and phase difference $\theta_{5e}$ of the 5th order harmonic component of the induced voltage and the ratio Rm/Rc in Embodiment 7. In this case, where the Rm/Rc ratio is considered such that the induced voltage $E_{1p}/E_p$ is increased, in the same manner as in Embodiment 6, it follows from FIG. 29 that $E_{5p}/E_{1p}$ is 6%, $\theta_{5e}$ is about 180 degrees, and $E_{1p}/E_p$ is almost at a maximum when Rm/Rc is about 0.7. It follows from the above that $E_{1p}/E_p$ can be increased by setting Rm/Rc to about 0.7 for the brushless motor shown in FIG. 40.

Further, in the above-described example, the case is considered in which the induced voltage E is represented by the sum of the 1st order fundamental wave component, 5th order harmonic component, and other harmonic component, as in Eq. (8), but the where Rm/Rc is adequately set, the same arguments are valid, as explained in Embodiment 6, even when the induced voltage is represented by the sum of the 1st order fundamental wave component, 5th order harmonic component, 7th order harmonic component, and other order component, as in Eq. (9).

Further, although it is not described hereinabove, the same effects can be also obtained when a (2 m+1)-th harmonic (m is an integer equal to or greater than 1) is applied to the brushless motor. Examples of the applied orders are 3rd, 9th, 11th, and 13th order harmonics. However, the problem arising when the induced voltage includes a 3(2k−1)-th order harmonic component (k is an integer equal to or greater than 1) is that a circulating current is generated in the case of the three-phase Δ connection. Therefore, the Y connection is preferred.

Figure 42:
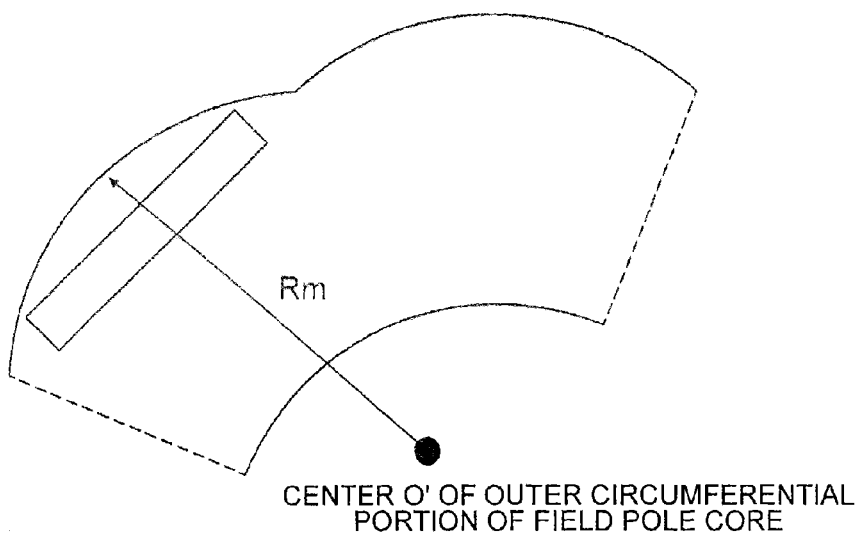
FIG. 42 is a cross-sectional view showing the configuration of the brushless motor of Embodiment 7 of the invention in which the field pole core has a permanent magnet portion serving as the field pole 1 and a protruding portion serving as the field pole 2 with a polarity opposite that of the field pole 1, and the field pole 1 and the field pole 2 are each produced equidistantly in the circumferential direction.

In a brushless motor in which the field pole core has a permanent magnet portion serving as the field pole 1 and a protruding portion serving as the field pole 2 with a polarity opposite that of the field pole 1, and the field pole 1 and the field pole 2 are each produced equidistantly in the circumferential direction, as shown in FIG. 42, the induced voltage E generated between the terminals of the motor shown in FIG. 4 by the rotation of the magnetic poles can be represented by the Eq. (10) above. Therefore, by performing full-pitch winding with a winding coil pitch of 180° when a pair of the N pole and S pole of field poles is at an electrical angle of 360°, it is possible to zero the even-order terms represented by Eq. (11) above. Thus, the same arguments as in the above-described case are valid.

In Embodiment 7, full-pitch winding with a winding coil pitch of 180° is performed when an angle occupied by a pair of the N pole and S pole of field poles in the circumferential direction of field poles is taken as an electrical angle of 360°. Therefore, the harmonic winding factor increases and the variation amount of the application rate of the 5th and 7th order harmonic of the induced voltage when Rm/Rc is changed can be increased. However, the same effect as described hereinabove can be also obtained in the case of concentrated winding in which the windings are wound in a concentrated manner on the teeth and when the coil pitch is set to a value other than 180°.

Further, in Embodiment 7, the 5th order harmonic component $V_{5p}$ is applied to the applied voltage of the brushless motor, but where the induced voltage or applied voltage is sufficiently larger than the drop of voltage on the inductance L or R in the circuit shown in FIG. 4, the induced voltage and applied voltage may be considered to be balanced.

Therefore, where the ratio $E_{5p}/E_{1p}$ of the 5th order harmonic component $E_{5p}$ of the induced voltage to the 1st order fundamental wave component $E_{1p}$ is made substantially equal to the ratio $V_{5p}/V_{1p}$ of the 5th order harmonic component $V_{5p}$ of the harmonic components of the applied voltage to the 1st order fundamental wave component $V_{1p}$, the voltages $E_{5p}$ and $V_{5p}$ cancel each other, the harmonic current flowing in the current i can be inhibited, and the torque ripples of the motor can be reduced.

It follows from Embodiment 1 that $V_{5p}/V_{1p}$ is set to 0.02 to 0.12, more desirably to 0.03 to 0.11, and even more desirably to 0.04 to 0.09. Therefore, it is also desirable that $E_{5p}/E_{1p}$ be set to 2% to 12%, more desirably to 3% to 11%, and even more desirably to 4% to 9%.

Here, considering the results shown in FIG. 29, it can be said that it is desirable that Rm/Rc in the brushless motor shown in FIG. 40 be set to 0.5 to 1.0, more desirably to 0.55 to 1.0, and even more desirably to 0.6 to 0.95. The same effect can be also obtained when an induced voltage of an order other than the 5th order is generated in the brushless motor, a voltage of the same order as the induced voltage is applied, and the ratio of the harmonic component of the induced voltage to the 1st order fundamental wave component is made substantially equal to the ratio of the harmonic component of the applied voltage to the 1st order fundamental wave component, although such a case is not described hereinabove.

Figure 43:
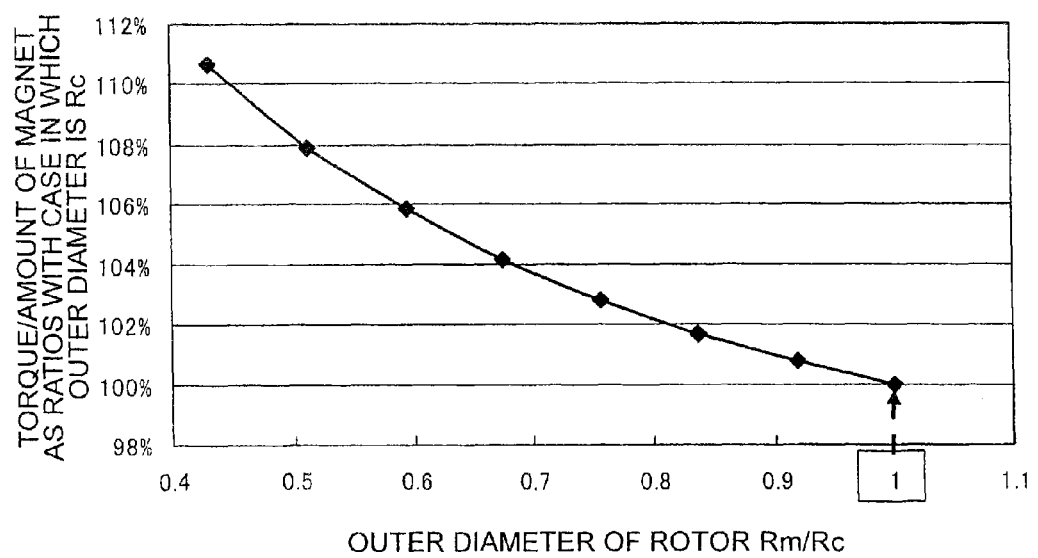
FIG. 43 is a graph showing the amount of magnet necessary for generating a unit torque versus the ratio Rm/Rc of the circular arcs Rm and Rc in Embodiment 7 of the invention.

Further, FIG. 43 shows the amount of magnet necessary for generating a unit torque when Rm/Rc is likewise changed. The amount of magnet necessary for generating a unit torque which is shown in FIG. 43 is normalized by the value obtained when Rm/Rc is 1.0. It follows from FIG. 43 that the amount of magnet per unit torque is at a minimum when Rm/Rc is 1.0.

This is because where the radius Rm is equal to Rc, the distance between the armature core and the field pole core becomes relatively small, the magnetic resistance of the air gap is decreased, the induced voltage is increased, and the motor torque is increased. Therefore, it can be said that in order to reduce the amount of magnet necessary to generate a unit torque, it is desirable to set Rm/Rc to about 1.0.

Figure 44:
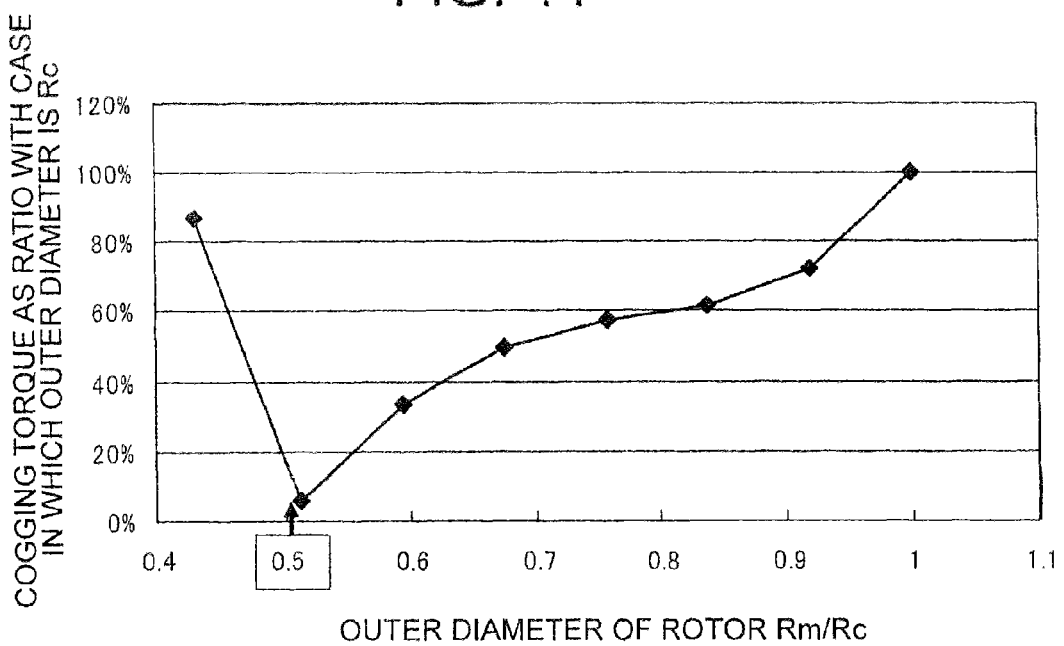
FIG. 44 is a graph showing the amplitude of cogging torque versus the ratio Rm/Rc of the circular arcs Rm and Rc in Embodiment 7 of the invention.

FIG. 44 shows the amplitude of the cogging torque generated in the brushless motor when Rm/Rc is likewise changed. The cogging torque in FIG. 44 is normalized by the value obtained when Rm/Rc is 1.0. It follows from FIG. 44, that where Rm/Rc is made about 0.5, the cogging torque is substantially at a minimum. Therefore, it can be said that in order to reduce the cogging torque generated in the brushless motor, it is desirable that Rm/Rc be set to 0.5.

Figure 45:
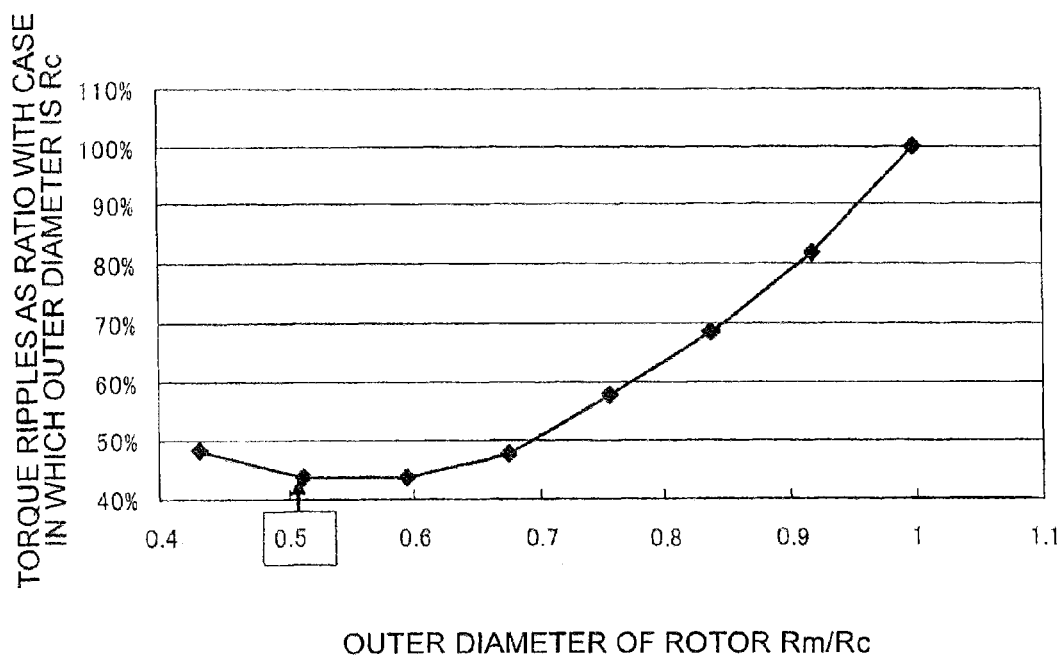
FIG. 45 is a graph showing the amplitude of torque ripples component versus the ratio Rm/Rc of the circular arcs Rm and Rc in Embodiment 7 of the invention.

Further, FIG. 45 shows the amplitude of torque ripples generated in the brushless motor when Rm/Rc is likewise changed. The torque ripples shown in FIG. 45 are normalized by the value obtained when Rm/Rc is 1.0. It follows from FIG. 45 that where Rm/Rc is made 0.5, the torque ripples are substantially at a minimum. Therefore, it can be said that in order to reduce the torque ripples generated in the brushless motor, it is desirable that Rm/Rc be set to 0.5.

Figure 46:
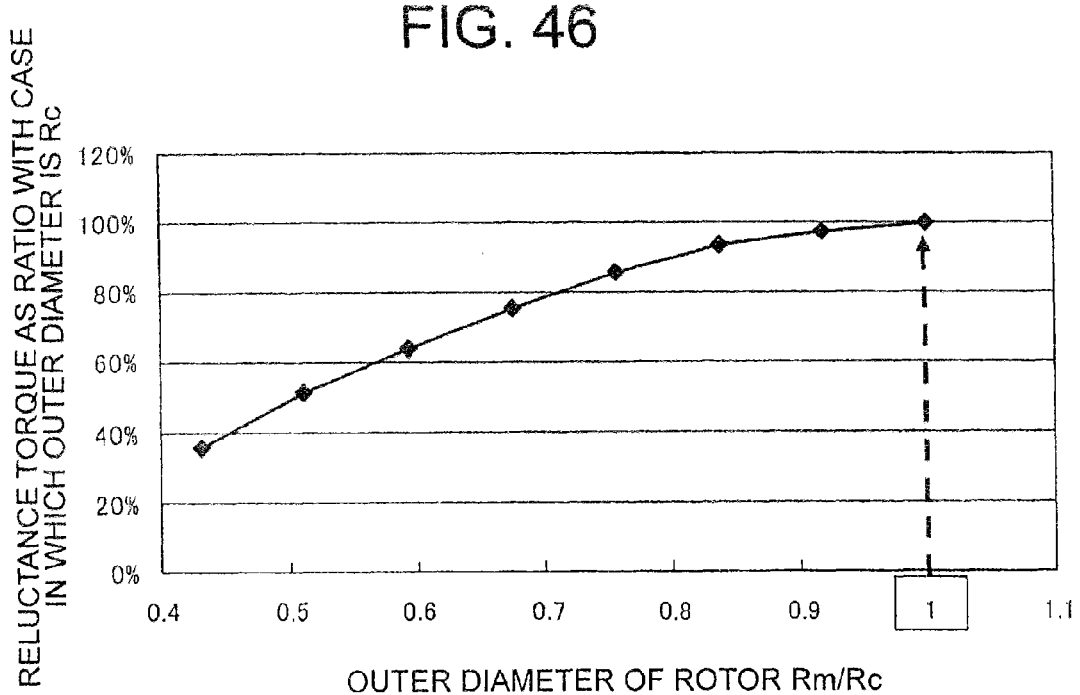
FIG. 46 is a graph showing the value of reluctance torque versus the ratio Rm/Rc of the circular arcs Rm and Rc in Embodiment 7 of the invention.

FIG. 46 shows the reluctance torque generated in the brushless motor in the case in which Rm/Rc is changed. The reluctance torque shown in FIG. 46 is normalized by the value obtained when Rm/Rc is 1.0. It follows from FIG. 46 that when Rm/Rc is 1,0, the reluctance torque is substantially at a maximum. Therefore, it can be said that in order to increase the reluctance torque, it is desirable that Rm/Rc be set to 1.0.

Since the motor torque is represented by the magnet torque generated by the permanent magnets and the reluctance torque generated irrespectively of the permanent magnets, where the reluctance torque is increased, the amount of magnet necessary for generating a unit torque can be reduced.

Figure 47:
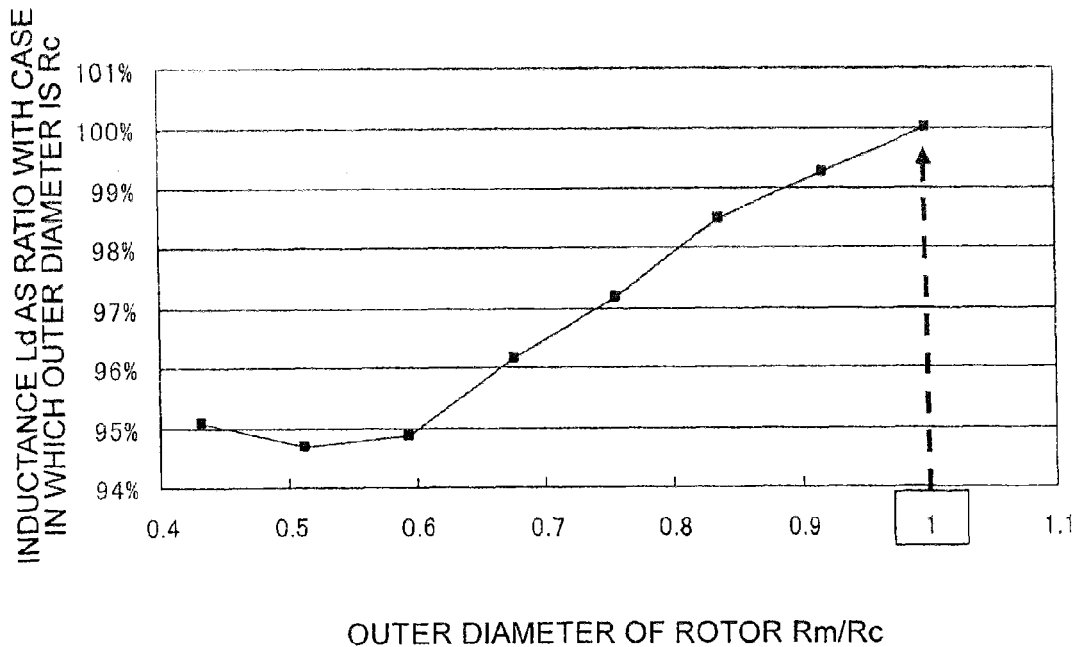
FIG. 47 is a graph showing the value of the d-axis component of inductance versus the ratio Rm/Rc of the circular arcs Rm and Rc in Embodiment 7 of the invention.

FIG. 47 shows the inductance Ld in the d-axis direction of the brushless motor in the case in which Rm/Rc is likewise changed. The inductance Ld shown in FIG. 47 is normalized by the value obtained when Rm/Rc is 1.0. It follows from FIG. 47 that when Rm/Rc is 1.0, the d-axis component of the inductance is at a maximum.

Typically, where the d-axis component of the inductance increases, it is possible to increase the effect of canceling the induced voltage E generated between the terminals of the motor shown in FIG. 4 by the rotation of the field poles when the d-axis current is energized, and the current contributing to the torque which flows in the motor can be increased and the torque in a high-revolution region can be also increased. Therefore, the maximum revolution speed in the idle drive of the motor and the output during high-speed rotation are increased.

Therefore, a large inductance is desirable for increasing the maximum revolution speed in the idle drive of the motor and the output during high-speed rotation. As a consequence, it can be said that it is desirable to set Rm/Rc to 1.0 in order to increase the inductance Ld.

It follows from the above that in Embodiment 7, where Rm/Rc is adequately set, the motor torque is increased while increasing $E_{1p}/E_p$ and suppressing the same induced voltage peak, and by setting the harmonic component of the induced voltage to a value substantially equal to the harmonic component of the applied voltage, it is possible to inhibit the harmonic current flowing in the current i, reduce the amount of magnet necessary for generating a unit torque, reduce the cogging torque, reduce the torque ripples, increase the reluctance torque, and increase the d-axis inductance.

However, as indicated hereinabove, the values of Rm/Rc at which the respective effects are remarkably demonstrated differ among the effects. Accordingly, it goes without saying that a more effective and desirable approach to increasing the performance of the brushless motor is in setting the Rm/Rc value such as to obtain the aforementioned plurality of effects. For example, where Rm/Rc is set to 0.5 to 1.0, or 0.5 to 0.7, or 0.7 to 1.0, the aforementioned plurality of effects can be demonstrated.

As described hereinabove, in a brushless motor which has magnet holes for inserting permanent magnets into a field pole core and has field poles obtained by inserting a plurality of permanent magnets into the magnet holes and fixing the permanent magnets, where the distance from the center of the field pole core to the farthest point of the field pole core is taken as Rc, most of the region of the outer circumferential portion of the field pole core follows a circular arc with a radius of about Rm, and where Rm/Rc is set to 0.5 to 1.0, it is possible to increase the motor torque, while increasing $E_{1p}/E_p$ and inhibiting the induced voltage peak, reduce the amount of magnet necessary for generating a unit torque, reduce the cogging torque, reduce the torque pulsations, increase the inductance, and increase the maximum revolution speed during idle drive of the motor or the output during high-speed revolution which are the effects that could not be obtained in the conventional brushless motors.

Further, when the field pole core has a permanent magnet portion serving as the field pole 1 and a protruding portion serving as the field pole 2 with a polarity opposite that of the field pole 1, the field pole 1 and the field pole 2 are each produced equidistantly in the circumferential direction, the angle in the circumferential direction of the field pole core occupied by the N poles and S poles of the magnets is taken as an electrical angle of 360°, and the winding coil pitch is set to 180°, the even-order induced voltage can be reduced, the motor torque is increased, while $E_{1p}/E_p$ is increased and the same induced voltage peak is inhibited, and the cogging and ripples caused by the even-order induced voltage are reduced, which are the effects that could not be obtained in the conventional brushless motors.

Further, when a waveform in which a (2m+1)-th order harmonic (m is an integer equal to or greater than 1) is superimposed on the 1st order fundamental wave of the induced voltage under the predetermined phase difference condition and amplitude condition, such that the 1st order fundamental wave peak of the induced voltage is made larger than the induced voltage peak, is obtained for the induced voltage generated in the armature windings between the terminals of the motor by the rotation of the field poles of the motor, the torque motor is increased, while further increasing $E_{1p}/E_p$ and inhibiting the same induced voltage peak, which are the effects that could not be obtained in the conventional brushless motors.

Further, when the 5th order harmonic component has a phase difference of 150° to 210° with the 1st order fundamental wave of the voltage in the case in which one period of the harmonic component is taken as 360°, and the ratio of the amplitude of the 5th order component to the amplitude of the 1st order fundamental wave of the voltage is made 2% to 12%, it is possible to increase the torque motor by comparison with the above-described case, while further increasing $E_{1p}/E_p$ and inhibiting the same induced voltage peak, which are the effects that could not be obtained in the conventional brushless motors.

Further, when the 5th order harmonic component and the 7th order harmonic component have a phase difference of 120° to 240° with the 1st order fundamental wave of the voltage in the case in which one period of the harmonic component is taken as 360°, and the ratio of the sum of the amplitudes of the 5th order component and the 7th order harmonic component to the amplitude of the 1st order fundamental wave of the voltage is made 2% to 36%, it is possible to increase the torque motor by comparison with the above-described case, while further increasing $E_{1p}/E_p$ and inhibiting the same induced voltage peak, which are the effects that could not be obtained in the conventional brushless motors.

Embodiment 8

Where the voltage V shown in FIG. 10 is applied between the motor terminals as described in Embodiment 1, the electric current i flowing in each armature winding 11 of the motor has a waveform including the 5th order harmonic component and the 7th order harmonic component as shown in FIG. 11. Accordingly, when the motor is operated such that the interlinkage magnetic flux represented by Eq. (3) above is interlinked with the armature windings 11 of the motor in the phase relationship shown in FIG. 12, the torque waveform has the 6th order harmonic component of torque ripples relating to one period of the electrical angle as shown in FIG. 13.

Meanwhile, the magnetic flux $\phi_m$ interlinked with the armature windings 11 between the motor terminals by the rotation of the field poles of the brushless motor 1 in Embodiment 8 of the invention is represented by the following Eq. (12).

(Formula 12)

$$\phi_m = \phi_{m1} \sin(\omega t) + \phi_{m5} \sin(5\omega t + \theta_{m5}) + \phi_{m7} \sin(7\omega t + \theta_{m7}) \quad (12)$$

In Eq. (12), the magnetic flux $\phi_m$ is represented by the sum of the 1st order fundamental wave component, 5th order harmonic component, and 7th order harmonic component.

Further, $\phi_{m1}$, $\phi_{m5}$, and $\phi_{m7}$ denote the peaks of the waveforms of respective harmonics, and $\phi_{m5}$ and $\phi_{m7}$ denote the phase difference between the 1st order fundamental wave component and the 5th order harmonic component, and between the 1st order fundamental wave component and the 7th order harmonic component, respectively.

Figure 48:
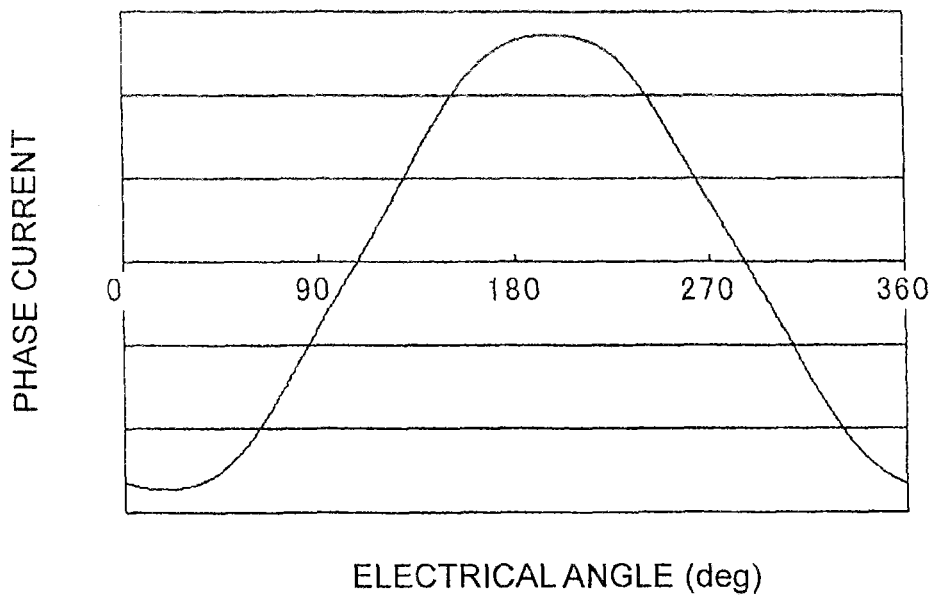
FIG. 48 is another explanatory drawing showing the current flowing in each armature winding of the motor when the voltage shown in FIG. 10 is applied between the motor terminals in Embodiment 8 of the invention.
Figure 48:
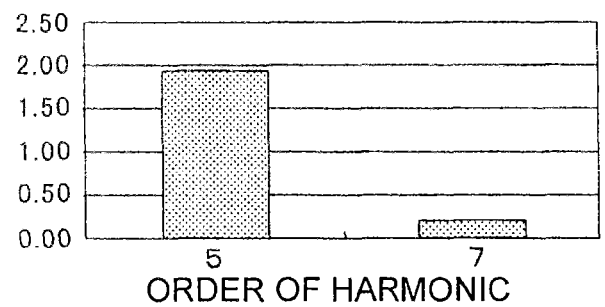
Figure 48:
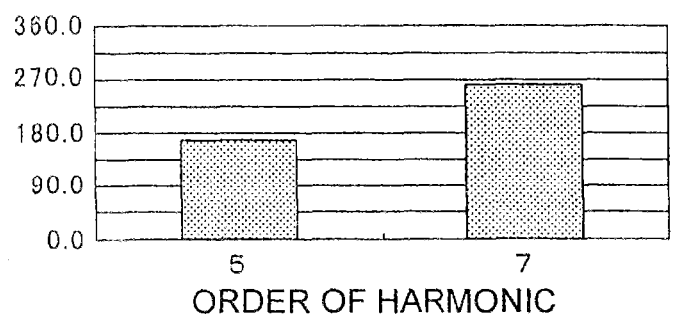

When the voltage V including the 5th order harmonic component, which is the applied voltage in the drive method of Embodiment 1 illustrated by FIG. 10, is applied to the brushless motor 1 having such magnetic flux $\phi_m$ interlinked with the armature windings 11, the current i flowing in the armature windings 11 of the motor is determined by the voltage equation represented by Eq. (1) above and has a waveform including the 5th order harmonic component and 7th order harmonic component such as shown in FIG. 48.

Figure 49:
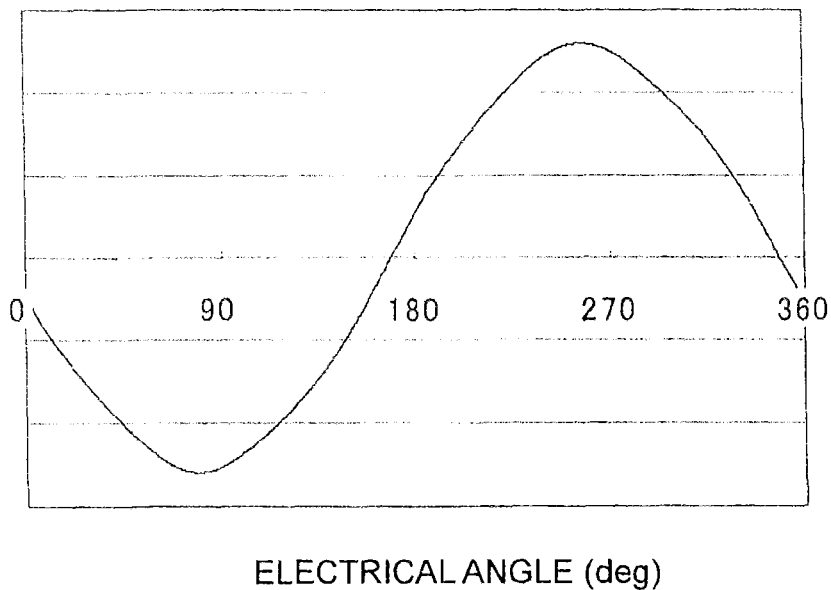
FIG. 49 is an explanatory drawing showing the magnetic flux interlinked with each armature winding of the motor in the case in which the interlinkage magnetic flux is a sum of the 1st order fundamental wave component and a harmonic component in Embodiment 8 of the invention.
Figure 49:
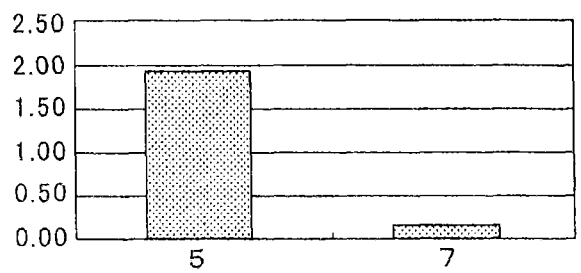
Figure 49:
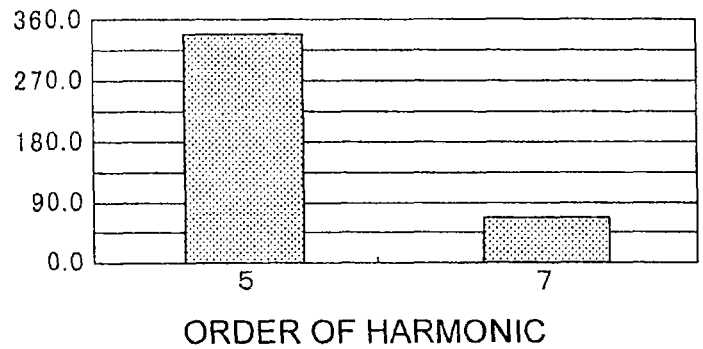
Figure 50:
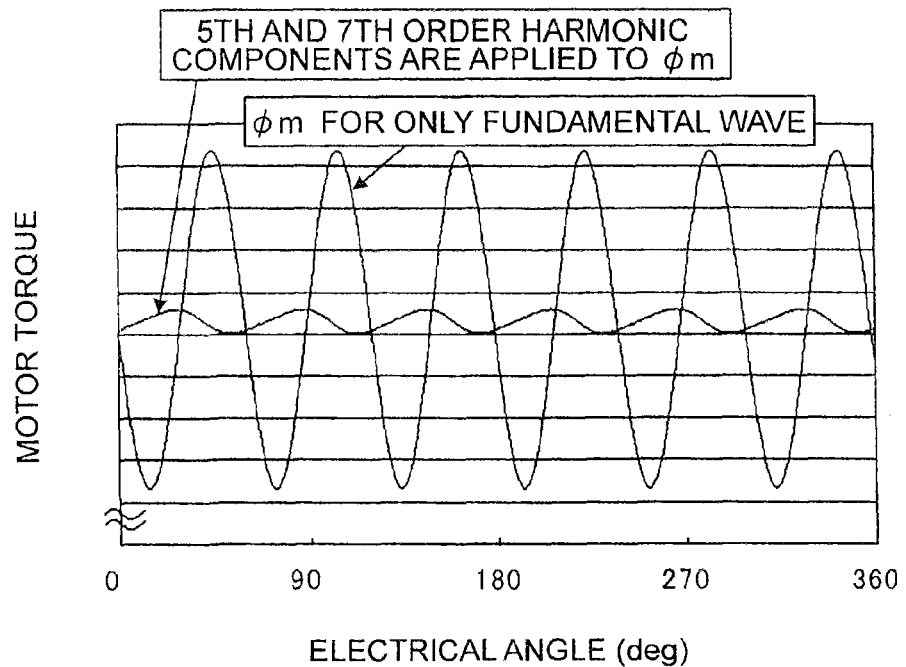
FIG. 50 is an explanatory drawing showing a torque waveform in the case in which the interlinkage magnetic flux is a sum of the 1st order fundamental wave component and a harmonic component in Embodiment 8 of the invention.

Further, when the motor is operated such that the interlinkage magnetic flux represented by Eq. (12) above interlinks with the armature windings 11 of the motor with a phase relationship shown in FIG. 49, the torque waveform becomes such as shown in FIG. 50. In this case, the torque waveform shown in FIG. 13 and described in Embodiment 1 is also shown at the same scale in FIG. 50. It follows from FIG. 50 that by including $\phi_{m5}$ and $\phi_{m7}$ in the magnetic flux $_m$, it is possible to reduce the 6th order harmonic component of torque ripples relating to one period of the electrical angle.

This can be explained as follows. In the torque waveform shown in FIG. 13, the magnetic flux $\phi_m$ has only the 1st order fundamental wave component, and the current i includes the 5th and 7th order harmonic components at the amplitudes $i_5$ and $i_7$, respectively. Therefore, the 6th order harmonic component $T_{6f}$ of torque ripples is generated in the torque, which is proportional to the magnetic flux $\phi_m$ and current i, whereas in the torque waveform shown in FIG. 50, the 5th and 7th order harmonic components are also present in the magnetic flux $\phi_m$ and, therefore, the 6th order harmonic component $T_{6f}$ is canceled.

More specifically, in the torque waveform shown in FIG. 13, the 6th order harmonic component $T_{6f}$ of torque ripples is represented by the following Eq. (13) for the torque, which is proportional to the magnetic flux $\phi_m$ and current i, whereas in the torque waveform shown in FIG. 50, the 6th order harmonic component $T_{6f}$ of torque ripples is represented by the following Eq. (14) for the torque, which is proportional to the magnetic flux $\phi_m$ and current i.

(Formula 13)

$$T_{6f} \propto \phi_{m1} i_5 \sin(6\omega t + \theta_{i5}) + \phi_{m1} i_7 \sin(6\omega t + \theta_{i7}) \quad (13)$$

(Formula 14)

$$T_{6f} \propto \phi_{m1} i_5 \sin(6\omega t + \theta_{i5}) + \phi_{m1} i_7 \sin(6\omega t + \theta_{i7}) + \phi_{m5} i_1 \sin(6\omega t + \theta_{m5} + \beta) + \phi_{m7} i_1 \sin(6\omega t + \theta_{m7} + \beta) \quad (14)$$

In Eqs. (13) and (14), $\theta_{i5}$ and $\theta_{i7}$ stand for a phase difference between the 5th and 7th order harmonic components and the 1st order fundamental wave component of electric current, and β stands for a phase difference between the 1st order fundamental wave component of the magnetic flux $\phi_m$ and the 1st order fundamental wave component of the electric current i. It follows from Eq. (14) that the 6th order harmonic component $T_{6f}$ of torque ripples of Eq. (13) is canceled in the third and fourth terms.

Thus, it can be said that in order to inhibit the 6th order harmonic component $T_{6f}$ of torque ripples of the motor, it is desirable that the magnetic flux $\phi_m$ be provided such that reduces the 6th order harmonic component $T_{6f}$ of torque ripples of the motor. As for the method for providing the magnetic flux $\phi_m$, it is desirable that adequate amounts of $\phi_{m5}/\phi_{m1}$ and $\phi_{m7}/\phi_{m1}$ and also $\theta_{m5}$ and $\theta_{m7}$ be provided.

Figure 51:
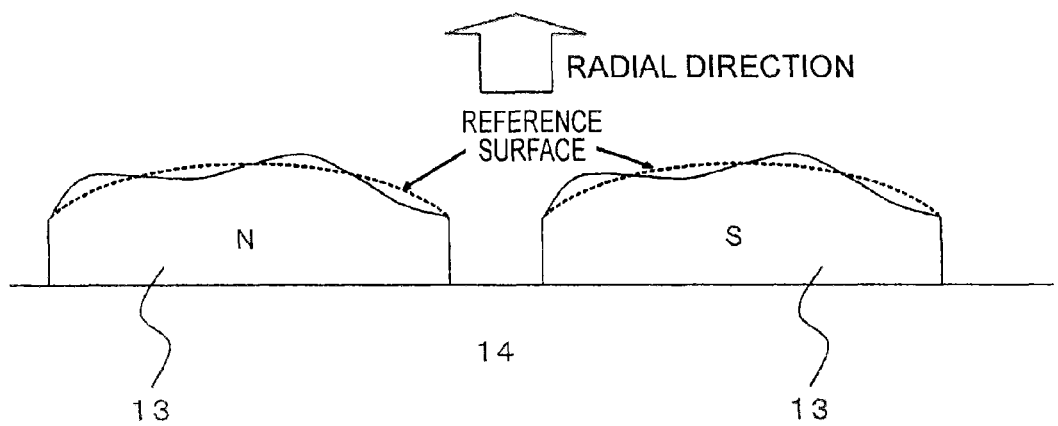
FIG. 51 is an explanatory drawing showing, with linear expansion, a field pole core and a permanent magnet of one period of the electrical angle that is provided in the field pole core in Embodiment 8 of the invention.

FIG. 51 shows an example of the brushless motor having the interlinkage magnetic flux $\phi_m$ between the terminals of the motor provided with the abovementioned adequate amounts of $\phi_{m5}/\phi_{m1}$ and $\phi_{m7}/\phi_{m1}$ and also $\theta_{m5}$ and $\theta_{m7}$. FIG. 51 is an expansion view showing, with linear expansion, one period of the electrical angle for a field pole core 14 and a permanent magnet 13 provided in the field pole core 14 of a motor of a surface magnet type in Embodiment 8 of the invention. A plurality of portions protruding and receding with respect to a reference surface are provided on the surface of the permanent magnet 13.

Figure 52:
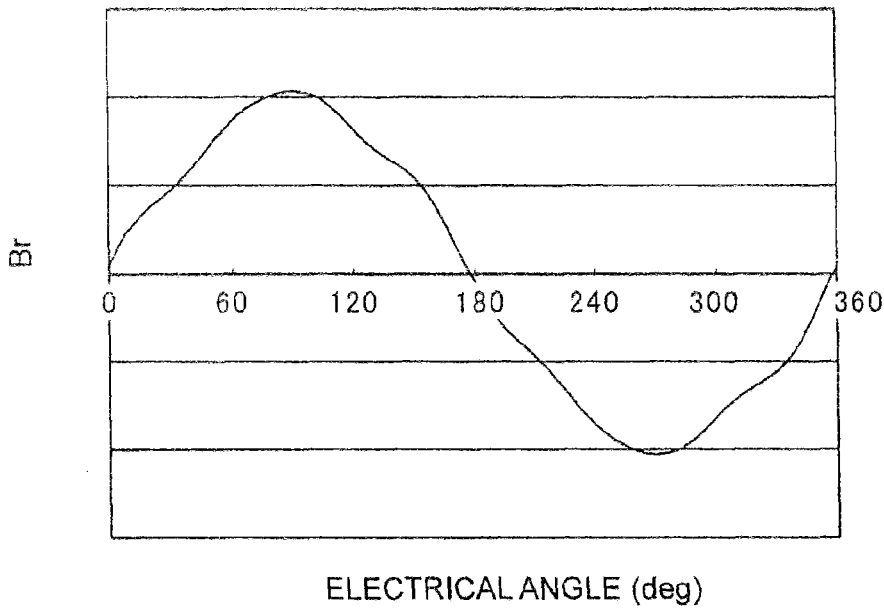
FIG. 52 is an explanatory drawing showing the waveform of a spatial magnetic flux density in the radial direction in a gap between the field pole and the armature in Embodiment 8 of the invention.
Figure 52:
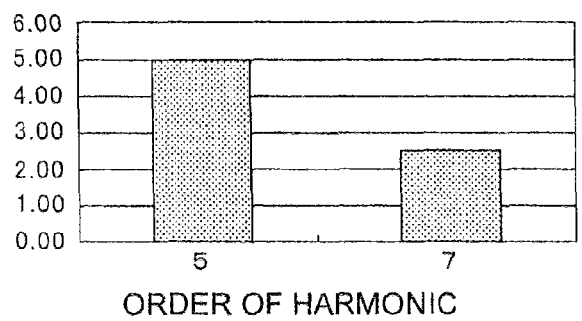
Figure 52:
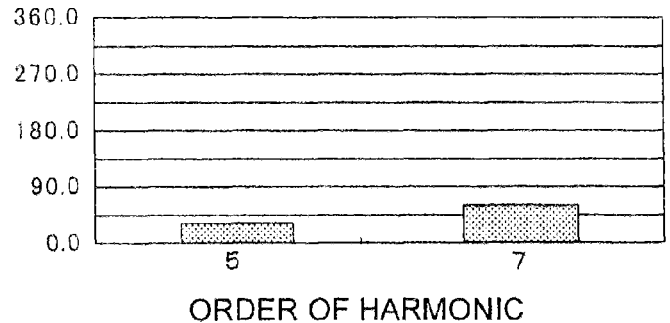

FIG. 52 shows the waveform of a spatial magnetic flux density Br in the radial direction in a gap between the field pole and armature in the magnet. As follows from FIG. 52, the Br waveform can be given by the following Eq. (15).

(Formula 15)

$$Br(\theta_b,t)=B_{b1}\sin(\theta_b-\omega t)+B_{b5}\sin(5\theta_b-5\omega t+\theta_{b5})+B_{b7}\sin(7\theta_b-7\omega t+\theta_{b7}) \quad (15)$$

In Eq. (15), $B_{b1}$, $B_{b5}$, and $B_{b7}$ stand for peaks of the waveforms of each other related to the electrical angle, $\theta_b$ stands for an electrical angle phase, $\theta_{5b}$ and $\theta_{b7}$ stand for a phase difference between the 5th order harmonic component and the 1st order fundamental wave and between the 7th order harmonic component and the 1st order fundamental wave, respectively, and wt stands for the motor revolution. When such gap Br waveform is provided, where the leak magnetic flux is ignored, the magnetic flux represented by the following Eq. (16) may be found to be interlinked with the armature windings 11 between the terminals of the brushless motor 1.

(Formula 16)

$$\phi_m(t)=A\int Br(\theta_b,t)d\theta_b \quad (16)$$

In Eq. (16), A stands for a proportional coefficient determined by the axial length or pole slot combination. In this case, the Br waveform of Eq. (15) is represented as a sum of triangular functions, and the order with respect to the timing t does not change despite the integration. Therefore, $\phi_m$ in Eq. (16) can be represented as a sum of the 5th order harmonic component and 7th order harmonic component represented by Eq. (12).

Therefore, where $B_{b5}$, $B_{b7}$ and $\theta_{105}$, $\theta_{b7}$ of the Br waveform are determined, it is possible to determine the corresponding harmonic frequencies of $\phi_m$. In addition, since the Br waveform between the field pole and the armature is proportional to the magnetomotive force of the permanent magnet 13, $B_{b5}$, $B_{b7}$ and $\theta_{b5}$, $\theta_{b7}$ of the Br waveform in Eq. (15) can be determined by the level of a plurality of protrusions and depressions on the surface of the permanent magnet 13 shown in FIG. 51. It follows from the above that the motor structure shown in FIG. 51 makes it possible to apply the adequate amounts of $\phi_{m5}/\phi_{m1}$ and $\theta_{m7}/\phi_{m1}$ and also $\theta_{m5}$ and $\theta_{m7}$.

As indicated herein above, in Embodiment 8, a plurality of portions protruding and receding with respect to the reference surface is provided on the permanent magnet surface and a harmonic component is included in the gap magnetic flux density in the radial direction in the gap between the field poles and the armature. Therefore, a magnetic flux for which the phase difference and amplitude of the 5th order harmonic component and 7th order harmonic component of the magnetic flux related to the 1st order fundamental wave of the magnetic flux are set under the predetermined conditions such as to cancel the 6th order harmonic component of torque ripples that is generated by the interaction of the harmonic component of the voltage applied to the armature windings and the 5th order harmonic component and 7th order harmonic component of the magnetic flux interlinked with the armature windings is interlinked with the armature windings.

Therefore, since the magnetic flux $\phi_m$ is provided such as to reduce the 6th order harmonic component $T_{6f}$ of torque ripples of the motor, it is possible to inhibit the 6th order harmonic component $T_{6f}$ of torque ripples of the motor, and the motor vibrations and noise can be suppressed, while increasing the torque and output of the motor.

In Embodiment 8, the case is explained in which the 5th order harmonic component is included in the applied voltage, as in the above-described Embodiment 1, but such a feature is not limiting, and the same effect can be also obtained when the 7th order harmonic component is included in the applied voltage, as in the above-described Embodiment 2.

Further, in Embodiment 8, a plurality of portions protruding and receding with respect to the reference surface is provided on the surface of the permanent magnet 13 and a harmonic component is included in the gap magnetic flux density Br in the radial direction in the gap between the field pole and the armature in order to apply the adequate amounts of $\phi_{m5}/\phi_{m1}$ and $\phi_{m7}/\phi_{m1}$ and also $\theta_{m5}$ and $\theta_{m7}$. However, such a configuration is not limiting, and the same effect can be also obtained when the magnetization direction or magnetization amount of the magnets is controlled, the motor permeance is changed by changing the shape of the stator and rotor, and a harmonic component is included in the gap magnetic flux density Br in the radial direction in the gap between the field poles and the armature. Further, the motor of a surface magnet type is described by way of example, but the same effect can be also obtained in a motor with embedded magnet, provided that a harmonic component is included in the gap magnetic flux density Br in the radial direction in the gap between the field poles and the armature.

Further, the same effect can be also obtained when the armature windings of all phases are Y connected as shown in FIG. 24, as in the above-described Embodiment 3.

The same effect can be also obtained and the 6th order harmonic component of torque ripples can be inhibited in the operation region in which the applied voltage V is equal to the maximum interphase voltage peak $V_{max}$ that can be outputted by the external AC voltage source, as in the above-described Embodiment 4.

Further, the same effect can be also obtained in the case in which a combination of one or more DC voltage sources and two or more frequency converters that convert a DC voltage into a frequency-variable AC voltage is used as the external AC voltage source, as in the above-described Embodiment 5.

Embodiment 9

In Embodiments 1 to 8, the brushless motor and the drive method for the brushless motor are explained, but an electric power steering device may be also configured by generating a torque assisting the steering torque with the brushless motor and the drive method for the brushless motor.

Figure 53:
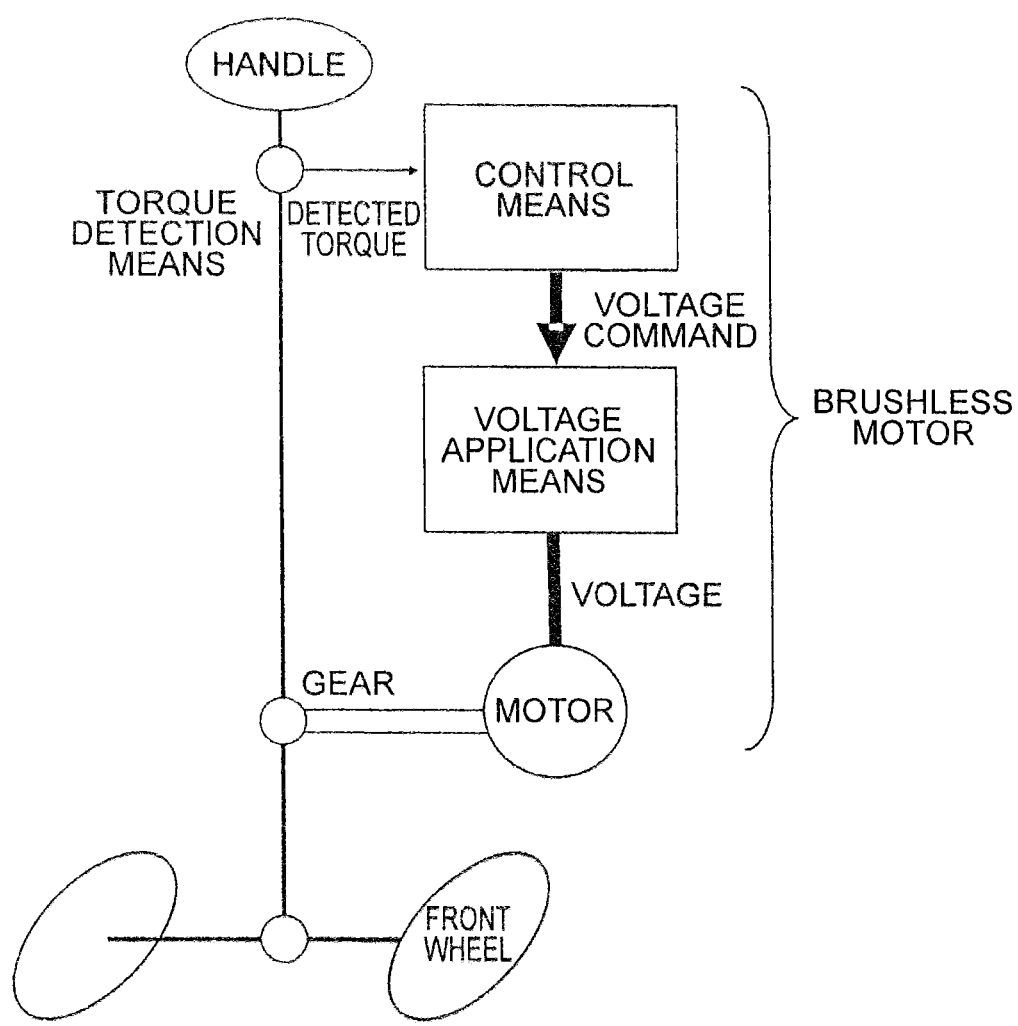
FIG. 53 is an explanatory drawing showing a power steering device in which an assist torque is generated by the brushless motor and the drive method for the brushless motor described in Embodiments 1 to 8 of the invention.

FIG. 53 shows an electric power steering device in which an assist torque is generated with the brushless motor and the drive method for the brushless motor of Embodiment 9. The driver steers the front wheels by rotating a handle to the left or to the right.

In the configuration shown in FIG. 53, a torque detection means detects the steering torque of a steering system and outputs the detected torque to a control means. The control means computes a voltage command such that the motor generates a torque assisting the steering torque of the steering system according to the drive method for the brushless motor and outputs the computed voltage command to a voltage application means. The voltage application means applies a voltage to the motor on the basis of the voltage command, and the motor generates a torque assisting the steering torque through a gear.

In the electric power steering device provided with the brushless motor described in Embodiment 9, torque pulsations in the motor are reduced. Therefore, pulsations felt when the handle is steered can be reduced, the steering feeling of the driver can be improved, and noise during the steering can be reduced.

Further, the voltage application device can be designed for a reduced resistance to the induced voltage applied from the motor. Therefore, the voltage application device can be reduced in size and weight and the electric power steering deice can be also reduced in size and weight.

Further, since the output of the motor drive device can be increased and the amount of magnet per unit torque can be reduced, the electric power steering deice can be reduced in size and weight, and the rated torque necessary during the near-end steering can be increased.

Explanation of Reference Numerals 1-brushless motor, 2-external AC voltage source, 11-armature winding, 12-armature core, 13-permanent magnet, 14-field pole core, 21-DC voltage source, 22, 23-frequency converters, 31-fundamental wave voltage application unit, 32-5th order harmonic voltage command unit, 33-5th order harmonic voltage superposition unit, 34-7th order harmonic voltage command unit, 35-7th order harmonic voltage superposition unit

The invention claimed is:

1. A brushless motor comprising an armature constituted by an armature core having armature windings of a plurality of phases, and a field pole constituted by a field pole core having a plurality of permanent magnets, wherein
 a voltage, in which at least either of a 5th order harmonic component and a 7th order harmonic component is superimposed on a 1st order fundamental wave of an applied voltage under a predetermined phase difference condition and an amplitude condition such that a 1st order fundamental wave peak of the applied voltage is made larger than an applied voltage peak, is applied to the armature windings;
 a harmonic voltage superimposed on the armature windings is the 5th order harmonic component; and
 the 5th order harmonic component has a phase difference of 150° to 210° with the 1st order fundamental wave of the voltage, where one period of the high-order harmonic component is taken as 360°, and a ratio of an amplitude of the 5th order harmonic component to an amplitude of the 1st order fundamental wave of the voltage is 2% to 12%.

2. The brushless motor according to claim 1, wherein the voltage applied to the armature windings is determined by a maximum value of a peak value of a voltage that can be supplied to the armature windings from an external AC voltage source.

3. The brushless motor according to claim 1, wherein the voltage is applied to the armature windings by an external AC voltage source constituted by a combination of one or more DC voltage sources and two or more frequency converters each converting a DC voltage into a frequency-variable AC voltage.

4. The brushless motor according to claim 1, comprising a field pole in which a plurality of permanent magnets is fixed to a surface of the field pole core, wherein h2/h1 is 0.2 to 1.0, where h1 is a thickness of a center portion of each of the permanent magnets and h2 is a thickness of an end portion thereof.

5. The brushless motor according to claim 4, wherein the field pole core has a protruding portion between the permanent magnets, the protruding portion projecting from an attachment surface of the permanent magnets in the direction from a center of the field pole core toward the armature core.

6. The brushless motor according to claim 1, comprising a field pole in which magnet holes for inserting permanent magnets into the field pole core are provided and a plurality of permanent magnets is inserted and fixed in the magnet holes, wherein
 Rm/Rc is 0.5 to 1.0, where Rc stands for a distance from a center of the field pole core to a farthest point of the field pole core, and most of the region of an outer circumferential portion of the field pole core follows a circular arc with a radius of about Rm.

7. The brushless motor according to claim 1, wherein the field pole core has a permanent magnet portion serving as a first field pole and a protruding portion serving as a second field pole with a polarity opposite that of the first field pole, the first field pole and the second field pole are each produced equidistantly in the circumferential direction, and a coil pitch of the windings is 180°, where an angle, in a circumferential direction of the field pole core, that is occupied by a pair of an N pole and an S pole of the magnetic poles is taken as an electric angle of 360°.

8. The brushless motor according to claim 1, wherein an induced voltage generated in the brushless motor by rotation of the field pole has a waveform in which a (2 m+1)-th order harmonic component having a frequency component 2 m+1 times the fundamental wave component, where m is an integer equal to or greater than 1, is superimposed on the fundamental wave of the induced voltage under predetermined phase difference condition and amplitude condition such that a fundamental wave peak of the induced voltage is increased over an induced voltage peak;
 the induced voltage generated in the armature windings includes a 5th order harmonic component; and
 the 5th order harmonic component has a phase difference of 150° to 210° with the 1st order fundamental wave of the voltage, where one period of the harmonic component is taken as 360°, and a ratio of an amplitude of the 5th order harmonic component to an amplitude of the 1st order fundamental wave of the voltage is 2% to 12%.

9. The brushless motor according to claim 1, wherein an induced voltage generated in the brushless motor by rotation of the field pole has a waveform in which a (2 m+1)-th order harmonic component having a frequency component 2 m+1 times the fundamental wave component, where m is an integer equal to or greater than 1, is superimposed on the fundamental wave of the induced voltage under predetermined phase difference condition and amplitude condition such that a fundamental wave peak of the induced voltage is increased over an induced voltage peak;
 the induced voltage generated in the armature windings includes a 5th order harmonic component and a 7th order harmonic component; and
 the 5th order harmonic component and the 7th order harmonic component have a phase difference of 120° to 240° with the 1st order fundamental wave of the voltage, where one period of the harmonic component is taken as 360°, and a ratio of a sum of amplitudes of the 5th order harmonic component and the 7th order harmonic component to an amplitude of the 1st order fundamental wave of the voltage is 2% to 36%.

10. The brushless motor according to claim 1, wherein
a magnetic flux interlinked with the armature windings between terminals of the brushless motor by the rotation of the field poles has a waveform in which a 5th order harmonic component and a 7th order harmonic component are superimposed on a 1st order fundamental wave of the magnetic flux, and in the magnetic flux interlinked with the armature windings, a phase difference and an amplitude ratio of each of the 5th order harmonic component and the 7th order harmonic component of the magnetic flux in relation to the 1st order fundamental wave of the magnetic flux are set under predetermined conditions such as to cancel a 6th order component of torque ripples generated by interaction of a harmonic component of the voltage applied to the armature windings and the 5th order harmonic component and the 7th order harmonic component of the magnetic flux interlinked with the armature windings.

11. An external AC voltage source that applies a voltage to the brushless motor according to claim 1,
the external AC voltage source being constituted by a combination of a DC voltage source and a frequency converter that converts a DC voltage into a frequency-variable AC voltage.

12. An electric power steering device configured to generate an assist torque with the brushless motor according to claim 1.

13. A brushless motor comprising an armature constituted by an armature core having armature windings of a plurality of phases, and a field pole constituted by a field pole core having a plurality of permanent magnets, wherein
a voltage, in which at least either of a 5th order harmonic component and a 7th order harmonic component is superimposed on a 1st order fundamental wave of an applied voltage under a predetermined phase difference condition and an amplitude condition such that a 1st order fundamental wave peak of the applied voltage is made larger than an applied voltage peak, is applied to the armature windings;
a harmonic voltage superimposed on the armature windings is the 5th order harmonic component and the 7th order harmonic component; and
the 5th order harmonic component and the 7th order harmonic component have a phase difference of 120° to 240° with the 1st order fundamental wave of the voltage, where one period of the high-order harmonic component is taken as 360°, and a ratio of a sum of amplitudes of the 5th order harmonic component and the 7th order harmonic component to an amplitude of the 1st order fundamental wave of the voltage is 2% to 36%.

* * * * *